United States Patent [19]
Hirose et al.

[11] Patent Number: 5,697,338
[45] Date of Patent: Dec. 16, 1997

[54] FUEL INJECTION CONTROLLER FOR USE IN AN INTERNAL COMBUSTION ENGINE

[75] Inventors: Katsuhiko Hirose; Takao Tate, both of Susono; Norihiko Nakamura, Mishima; Takeshi Sato, Susono; Kazuhiro Iwahashi, Susono; Shinji Kamoshita, Susono; Akihiro Yamanaka, Susono, all of Japan

[73] Assignee: Toyota Jidosha Kabushiki Kaisha, Toyota, Japan

[21] Appl. No.: 458,329

[22] Filed: Jun. 2, 1995

Related U.S. Application Data

[62] Division of Ser. No. 109,765, Aug. 20, 1993, Pat. No. 5,485,822.

[30] Foreign Application Priority Data

| Aug. 20, 1992 | [JP] | Japan | 4-221640 |
| Aug. 21, 1992 | [JP] | Japan | 4-223084 |
| Sep. 4, 1992 | [JP] | Japan | 4-237453 |
| Feb. 4, 1993 | [JP] | Japan | 5-017642 |
| Mar. 11, 1993 | [JP] | Japan | 5-050972 |
| Mar. 11, 1993 | [JP] | Japan | 5-050973 |

[51] Int. Cl.[6] .................................. F02D 31/00
[52] U.S. Cl. ........................ 123/357; 123/501; 123/458
[58] Field of Search ......................... 123/357, 494, 123/501, 500, 502, 449, 458

[56] References Cited

U.S. PATENT DOCUMENTS

| 3,844,263 | 10/1974 | Endo | 123/458 |
| 4,337,650 | 7/1982 | Brandt . | |
| 4,359,032 | 11/1982 | Ohie | 123/458 |
| 4,438,496 | 3/1984 | Ohie | 123/458 |
| 4,462,368 | 7/1984 | Funada | 123/446 |
| 4,475,507 | 10/1984 | Miyaki et al. | 123/357 |
| 4,492,196 | 1/1985 | Oshizawa | 123/357 |
| 4,494,507 | 1/1985 | Yasuhara | 123/357 |
| 4,502,438 | 3/1985 | Yasuhara | 123/357 |
| 4,503,820 | 3/1985 | Nakagawa | 123/357 |
| 4,597,369 | 7/1986 | Yasuhara | 123/458 |
| 4,736,726 | 4/1988 | Matsuno et al. | 123/501 |
| 4,766,864 | 8/1988 | Ban et al. | 123/357 |
| 4,788,960 | 12/1988 | Oshizawa | 123/458 |
| 4,817,575 | 4/1989 | Höfer | 123/458 |
| 4,825,369 | 4/1989 | Oshizawa | 364/431.05 |
| 5,241,933 | 9/1993 | Morikawa | 123/458 |

FOREIGN PATENT DOCUMENTS

| 57-032021 | 2/1982 | Japan . |
| 57-062935 | 4/1982 | Japan . |
| 57-102526 | 6/1982 | Japan . |
| 58-070028 | 4/1983 | Japan . |
| 59-185839 | 10/1984 | Japan . |
| 61-028735 | 2/1986 | Japan . |
| 61-135980 | 6/1986 | Japan . |
| 62-210242 | 9/1987 | Japan . |
| 1147142 | 6/1989 | Japan . |
| 1-052440 | 8/1989 | Japan . |
| 2291447 | 12/1990 | Japan . |
| 2 086 491 | 5/1982 | United Kingdom . |
| 2 098 334 | 10/1982 | United Kingdom . |

*Primary Examiner*—Carl S. Miller
*Attorney, Agent, or Firm*—Kenyon & Kenyon

[57] ABSTRACT

A diesel engine has a fuel injection nozzle to which pressurized fuel is supplied from a pump. The nozzle has a pressure sensor detecting the fuel pressure and a lift sensor sensing a lift magnitude of a needle valve. An electronic control unit (ECU) computes a variation ratio of the fuel pressure value which is measured by the pressure sensor. The ECU computes a non-increasing point in an increasing part of variation ratio and judges the point to be a timing for starting the fuel injection of the nozzle. The ECU also computes the actual fuel injection amount in accordance with the fuel injection timing as well as the fuel pressure and the lift amount of the needle valve both at the various points. The ECU controls the actual injection amount to be identical to a target fuel injection amount.

2 Claims, 42 Drawing Sheets

FUEL INJECTION CONTROLLER FOR USE IN AN INTERNAL COMBUSTION ENGINE

This application is a division of application Ser. No. 08/109,765, filed on Aug. 20, 1993, now U.S. Pat. No. 5,485,822.

BACKGROUND OF THE INVENTION

1. Field of the Invention

The present invention relates generally to an internal combustion engine, which includes a fuel controller formed with a fuel injection pump and fuel injection nozzles, etc. More particularly, the invention relates to a fuel injection controller, which controls the amount of fuel to be injected from the fuel injectors into the internal combustion engine, detects and controls fuel injection timing and which determines irregular condition of the controller.

2. Description of the Related Art

In general, internal combustion engines having injection devices, as for example, diesel engines and high pressure gasoline injection type engines are well known. With such engines, the precise amount of fuel to be injected and the timing of the fuel injection with respect to the position of the engine's pistons are crucial facets in the control of the fuel injection system, and most generally are designed to comply with specific target values. Consequently, it is extremely important to know the exact time for initiating fuel injection and for determining the precise amount of fuel to be injected at that time.

For example, with fuel injection pumps in an electronically controlled diesel engine, fuel in a high pressure chamber is delivered to fuel injection nozzles by the lift of a plunger, and then is injected into each one of the cylinders in the diesel engine. Spill rings and spill valves, etc. disposed in the fuel injection pump are controlled by a driving actuator, such that the amount of fuel injected into the engine at any time satisfies a target fuel amount set according to the engine's running condition at any given time. A high pressure chamber in the plunger communicates to a fuel chamber, in such a way that a part of the fuel in the high pressure chamber is spilled into the fuel chamber. From this it is apparent that the timing of the termination of the pressurized fuel delivery from the pump to the nozzles, and thereby to each of the engine's cylinders is a crucial concern.

However, the control characteristics of these types of fuel injection pumps inevitably suffer from the deformation and wearing out of the pump's mechanical parts in addition to changes in the physical characteristics of the fuel. For example, when the cam mechanism responsible for reciprocating the pump plunger is worn down or worn out, the degree of lift traveled by the plunger would decrease thereby causing the amount of fuel injected through the injector nozzle to exceed the target fuel injection amount. Further compounding, this problem would be the resultant decrease in the urging force of this pump plunger return spring. A decrease of the spring force, due to a worn cam mechanism, would cause a decrease in the injector nozzle's opening valve pressure. this in turn would result again in an increase in the amount of fuel supplied to the injector nozzle. Another characteristic problem is due to changes in the physical characteristics of the fuel due to fuel temperature increases. Consequently, the amount of fuel injected through the nozzles as well as the timing of the fuel injection and fuel injection timing may be controllably changed.

Several technologies have attempted to overcome the above-described drawbacks. Japanese Unexamined Patent Publication No. 57-32021 discloses a fuel injection device that detects the amount of fuel injected into an engine, the described device maintains control over that fuel supply amount for a period longer than had similar technology, while remaining markedly unaffected by deteriorating fuel injection pump component parts. More particularly, a pressure sensor detects the internal pressure in the plunger barrel. Based on the peak valve of internal pressure detected, the fuel injection device computes the actual amount of fuel to be injected. The position of the spill valve is controlled in such a way that the actual fuel injection amount converges to a target fuel value.

Japanese Unexamined Patent Publication No. 57-62935 discloses a fuel injection timing controller for use in a diesel engine. In this controller, a single sensor detects a change in fuel pressure when pressurized fuel is spilled from the injection pump to the injection nozzles. The controller controls the fuel injection timing by using a signal detecting an increase in the periodicity of high fuel pressure conditions as a feedback signal to the controller.

Unfortunately neither of the above described devices could maintain an accurate enough correspondence between the detected data and actual fuel injector conditions. The value detected by the pressure sensor of both devices for the internal pressure of the fuel injector pump inconsistently reflected actual changes in the amount of fuel injected by the fuel injectors. Likewise both devices failed to maintain an accurate correspondence between the periodicity of changes in the fuel injector pump pressure with that of actual fuel injector timing. However, in the above-described technologies, as the peak value of the internal pressure in the plunger which was detected by the pressure sensor, and the signal indicating the increase period of the fuel pressure are referred, to the changes in the actual fuel injection amount and actual fuel injection timing do not always reflect those detected data. In order to accurately compute the actual fuel injection amount and actual fuel injection timing, the timing (i.e., fuel injection initiating timing) when the fuel injection through the nozzles is initiated should be accurately detected.

The present invention is proposed to overcome the above-described drawbacks. In other words, in the increase stage of the fuel pressure, the present invention is accomplished in that the first turning point of the increase rate is considered as the fuel injection initiating timing.

SUMMARY OF THE INVENTION

Accordingly, it is a primary objective of the present invention to provide a fuel injection controller for use in an internal combustion engine with a fuel injection pump and fuel injection nozzles, which accurately detects timing conditions under which fuel injection can be initiated without any significant influence from the effects of fuel injection component wear, degradation or variances in the tolerance of the manufactured injector pump components.

It is a further objective of the invention to accurately control fuel injection timing, the amount of fuel to be injected by the fuel injectors, as well as to determine the existence of irregular fuel injector controller conditions.

To achieve the foregoing and other objects and in accordance with the purpose of the present invention, a fuel injection controller is provided for a fuel injection control apparatus for a combustion engine comprising:

a nozzle for injecting pressurized fuel to the engine when the fuel pressure is in excess of a predetermined value;

a pump for supplying the fuel to the nozzle;

means for detecting a fuel pressure value in a fuel passage between the pump and the nozzle; and means for controlling the pump operation in accordance with the detected fuel pressure value, said control means including means for computing a variation ratio of the fuel pressure in accordance with the detected fuel pressure value, and means for actuating the pump in accordance with the computed variation ratio.

BRIEF DESCRIPTION OF THE DRAWINGS

The feature of the present invention that are believed to be novel are set forth with particularity in the appended claims. The invention, together objects and advantages thereof, may best be understood by reference to the following description of the presently preferred embodiments together with the accompanying drawings, in which:

FIGS. 1 through 9 describe the first embodiment of a diesel engine system with a super charger according to the present invention, in which:

FIG. 1 is a schematic view showing a fuel injection timing device of a diesel engine;

FIG. 2 is a cross-sectional view of a distributor type injection pump;

FIG. 3 is a descriptive drawing of a pressure sensor and lift sensor which are disposed in a fuel injection nozzle;

FIG. 4 is a block diagram showing an electric construction which includes an electronic control unit (ECU);

FIG. 5 is a flowchart showing operations of a sub-routine computing the first and second derivatives of the change in fuel pressure at the initialization of the fuel injection cycle carried out by the ECU;

FIG. 6 is a flowchart showing operations of a fuel injection derivation amount ΔQ operational routine carried out by the ECU;

FIG. 7 is a map showing the correlation of lift coefficient with respect to the magnitude of needle valve;

FIG. 8 is a timing chart describing the timing of fuel injection to be initiated, the timing for terminating the fuel injection, fuel pressure, first derivative value, and actual amount of fuel injected, which are computed while a single fuel injection is carried out; and FIG. 9 is a flowchart showing the operations of a first control routine governing initiation of fuel injection timing ts carried out by the ECU.

FIGS. 10 through 13 describe a second embodiment of a fuel injection control system of the present invention; in which FIG. 10 is a flowchart showing operations of a sub-routine which are carried out by the ECU;

FIG. 11 is a flowchart showing operations of the fueling initiating time press routine, i.e. the initial timing and pressure values upon initial fuel injection,carried out by the ECU;

FIG. 12 is a flowchart showing the operations of a second control routine carried out by the ECU governing the amount of fuel to be injected by the injector; and FIG. 13 is a timing chart describing the timing of fuel injection to be initiated, the timing for terminating the fuel injection, fuel pressure, first derivative value, actual amount of fuel injected, and operations of electromagnetic spill valve.

FIGS. 14 through 16 describe the third embodiment of the diesel engine system with the super charger according to the present invention; in which FIG. 14 is a flowchart showing operations of a sub-routine carried out by the ECU to monitor deviations in the amounts of fuel injected;

FIG. 15 is a flowchart of a Δθ operational routine which is carried out by the ECU; and FIG. 16 is a flowchart showing operations of a control routine governing fuel injection timing carried out by the ECU.

FIGS. 17 through 20 describe the fourth embodiment of a fuel injection control system of the present invention; in which FIG. 17 is a flowchart showing operations of another sub-routine to monitor deviations in the amounts of fuel injected;

FIG. 18 is a timing chart describing the timing of fuel injection to be initiated, the timing for terminating the fuel injection, fuel pressure, and operations of a first derivative value;

FIG. 19 is a flowchart showing the operations of a control routine governing the amount of fuel injector initiating pressure for injection, by the fuel injector carried out by the ECU; and FIG. 20 is a graph illustrating the operational region of fuel injected amount according to the correlation between the engine speed and the previous target amount of fuel injection.

FIGS. 21 through 25 describe the fifth embodiment of a fuel injection control system of the present invention; in which FIG. 21 is a schematic view showing a fuel injection timing device of the diesel engine;

FIG. 22 is a flowchart showing operations of a sub-routine for sampling fuel pressure and internal pressure in the high pressure chamber carried out by the ECU;

FIG. 23 is flowchart showing operations of a Pcr operational routine, which are carried out by the ECU;

FIG. 24 is a timing chart describing pressure the high chamber's pressure as well as its rate of change, i.e., its first derivative value; and FIG. 25 is a flowchart showing operations of a control routine governing the amount of fuel for injection, which are carried out by the ECU.

FIGS. 26 through 28 describe the sixth embodiment of a fuel injection control system of the present invention; in which FIG. 26 is a schematic view showing a fuel injection timing device of the diesel engine;

FIG. 27 is a flowchart showing operations of a control routine for the amount of fuel for injection, which are carried out by the ECU; and calculating a bulk fuel modulus of elasticity to set the valance of fuel amount previously injected; and FIG. 28 is a graph explaining the relationship between the change in the fuel amount and the fuel temperature with respect to the modulus of elasticity.

FIG. 29 is a graph explaining the relationship between the amount of fuel remaining in the fuel pump and nozzle after a fuel deviation of remaining fuel amount with respect to the pressure deviation of the opening fuel injector nozzle;

FIG. 30 is a graph explaining the relationship between the fuel temperature and a coefficient used in determining fuel injection timing used for purposes of computing the actual fuel remaining valve Qre in a fashion similar to that performed on Qre in the sixth embodiment;

FIG. 31 is a graph explaining the relationship between the amount of fuel remaining after each injection cycle, and the standard amount of pressure for opening the valve of the fuel injector nozzle;

FIG. 32 is a graph explaining the relationship between the change in the amount of fuel remaining in the fuel system according to a predetermined coefficient of the fuel temperature;

FIG. 37 is a flowchart showing operations of environmental coefficiency operational routine in a fuel system, which are carried by the ECU;

FIG. 38 is a timing chart showing the fuel pressure at a single fuel injection and operations of a first derivative value;

FIG. 39 is a flowchart showing operations of a control routine for the amount of fuel for injection, which are carried out by the ECU; and FIG. 40 is a flowchart showing operations of a fuel injection timing control routine, which are carried out by the ECU.

FIGS. 41 through 44 describe tenth embodiment of the diesel engine system with the super charger according to the present invention; in which FIG. 41 is a flowchart showing operations of Pe operational routine, which are carried out by the ECU;

FIG. 42 is a similar flowchart showing operations of Pe operational routine;

FIG. 43 is a timing chart describing the initial and terminating time and pressure as well as the first derivative of the fuel precess for the injection cycle; and FIG. 44 is a flowchart showing the operations of a control routine governing the amount of fuel to be injected by the fuel injection.

FIGS. 45 through 49 describe an eleventh embodiment of a fuel injection control system according to the present invention; in which FIG. 45 is a schematic view showing the diesel engine, as well as the fuel injection pump and associated fuel injection control elements;

FIG. 46 is a flowchart showing the operations of a control routine governing the amount of fuel to be injected into the fuel injector;

FIG. 47 is a flowchart showing operations of diagnostic routine for indicating control malfunctions;

FIG. 48 is a graph illustrating the deviation of a time delay coefficient used in computing the termination of fuel injection cycle; and FIG. 49 is a timing chart describing operations of the fuel pressure computed for a single fuel injection cycle, the on or off state of the electromagnetic spill valve, and the correlation between the preset time for terminating the fuel injection and actual time for the fuel termination.

DETAILED DESCRIPTION OF THE PREFERRED EMBODIMENTS

The first through eleventh embodiments of an electronic fuel injected controlled diesel engine mounted in a vehicle according to the present invention will now be described. The fundamental mechanical and electrical concepts of a fuel injection control device including a fuel injection pump and fuel injection nozzles according to the present invention will be primarily described in the first embodiment. The second through eleventh embodiment will mainly describe variations of the present invention with respect to the first embodiment.

First Embodiment

Figure 1:
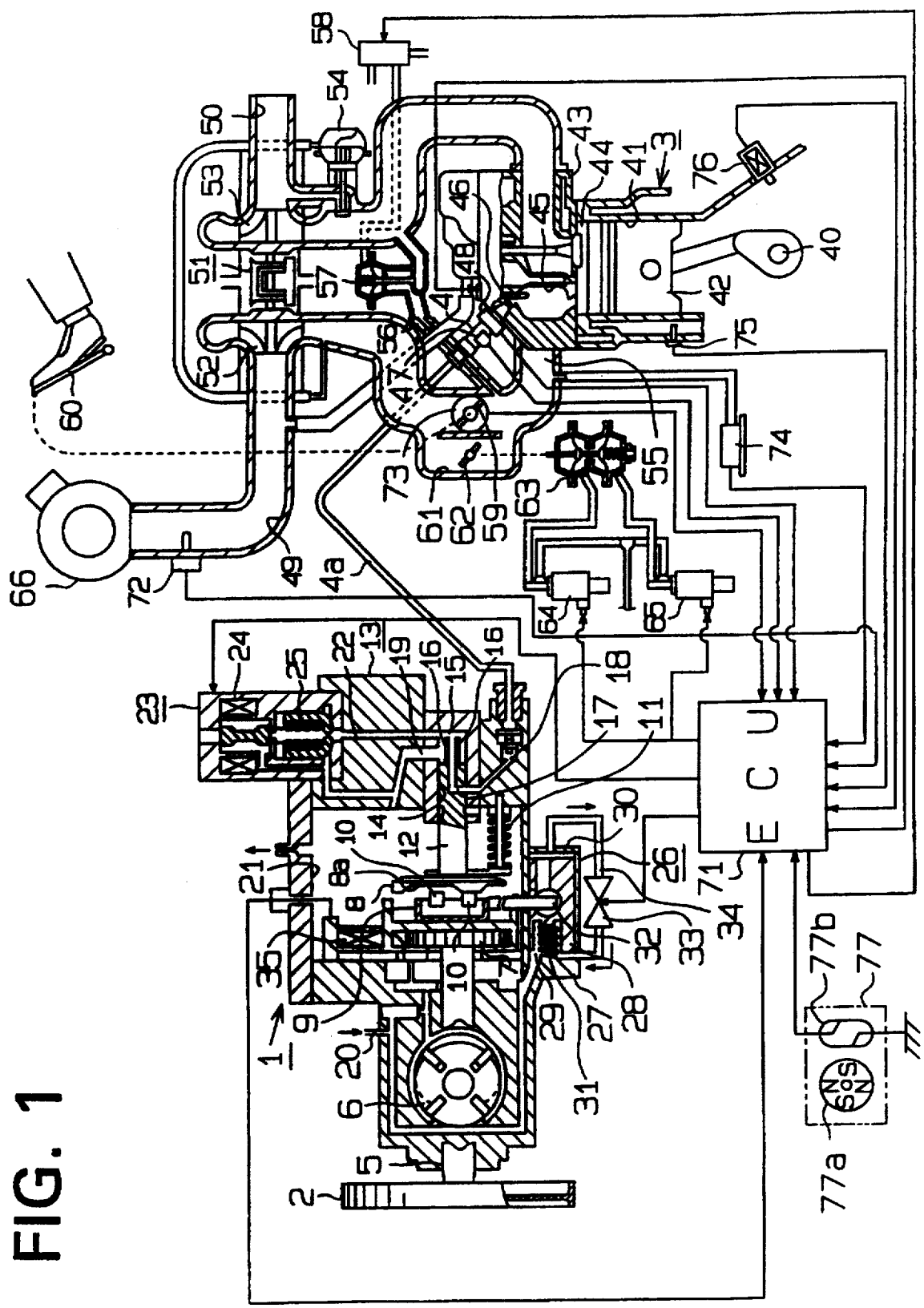
Figures 2, 3:
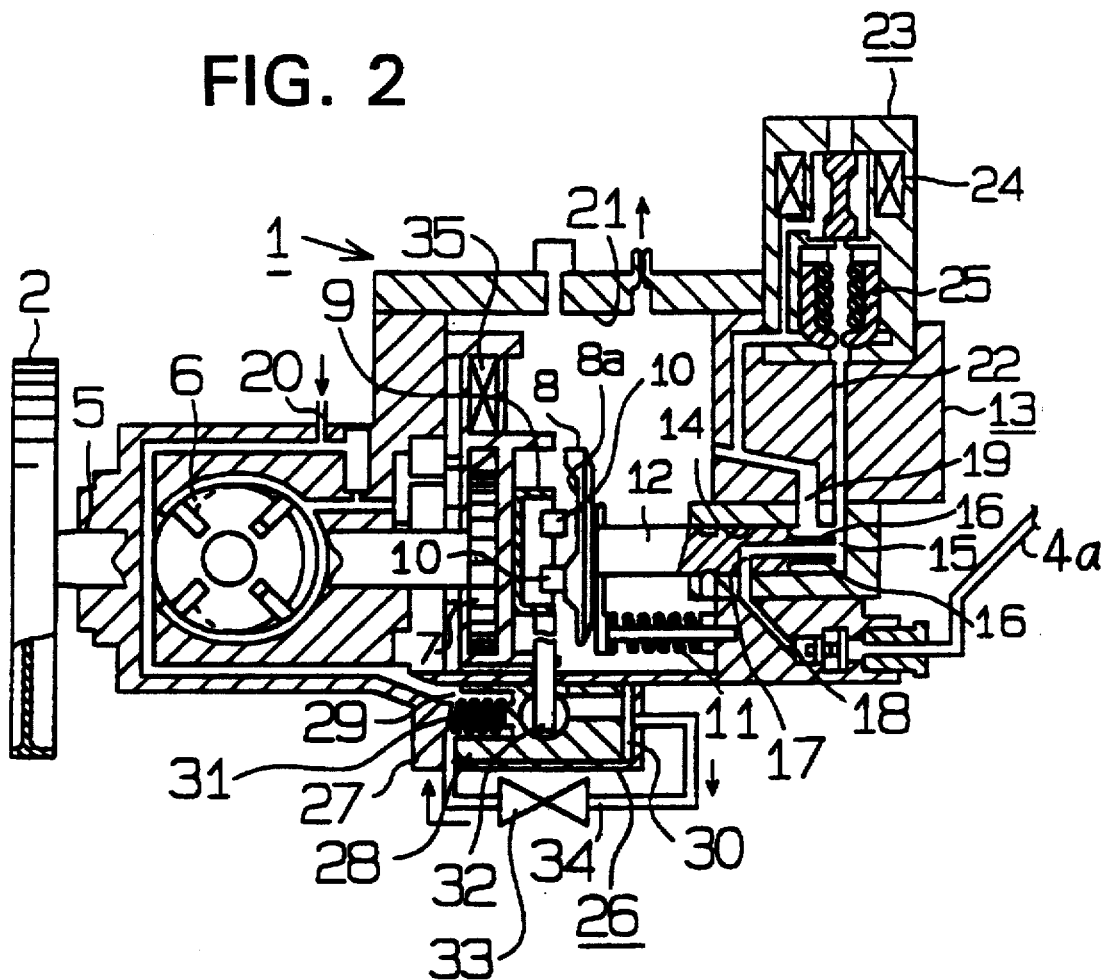

FIG. 1 shows a schematic view of a diesel engine system with super charger for increased air-fuel charged engine intake capacity. FIG. 2 shows an enlarged view of a distributor type injection pump 1. The injection pump 1 includes a drive pulley 2. The drive pulley 2 is operably connected with a crank shaft 40 of a diesel engine 3, via a belt. The drive pulley 2 is rotatably driven by means of crank shaft 40 such that the injection pump 1 is also driven. By this rotational motion, pressurized fuel is delivered to fuel injection nozzles 4 disposed in cylinders (in this embodiment, four cylinders are provided) of the engine 3, respectively.

In this embodiment, the injection nozzle 4 contains an automatic valve, which includes a needle valve and a spring for controlling the opening pressure of the valve. When fuel pressure P exceeds a predetermined level, the injection nozzle 4 opens allowing pressurized fuel to be delivered from fuel pump 1 into engine 3 through an associate fuel injector nozzle 4.

The fuel pump 1 of FIGS. 1 and 2 includes a drive shaft 5 having on a distal portion drive pulley 2. A fuel feed pump which is formed with a vane type pump 6 (only 90 degrees rotated in this drawing) is disposed midway along drive shaft 5. A disc shaped pulsar 7 is mounted on the proximal portion of drive shaft 5. Notches are equiangularly formed on the circumference of the pulsar 7, and the number of the notches is equal to the number of cylinders in the engine 3. In other words, in this embodiment, the notches are disposed at four different places (i.e., total eight notches). Fourteen protrusions are equiangularly formed between adjacent notches (i.e., total fifty six protrusions). The proximal end of drive shaft 5 is connected to a cam plate 8 by means of a coupling (not shown).

A roller ring 9 is disposed between the pulsar 7 and cam plate 8. A plurality of cam rollers 10 are coupled to roller ring 9 and are disposed in a circumferential manner opposite cam faces 8a of the cam plate 8. The number of the cam faces 8a is equal to the number of the cylinders in the engine 3. The cam plate 8 is urgingly engaged with the cam roller 10 by means of a spring 11.

The proximal end of a plunger 12 for pressurizing the fuel is coupled to the cam plate 8. Cam plate 8 together with plunger 12 are integrally rotated with respect to the rotation of shaft 5. In other words, rotational force of the shaft 5 is transmitted to the cam plate 8, via a cam spring 11. Therefore, the transmission of the force causes the cam plate 8 to engage with the cam roller 10 and rotate therewith. Consequently, the cam plate 8 is horizontally (i.e., along right-and-left direction in the drawing) reciprocated by the number of times corresponding to the number of engine cylinders while the plate 8 is rotating. Plunger 12 is also reciprocated along the same direction with the cam plate 8 at the same time the plunger 12 is rotating. More specifically, plunger 12 is moved forward (i.e., lifted) to a degree depending on an amount by which cam faces 8a overlap cam roller 10 of the roller ring 9. Conversely, the plunger 12 is moved rearward (i.e., dropped) to a degree depending on the amount by which cam faces 8a overlaps the cam roller 10.

A plurality of cylinders 14 are formed in a pump housing 13. The plungers 12 are inserted into the cylinders, respectively. High pressure chambers 15 are defined between the distal surfaces of the plungers 12 and the bottom surfaces of the cylinders 14, respectively. Suction grooves 16 and distributor ports 17 are formed around the circumference of the plunger 12 at the distal side with the numbers of grooves 16 and ports 17 being equal to the number of the engine cylinders. Further, the housing 13 includes distributor passages 18 and suction ports 19 which correspond to the suction grooves 16 and distributor ports 17, respectively.

According to the pump housing 13 of this embodiment, delivery valves 36 in FIG. 2 formed with constant pressure valves (CPV) are disposed at openings of the distributor passages 18, respectively. The delivery valve 36 prevents the pressurized fuel delivered from the distributor passage 18 from flowing in a reverse direction back into passage 18. Further, the delivery valve 36 opens when the fuel pressure P exceeds the predetermined level to allow fuel to be pumped from the fuel pump 1 to the injector nozzle 4.

Fuel is introduced into a fuel chamber 21 from a fuel tank (not shown) through a fuel feeding port 20, as the fuel feed pump 6 is driven by the rotational motion of the shaft 5. When the plunger 12 is reversely moved in a suction stroke causing the pressure in the high pressure chamber 15 to be reduced, one of the suction grooves 16 will be in alignment with suction port 19. As a result of the reverse movement of plunger 12, fuel is fed into the high pressure chamber 15 from the fuel chamber 21. On the other hand, when the plunger 12 is moved forward, that is, the compression stroke which causes the pressure in the high pressure chamber 15 to be increased, the pressurized fuel is fed into the fuel injection nozzles 4 of cylinders from the distributor passages through distributor passage 18 and delivery valve 36 and fuel passages 4a.

In the pump housing 13, a spill passage 22 for spilling the fuel is formed between the high pressure chamber 15 and fuel chamber 21. An electromagnetic spill valve 23 is disposed midway along the spill passage 22. Spill valve 23 is opened or closed for controlling the spill amount of fuel from the high pressure chamber 15. The electromagnetic valve 23 is a type that is normally opened. In the condition when coil 24 is not energized (i.e., off condition), spill passage 22 is opened by means of a valve member 25 and fuel in the high pressure chamber 15 is spilled to the fuel chamber 21. Conversely, as coil 24 is energized (i.e., on condition), spill passage 22 is closed by means of the valve member 25. The spilling of fuel from the high pressure chamber 15 to the fuel chamber 21 is cut off.

Therefore, as the electromagnetic valve 23 is controlled to switch between an on or off condition, i.e., being energized or de-energized, the fuel spill from the high pressure chamber 15 to the fuel chamber 21 is adjusted by opening or closing spill valve 23. When the spill valve 23 is opened while plunger 12 is in a compression stroke, fuel in the high pressure chamber 15 is effectively de-pressurized, such that any fuel injection from the fuel injection nozzle 4 is suspended. That is to say, when the plunger 12 moves forward at a time when spill valve 23 is opened, fuel pressure in the high pressure chamber 15 will not increase, preventing fuel from being injected through the nozzle 4. At a time when plunger 12 moves forward, control valve 23 is openly controlled thereby allowing for adjustment to be to the termination timing of the fuel injection through the nozzle 4. In this way, the timing and the amount of the fuel to be injected into the cylinders is adjustably controlled.

A timing device 26 (shown in FIGS. 1 and 2 rotated by 90 degrees) controls fuel injection timing by either advancing or retarding cam rollers 10 against cam face 8a, thereby adjustably controlling the reciprocal movement of plunger 12. That is, cam rollers 10 adjustably engage cam face 8a by means of changing the rotational position of roller ring 9 with respect to the rotational direction of drive shaft 5. This is accomplished by selectively controlling. The advancement or retarding of slide pin 32 is controlled by timing device 26.

The timing device 26 is driven by the controlled oil pressure, and includes a timing housing 27 and a timing piston 28 disposed in the housing 27. A low pressure chamber 29 and compression chamber 30 are defined by both sides of the timing piston 28 within the housing 27. In the low pressure chamber 29, a timing spring 31 is provided to urge timing piston 28 against the compression chamber 30. Timing piston 28 is also connected with the roller ring 9, via a slide pin 32.

Feed pump 6 supplies pressurized fuel to the compression chamber 30. The position of the timing piston 28 is set according to the relation of balancing between the fuel pressure in compression chamber 30 and the urging force of the timer spring 31. The position of the roller ring 9 is set in response to the setting position of the timing piston 28. This allows a reciprocal timing of the plunger 12 to be set.

The resent embodiment utilized the fuel pressure in fuel injection pump 1 as the control oil pressure for the timing device 26. To adjust the fuel pressure, the timing device includes a timing control valve (TCV) 33. Specifically, a communicating passage 34 is disposed between the compression chamber 30 and low pressure chamber 29 in the housing 27. The TCV 33, disposed midway along passage 34, is an electromagnetic valve which is opened or closed using a signal modulation signal. As the TCV 33 is opened or closed, the fuel pressure in the compression chamber 30 is thereby adjusted. Likewise as the fuel pressure is adjusted, the reciprocating timing of the plunger 12 is controlled allowing for control in the fuel injection timing.

An engine speed sensor 35 formed using an electromagnetic pick-up coil is provided on the upper portion of the roller ring 9 opposite the circumference of the pulser 7. Sensor 35 outputs pulse signals for indicating the rotation of pulser 7. These signals are generated when the protrusions in pulser 7 rotate past the electromagnetic pick-up sensor 35. In effect, the sensor 35 outputs engine revolution pulse signals at the predetermined crank angle intervals as reference signals corresponding to a predetermined crank angle indicated by the associated notches in the pulser 7. Beside providing for output of engine revolution pulse signals for computing an engine speed NE, sensor 35 being integrally formed with the roller ring 9, additionally provides reference signals that effectively function as reference signals for detecting fuel injection timing due to the reciprocal motion of the plunger 12.

The diesel engine 3 will now be described. As shown in FIG. 1, the diesel engine 3 includes primary combustion chambers 44 which are defined by cylinder bores 41, pistons 42 and cylinder heads 43 for corresponding cylinders, respectively. precombustion chambers 45 are formed in the cylinder heads 43, which communicate to the primary combustion chambers 44, respectively. The fuel is injected into the precombustion chambers 45 through the fuel injection nozzles 4. Further, it is well known to use glow plugs 46 to warm the air in precombustion chamber as an aid in starting diesel engine 3 under cold condition.

According to the present invention, as shown in FIGS. 1 and 3, pressure sensor 47 are disposed in the nozzles 4. Furthermore, lift sensors 48 are also disposed in the nozzles 4. When pressure sensor 47 detects the pressure of fuel (i.e., fuel pressure P) delivered from the fuel pump 1 to each one of the nozzles 4, pressure sensor 47 outputs a signal corresponding to the magnitude of the detected value. When lift sensor 48 detects the lifted amount L of the fuel injector's needle valve, which corresponds to the cross sectional area of the opened nozzle 4, lift sensor 48 outputs a signal corresponding to the magnitude of the detected value.

Conventional components of diesel engine 3 include a suction passage 49 and exhaust passage 50 which communicate with each of the engine cylinders. A compressor 52 and turbocharger 51 forming a supercharger are positioned along suction passage 49. Turbines 53 of turbocharger 51 are disposed along the exhaust passage 50 while a waste gate valve 54 is disposed along the exhaust passage 50. It is a well known fact that the turbines 53 are rotated by the energy in the exhaust gas in the turbocharger 51. When compressor 52 which is coaxially disposed with the turbocharger is rotated, pressure in the sucked air is increased. As the pressure is increased, the high density air is fed into the primary combustion chambers 44. The result of the supercharger use is the large amounts of fuel injected through the precombustion chambers 45 can be burnt allowing for the output power from the engine 3 to be increased. As the waste gate valve 54 is opened or closed, increasing pressure level of air sucked in the turbo charger 51 is adjusted.

An exhaust gas recirculation valve passage (EGR passage) 56 is disposed between the suction passage 49 and exhaust passage 50. A portion of the exhaust gas from the exhaust passage 50 is recirculated to the vicinity of suction port 55 in the suction passage 49 through the EGR passage 56. An EGR valve 57 is disposed along the EGR passage 56 and controls the amount of exhaust gas (EGR amount) to be recirculated. An electric vacuum regulating valve (EVRV) 58 is disposed between ERG valve 57 and an electronic unit (ECU) 71 for opening or closing the EGR valve 57. The EGR valve 58 is opened or closed by controlling the opening angle of the EVRV 58. Through this opening or closing operation, the EGR amount which is introduced from the exhaust passage 50 to suction passage 49 through EGR passage 56 is adjusted. A throttle valve 59 is disposed along the suction passage 49, and is manipulated to be opened or closed according to the thrust amount of accelerator pedal 60. A bypass passage 61 is disposed in the suction passage 49 in parallel with throttle valve 60. A bypass throttle valve 62 is disposed in the passage 61. A two stage diaphragm chamber type actuator 63 is provided for controlling opening or closing the throttle valve 62. Two vacuum switching valves (VSV) 64 and 65 are provided for driving the actuator 63. The VSV's are controlled to switch their positions between on and off, so as to enable opening or closing throttle valve 62. For example, under idling conditions, bypass throttle valve 62 is half way opened to reduce the noise and vibration when the engine is running under the idling condition. Under the normal driving condition, valve 62 is completely opened. When the engine is to be stopped, the valve 62 is completely closed in order to effect a smooth engine shut-off.

The above-described electromagnetic spill valve 23, TCV 33, glow plugs 46, EVRV 58 and VSV's 64, 65 are electrically mutually connected with an electronic control unit (hereinafter referred to as ECU) 71. The drive timing for those components 23, 33, 46, 58, 64, and 65 are controlled by means of the ECU 71, respectively.

To detect the running condition of the diesel engine 3, numerous sensors described hereinafter in addition to the engine speed sensor 35 are used.

A suction air temperature sensor 72 disposed in the vicinity of an air cleaner 66 and the opening of the suction passage 49 is designed to detect the temperature of the air sucked from outside engine 3 (hereinafter referred to as air temperature THA) and output a signal according to the Mount of detected value. An accelerator sensor 73 is disposed in the vicinity of the throttle valve 59 and detects the opening angle ACCP of the accelerator by outputing a signal to the ECU corresponding to the relative open or closed position of throttle valve 59. A suction air pressure sensor 74 is disposed in the vicinity of the suction port 55 for detecting the pressure of air sucked in (i.e., supercharged pressure PiM) by the turbocharger 51, and outputs a signal to ECU 71 corresponding to the amount of detected value. Further, a coolant temperature sensor 75 is provided for detecting the temperature of coolant (i.e., coolant temperature THW) of the engine 3, and outputs a signal to ECU 71 corresponding to the amount of detected value. A crank angle sensor 76 is provided for detecting a rotational reference position of crank shaft 40 (i.e., rotational position of shaft 40 with respect to the top dead center of the specific cylinder), and outputs a signal to ECU 71 corresponding to the amount of detected value. Furthermore, a vehicle speed sensor 77 is provided in a transmission (not shown) for detecting vehicle speed SPD. The speed sensor 77 includes magnets 77a which are rotated by the drive shaft of transmission. The magnets 77a cause a lead switch 77b to be periodically activated and output pulsed signals corresponding to the vehicle speed SPD.

The ECU 71 connects with the above-described sensors 72 through 77, the engine speed sensor 35, pressure sensor 47 and lift sensor 48, respectively. The ECU 71 preferably controls the electromagnetic spill valve 23, TCV 33, glow plugs 46, EVRV 58 and VSV's 64, 65 based on the output signals from the sensors 35, 47, 48 and 72 through 77.

Figure 4:
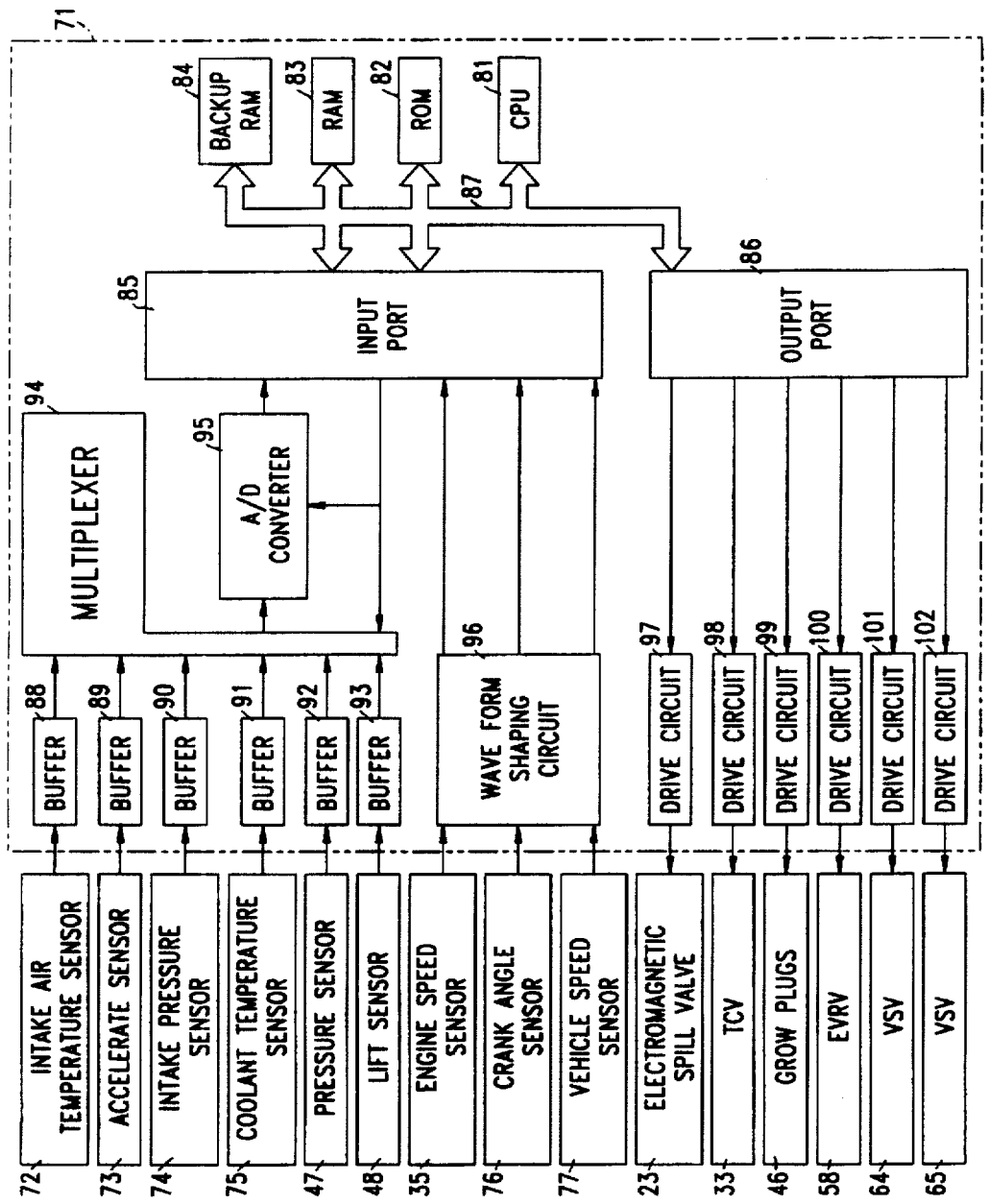

The construction of the ECU 71 will now be described referring to a block diagram in FIG. 4. The ECU 71 includes a central processing unit (CPU) 81, read only memory (ROM) 82 for storing preprogrammed control programs and computational relationship, etc., random access memory (RAM) 83 for temporarily storing the operational results, and backup RAM 84 for safeguarding the stored data. The ECU 71 is formed as a logical operation circuit with the above-described components 81 through 84, input port 85 and output port 86 which are mutually connected, via buses 87.

ECU input port 85 connects with the suction air temperature sensor 72, acceleration sensor 73, suction air pressure sensor 74, coolant temperature sensor 75, pressure sensor 47 and lift sensor 48, via buffers 88 through 93, multiplexer 94 and analog/digital converter (A/D converter) 95. The engine speed sensor 35, crank angle sensor 76 and vehicle speed sensor 77 are connected to the input port 85, by means of a wave form shaping circuit 96. The CPU 81 inputs or loads signals as input values output from the sensors 35, 47, 48 and 72 through 77, via the input port 85, respectively. The electromagnetic spill valve 23, TCV 33, glow plugs 46, EVRV 58 and VSV's 64, 65 are connected to the output port 86, via drive circuits 97 through 102, respectively. The CPU 81 preferably controls spill valve 23, TCV 33, glow plugs 46, EVRV 58 and VSV's 64 and 65 based on the read input values from the sensors 35, 47, 48, and 72 through 77, respectively. CPU 81 further provides ECU 71 with a timing function as is typical for CPU. The glow plug 46, pressure sensor 47 and lift sensor 48 are provided with each of the cylinders in diesel engine 3. To simplify the explanation, only one set of those is shown in the block diagram of FIG. 4.

The operations for controlling the amount of fuel for injection which are carried out by the ECU 71 will now be described in detail referring to FIGS. 5 through 9.

Figure 5:
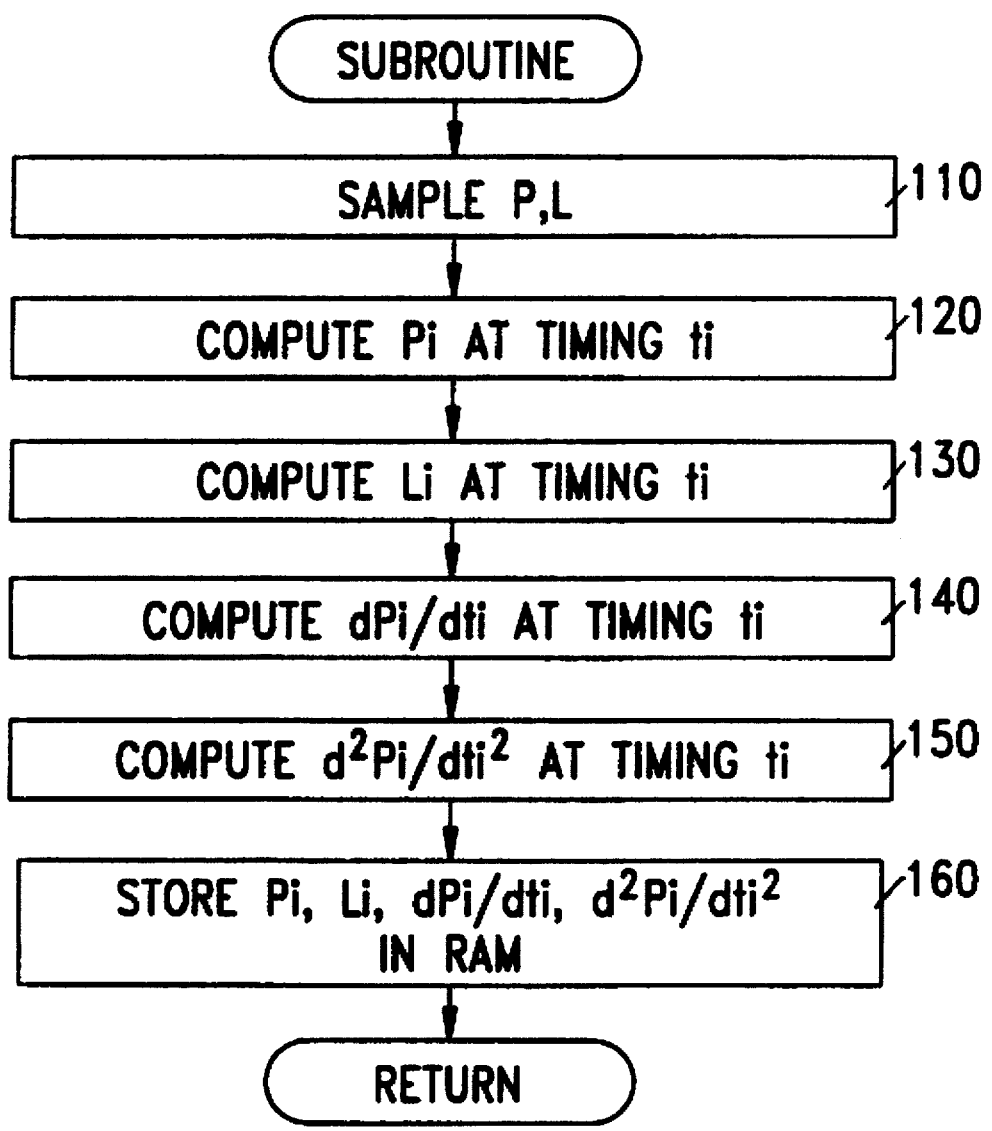

FIG. 5 shows an operational flowchart of a sub-routine which is carried out by ECU 71 during every timing cycle ti initiated by the timing function of the CPU 81. When this sub-routine is initiated, the ECU 71 samples a fuel pressure P and lift amount L of needle valve according to the signals from pressure sensor 47 and lift sensor 48, respectively, at step 110. The ECU 71 next computes the fuel pressure Pi using an initial time value ti at step 120. The ECU 71 then computes a lift amount Li of needle valve using timing value ti at step 130.

ECU 71 next computes a first derivative value (dPi/dti) as a changing rate of fuel pressure Pi at timing value ti at step 140.

Following this, ECU 71 computes a second derivative value ($d^2Pi/dti^2$) as a changing rate of fuel pressure Pi at timing value ti at step 150. The ECU 71 next stores the fuel pressure Pi, lift amount Li of needle valve, first derivative value (Dpi/dti) and second derivative value ($d^2Pi/dti^2$) as operational data in the RAM 83 at step 150. Finally ECU 71 terminates this routine.

According to the operations of the above-described sub-routine, as every single fuel injection cycle is carried out, the fuel pressure Pi, lift amount Li of needle valve, first derivative value (dPi/dti) and second derivative value ($d^2Pi/dti^2$) corresponding to each timing cycle value ti are sequentially stored as operational data in the RAM 83.

Figure 6:
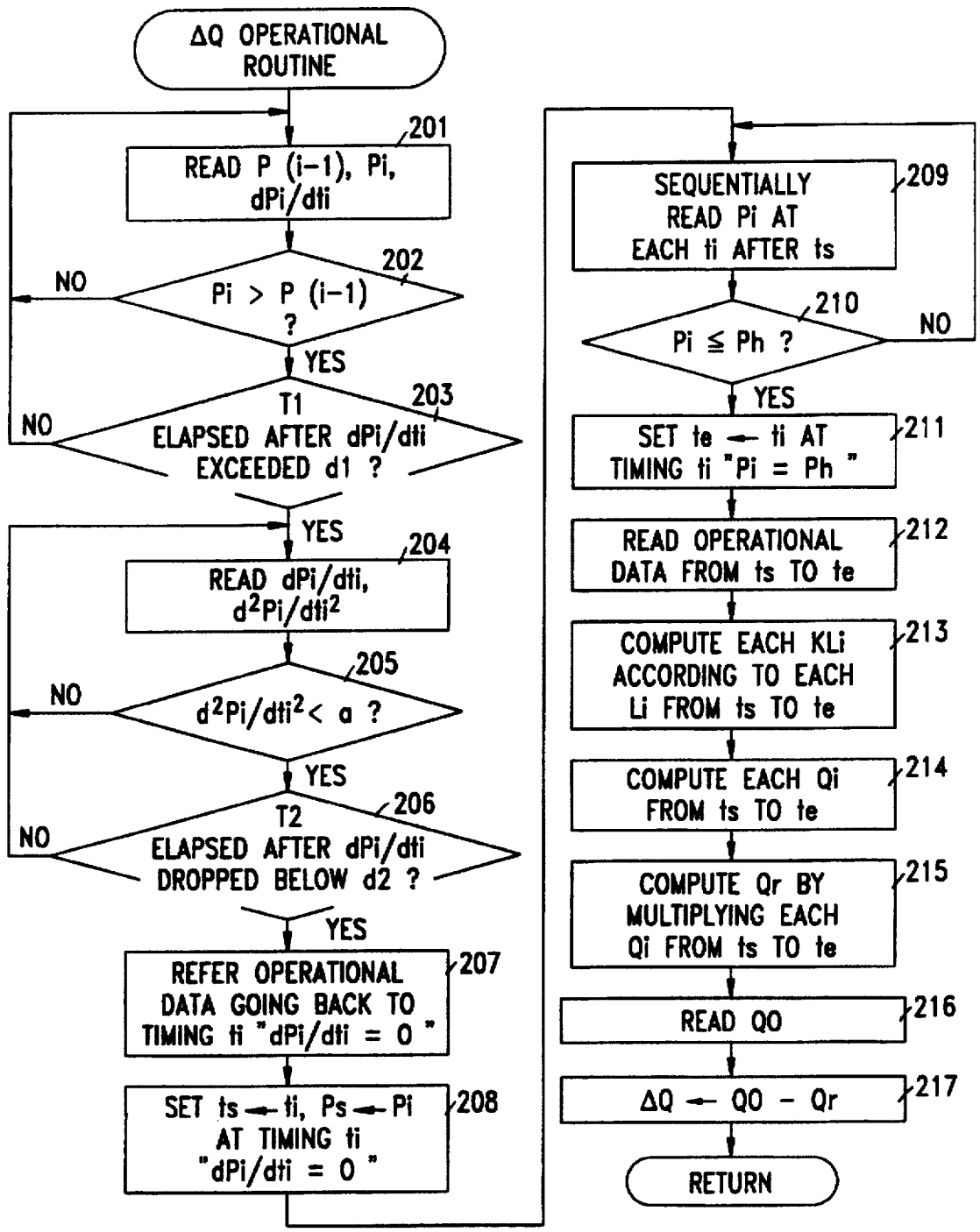

FIG. 6 shows a flowchart of another operational routine carried out by ECU 71 for computing a fuel injection deviation value ΔQ which controls the amount of fuel supplied to fuel injector 4. This routine is periodically carried out at predetermined intervals.

At the initiation of this routine, ECU 71 first reads the fuel pressure Pi corresponding to a time at ti, its first derivative value (dPi/dti), and the fuel pressure P(i−1) corresponding to the previous time t(i−1) which are stored in the RAM 83, respectively at step 201.

The ECU 71 next determines whether or not the fuel pressure Pi corresponding to timing ti is larger than the fuel pressure P(i−1) at a time corresponding to t(i−1) at step 202. When the fuel pressure Pi is not larger than the previous fuel pressure P(i−1), ECU 71 determines the fuel pressure P is not increasing, and repeats the operations of steps 201 and 202. When the fuel pressure Pi is larger than the previous fuel pressure P(i−1) at step 202, ECU 71 determines the fuel pressure P is currently increasing, and carries out the operation of step 203.

The ECU 71 at step 203 determines whether or not a predetermined reference time T1 has elapsed since the first derivative value (dPi/dti) exceeded the predetermined threshold value d1. Upon determining that the predetermined reference time T1 did not elapse since the first derivative value (dPi/dti) exceeded the threshold value d1, ECU 71 repeatedly carries out the operations of steps 201 through 203. Upon determining that predetermined reference time T1 did elapse since the first derivative value (dPi/dti) exceeded the threshold value d1, ECU 71 at step 204 determines the fuel pressure P is increasing and approaching a point when fuel injection will be initiated.

The ECU 71 next reads the first derivative value (dPi/dti) and second derivative value ($d^2Pi/dti^2$) of the fuel pressure Pi corresponding to timing ti which are stored in the RAM 83 at step 204. The ECU 71 then determines whether or not the read second derivative value ($d^2Pi/dti^2$) is smaller than the reference value α at step 205. When the second derivative value ($d^2Pi/dti^2$) is larger than reference value α, ECU 71 determines the changing rate of fuel pressure Pi has not significantly dropped, and repeats the operations of steps 204 and 205. When the second derivative value ($d^2Pi/dti^2$) is smaller than the reference value α, the ECU 71 determines the changing rate has significantly dropped during a time when fuel pressure P has increased, and carries out the operation of step 206.

The ECU 71 at step 206 determines whether or not the predetermined reference time T2 has elapsed since a time when the first derivative value (dPi/dti) dropped below a predetermined threshold value d2. If the predetermined reference time T2 has not elapsed since the first derivative value (dPi/dti) fell below the predetermined threshold value d2, ECU 71 determines that the change in the first derivative value (dPi/dti) does not call for an initiation of a new fuel injection cycle, and repeats the operations at steps 204 through 206. When the predetermined reference time T2 has elapsed since the first derivative value (dpi/dti) fell below the predetermined threshold value d2 at step 206, the ECU 71 then determines that the change in the first derivative value (dpi/dti) requires initiation of a new fuel injection originated in cycle.

The ECU 71 refers to operational data timing value ti stored in the RAM 83 for timing value ti when the derivative value (dPi/dti) is "0". (step 207)

ECU 71 sets the timing value ti as a fuel injection initiation time ts interval while at step 208, ECU71 sets the fuel pressure Pi at timing ti as the fuel injection initiating pressure Ps.

The ECU 71 sequentially reads the fuel pressure Pi at each timing interval ti after determining the fuel injection initiating time ts at step 209. Then at step 210 the ECU 71 determines whether or not the value for the fuel pressure Pi is smaller or equal to the value for the fuel injection termination pressure Ph corresponding to the predetermined fuel pressure P for the fuel injection termination time. When the fuel pressure Pi is greater than the fuel injection termination pressure Ph, the ECU 71 repeatedly carries out the operations at steps 209 and 210. On the other hand, when the fuel pressure Pi is less than or equal to the fuel injection termination pressure Ph, ECU 71 caries out the next operation. At step 211, ECU 71 sets the values for timing interval ti and the fuel pressure Pi after the fuel injection initiating time ts becomes equal to the fuel injection terminating pressure Ph at a fuel injection terminating time te.

The ECU 71 reads the operational data corresponding to each timing interval ti during a period between the fuel injection initiating time ts and fuel injection terminating time te at step 212. The ECU 71 next at step 213 computes each of lift coefficiency KLi corresponding to the cross-sectional area of opened nozzle 4 based on the corresponding lift amount of needle valve during the period between the fuel injection initiating time ts and fuel injection terminating time te (step 213). The computation for the lift coefficiency KLi is illustrated by the graph of FIG. 7 which indicates the correlation between the lift amount L of needle valve L and lift coefficiency KL.

Figure 7:
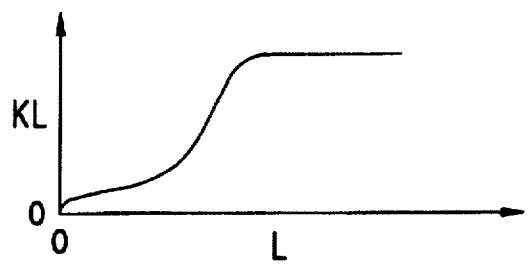
Figure 8:
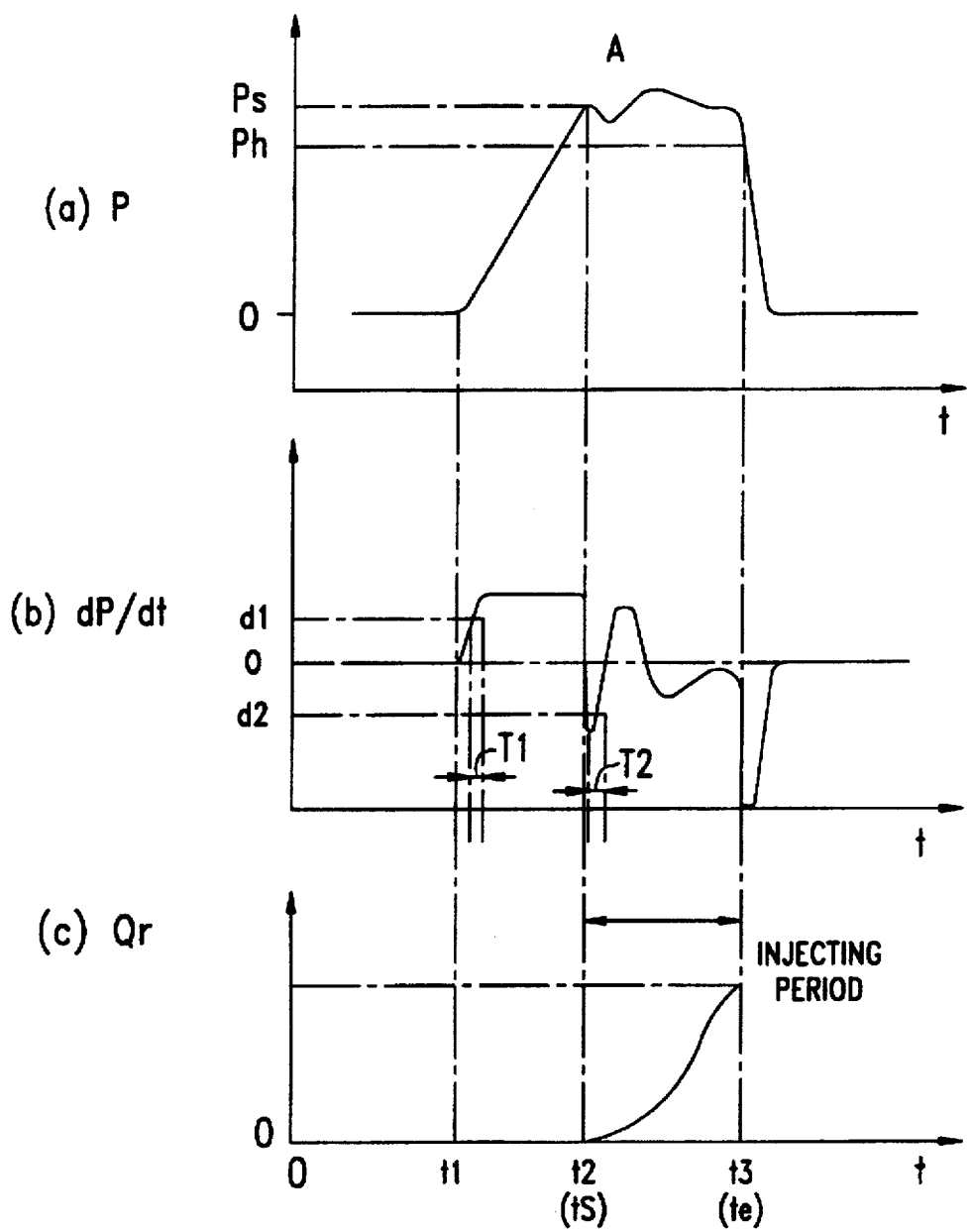

Referring to FIG. 7, the ECU 71 next at step 214 computes an amount of fuel for injection Qi (i.e., amount of fuel for injection at timing ti) according to the corresponding lift coefficiency KLi and fuel pressure Pi during the period between the fuel injection initiating time ts and the fuel injection terminating time te. The amount of fuel for injection Qi can be obtained through the following equation.

$$Qi = KLi * \sqrt{Pi}$$

ECU 71 then at step 215 computes an actual amount of injected fuel Qr corresponding to the total amount of fuel injected from the fuel injector 4 summing the value of fuel amount Qi of injected fuel at each timing ti during the period between the fuel injection initiating time ts and the fuel injection terminating time te. In other words, the ECU 71 computes an integral value of each amount Qi of injected fuel during this period.

Next at step 216, ECU 71 reads the target amount of fuel for injection Qo which was utilized in the last fuel injection amount control routine for carrying out the fuel injection operation, which will now be described.

The ECU 71 subtracts the actual amount of fuel Qr computed this time from the previous target amount Qo fuel for injection Qo. The result is set as a fuel injection deviation value ΔQ at step 217 and then terminates ΔQ routine.

Accordingly, during the ΔQ routine, ECU 71 computes the fuel injection initiating time ts and fuel injection initiating pressure Ps every time a single fuel injection operation is carried out. The actual amount Qr f fuel is computed based on data computed during the routine. The difference between the previous target amount of fuel Qo and the actual amount of fuel Qr is used as data to derive fuel injection deviation value ΔQ which itself is utilized to compensate the amount of fuel for injection for the following cycle. Those values are stored in the RAM 83.

Operations relating to a fuel injection initiating time ts, fuel injection terminating time te, fuel pressures P, first derivative value (dPi/dti) and actual amount Qr of fuel are computed using the ΔQ operational routine every time a fuel injection cycle is carried out. These operations will now be described referring to the timing chart of FIG. 8.

At the moment when a fuel injection cycle is initiated, the plunger 12 of the fuel injection pump 1 starts moving forward forcing fuel into high pressure chamber is. The change in fuel pressure over time is illustrated in FIG. 8(a). From a time t1 to t2, the fuel pressure increases linearly. As the plunger 12 moves further forward, the fuel pressure P gradually increases. At the same time, the first derivative value (dP/dt) of fuel pressure P is indicated in the graph of FIG. 8(b). Assume the reference time T1 has elapsed since the first derivative value (dP/dt) exceeded the threshold value d1 in the plus side just after the timing t1, the ECU 71 determines now is time when the fuel pressure P is in the increasing stage for initiating the fuel injection.

At time t2, there is a marked negative change in the rate of fuel pressure increase and consequently the first derivative value (dP/dt) undergoes a sharp drop. As the reference time T2 has elapsed since the first derivative value (dP/dt) dropped below the threshold value d2 in the negative side just after the timing t2, the ECU 71 determines that the change rate of fuel pressure P has definitely dropped due to initiation of fuel injection. The ECU 71 refers to the timing t2 when the first derivative value (dP/dt) becomes "0" as the ECU 71 is going back from the this determination time. The timing t2 is then obtained as a fuel injection initiating time ts. The fuel pressure at timing t2 is obtained as a fuel injection initiating pressure Ps. In other words, as shown in FIG. 8(a), the fuel injection initiating time ts corresponding to a turning point A where the increasing rate of fuel pressure P becomes for the first time from the positive to negative value, and a fuel injection initiating pressure Ps at that time.

When the fuel injection cycle has begun from timing point t2, fuel pressure P and first derivative value (dPi/dti) will change as shown in FIGS. 8(a) and (b). When the fuel pressure P reaches the fuel injection terminating pressure Ph at time t3, the ECU 71 sets the timing t3 as a fuel injection terminating time te. Therefore, the period between the fuel injection initiating time ts and fuel injection terminating time te is considered as a period when the actual fuel injection is carried out. FIG. 8(c) shows the change in the actual amount of fuel injected Qr during the injection period. The actual amount of fuel injected Qr is obtained by summing the amount of injected fuel Qi at each timing interval ti during the period between ts and te. The fuel injection deviation ΔQ is computed by taking the difference between the actual amount of fuel injected Qr and the fuel injected Qr and the target amount of fuel to be injected Qo.

Figure 9:
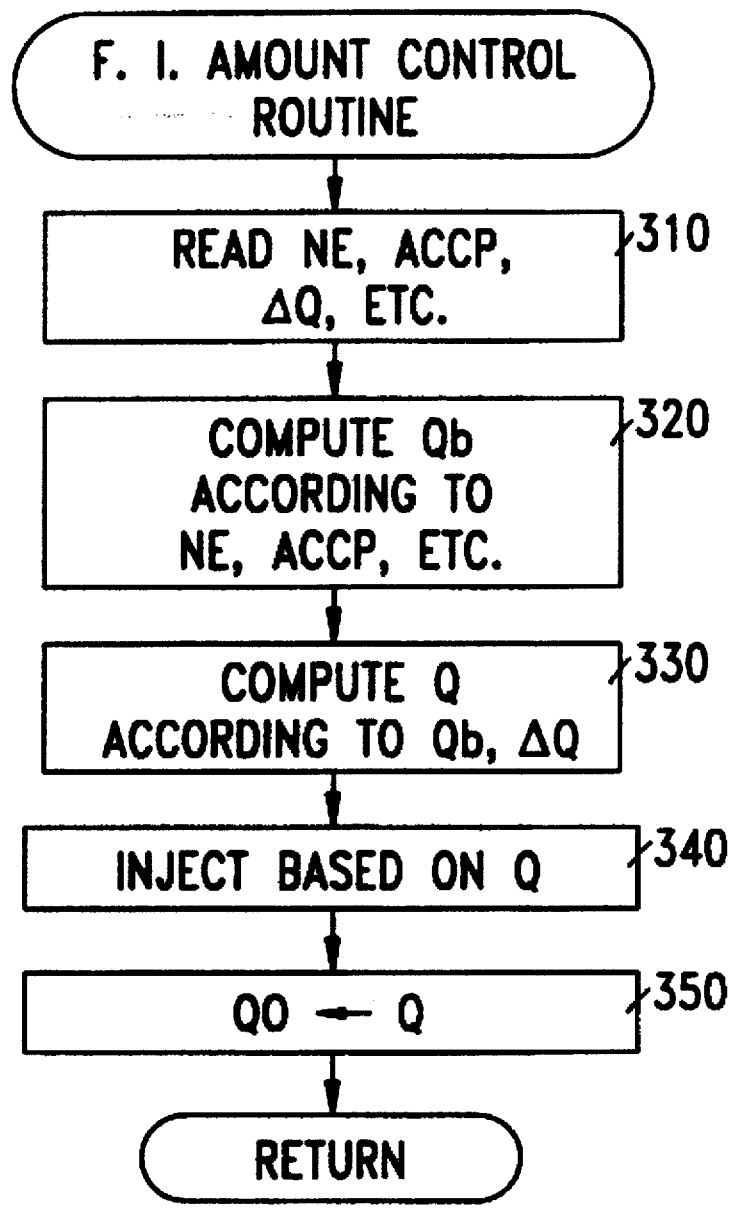

According to this embodiment, the computed fuel injection deviation value ΔQ is used by ECU 71 to monitor and compensate the ongoing control of the amount of fuel be injected into engines. FIG. 9 is a flowchart of fuel injection amount control routine which utilizes the deviation ΔQ, that is carried out by the ECU 71. This routine is periodically performed at predetermined time intervals.

When the ECU 71 initiates the operations of this routine at step 310, ECU 71 reads an engine speed NE and accelerator opening angle ACCP from the sensors 35, 73, respectively. Further, ECU 71 reads the fuel injection deviation ΔQ which was obtained through the ΔQ operational routine.

The ECU 71 at step 320 computes a reference amount of fuel for injection Qb which corresponds to the current driving condition, based on the collected engine speed data NE and the accelerator's opening angle ACCP.

Next at step 330, ECU 71 computes a target amount of fuel for injection Q for this fuel injection cycle, based on the reference amount Qb and the deviation value ΔQ. According to the present embodiment, fuel injection deviation value ΔQ is added to the reference amount Qb of fuel injection, to derive a target value for the amount of fuel Q to be injected. This derivation make use of only the latest fuel injection deviation value ΔQ detected during the last fuel injection cycle in order that a current value of ΔQ is added to the reference amount of fuel Qb for fuel injection. Possibly, a simple mean value derived from the plurality of fuel injection deviation values ΔQ obtained in the past and the latest fuel injection deviation value ΔQ could likewise be added to the reference amount Qb. Further the present embodiment envisages that the fuel injection deviation value ΔQ determined from the learned values which are based on the data of actually utilized individual fuel injection deviation values ΔQ for computing the target amount Q of fuel for injection in the past can be added to the reference amount Qb of fuel for injection.

The ECU 71 carries out the fuel injection based on the target amount of fuel to be injected Q at step 340. In so doing ECU 71 controls the pressurized fuel fed into the fuel injection nozzles 4 from the fuel injection pump 1 by controlling the electromagnetic spill valve based on the target amount Q.

The ECU 71 next at step 350 sets the target amount of fuel to be injected Q as the previous target fuel amount Qo of fuel, and terminates this routine.

As described above, according to the fuel injection amount control of this embodiment, every time the fuel injection cycle is initiated, the actual amount of fuel to be injected Qr is computed according to the fuel pressure P at the associated fuel injection nozzles 4 and to the amount of lift L of the fuel injector's needle valve. The fuel injection deviation value ΔQ is derived from the difference between the actual amount of fuel for injection Qr and target fuel amount of fuel to be injected Qo. The fuel injection cycle is next carried out based on both the new target fuel amount Q of fuel together with the fuel injection deviation value ΔQ. That is, the fuel injection control is carried out such that the actual amount of fuel injected Qr converges to the target fuel amount of fuel to be injected Q.

In view of the invention of this embodiment, despite having conditions where component parts of the fuel injection pump 1 are deformed either from long use, or from variances in manufacturing tolerances, or even despite having varying qualities or temperatures of fuel, ECU controls the actual amount of fuel for injection Qr to converge to the target fuel amount Q every time the fuel injection cycle is carried out. As a result, the fuel injection amount is controlled with a high degree of accuracy that can be steadily achieved for a longer period of time than could prior control devices of this kind.

The effect of this is that even when the lift amount of plunger 12 is affected by a change due to the wear of the cam plate 8 and roller ring 9 in the fuel pump 1, or when the predetermined open pressure of nozzle 4 is dropped or even when the fuel temperature rises in pump 1, the amount of fuel to be injected through the nozzles 4 will not be increased. Fuel injection control is achieved with a high degree of accuracy that can be adjusted according to the driving condition at any particular time. As a result, smoke generation from the engine 3 is significantly reduced, and dispersion of the exhaust gas is easily regulated and fuel efficiency can be achieved with great success.

In the current embodiment determining both the fuel injection initiation time and an accurate value for the actual amount of fuel injected Qr is accomplished using sensory input from various sources. Fuel pressure P is detected by the pressure sensors 47 disposed in the fuel injection nozzles 4. The rate of change in the increasing fuel pressure, which is to say its first derivative value, is computed as is the direction and time of its positive or negative swings. For example FIG. 8(b) shows the time when the first derivative value (dP/dt) has an initial change from positive to negative. This swing corresponds to a momentary drop of fuel pressure P due to the initiation of fuel injection. It is at this time, at point A on the graph, where the fuel pressure P is momentarily decreased during a period of generally increasing values. Fuel injection initiating time is thereby set at a time based on the change of fuel pressure and change of the first derivative value (dPi/dti).

As a result, in the diesel engine 3 with the fuel injection pump 1 and fuel injection nozzles 4, the fuel injection initiating time can be accurately computed when the fuel injection is carried out in comparison to the conventional technology, without influence from deformation of mechanical parts due to long periods of use or variations in manufacturing tolerance thereof. Therefore, the actual amount Qr of fuel injected which is utilized for the actual amount of fuel injected through the fuel injection nozzles 4 to converge to the target fuel amount Q of fuel can be accurately detected.

In this embodiment, since the fuel injection initiating time is determined through the wave form patterns of fuel pressure P and its first derivative value (dPi/dti), that the reference time T1 has elapsed since the first derivative value (dPi/dti) exceeded the threshold value d1 is determined, as described in the ΔQ operational routine of FIG. 6. In addition, that the reference time T2 has elapsed since the first derivative value (dPi/dti) dropped below the threshold value d2 is determined. Therefore, even when extraneous noise results in the detection by ECU 71 of a sight change in the wave form of fuel pressure P, those changes will not cause turning-point of A to be mis-determined. Therefore, considering the above-described matter, the determination of the fuel injection initiating time can be accurately carried out.

Furthermore, in view of this embodiment, when the actual amount of fuel to be injected Qr is computed based on the computed fuel injection initiating time, the lift coefficient KLi is computed according to the actual lift amounts Li of needle valves which are detected by the lift sensors 48 at every timing interval ti. The actual amount of fuel to be injected Qr is based in part on the computation of lift coefficient KLi and fuel pressure P. This allows the actual operations of needle valves, when the fuel is injected through the fuel injection nozzles 4, to correspond to the actual amount Qr of fuel. As a result, the actual amount of fuel to pressure P. This allows the actual operations of needle valves, when the fuel is injected through the fuel injection nozzles, 4 to correspond to the actual amount Qr of fuel. As a result, the actual amount Qr of the fuel to be injected can be accurately controlled.

Second Embodiment

The second embodiment of the present invention will now be described referring to FIGS. 10 through 13.

Figure 10:
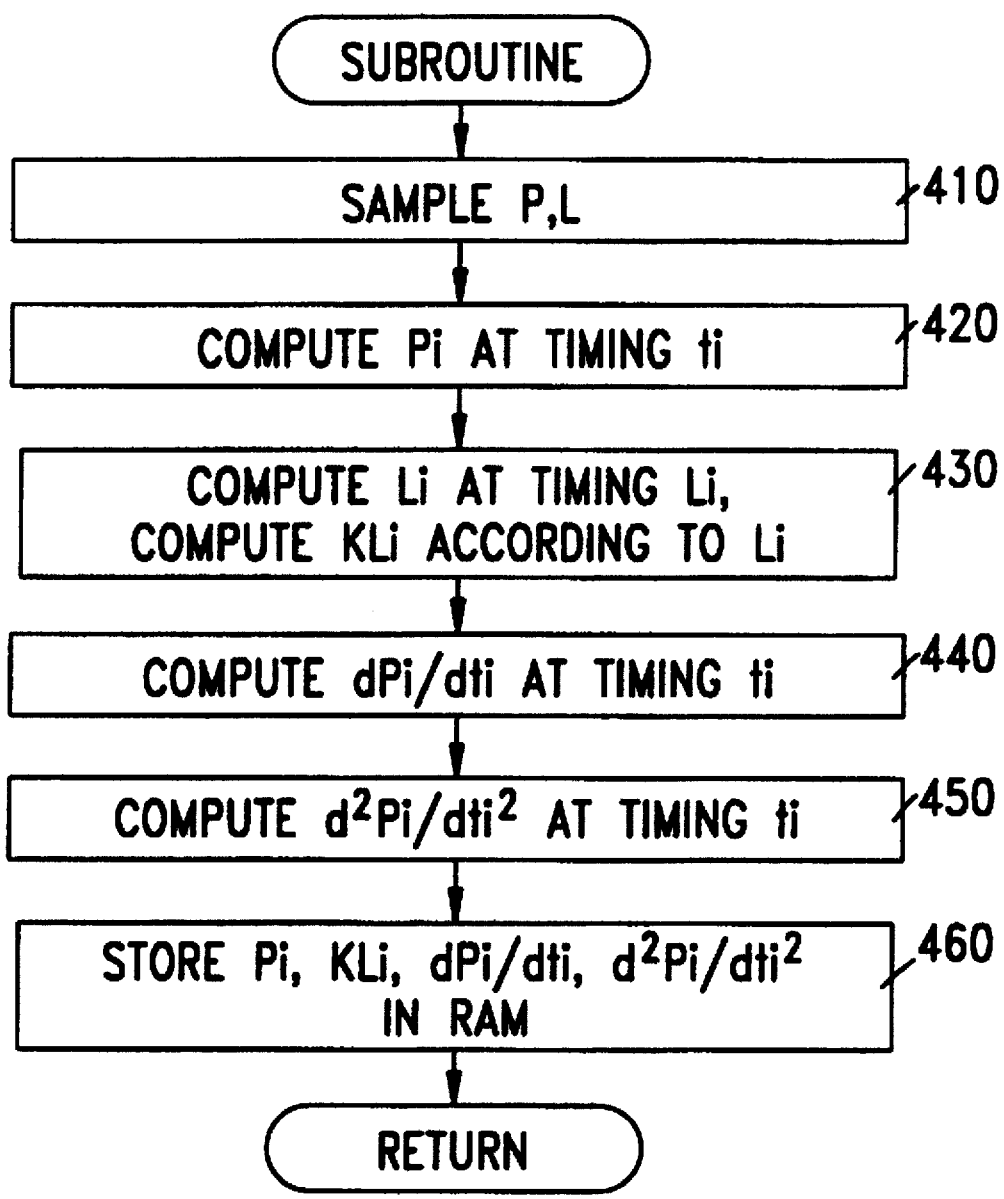

FIG. 10 is a flow chart of sub-routine which is carried out during every timing cycle ti. The timings of these cycles are provided for a timer function of the CPU 81, which in turn is one of many routines carried out by the ECU 71.

At the initiation of this routine at step 410, the ECU 71 samples the fuel pressure P and lift amount L of needle valve, based on the signals from the pressure sensors 47 and lift sensor 48. The ECU 71 next at step 420 computes a fuel pressure Pi at the timing interval ti and the lift amount Li of the fuel injector needle valve. Then, at step 430, the ECU 71 computes a lift coefficient KLi corresponding to the cross-sectional area of the fully opened fuel injection nozzle 4 using the recorded value for Li. The computation for the lift coefficient KLi is carried out referring to the graph shown in FIG. 7, similar to the first embodiment.

The ECU 71 at step 440 computes a first derivative value (dPi/dti) as the rate of change in the fuel pressure Pi at timing interval ti. Next at step 450, ECU 71 computes a second derivative value $(d^2Pi/dti^2)$ which corresponds to the rate of change in fuel pressure Pi at timing interval ti. The ECU 71 then sequentially stores values for the fuel pressure Pi, the lift coefficiency KLi, the first derivative value (dPi/dti) and the second derivative value (d²Pi/dti²) as operational data into the RAM 83 at step 460, and then terminates this routine. The ECU 71 performs this routine for every cycle of the fuel injector.

Figure 11:
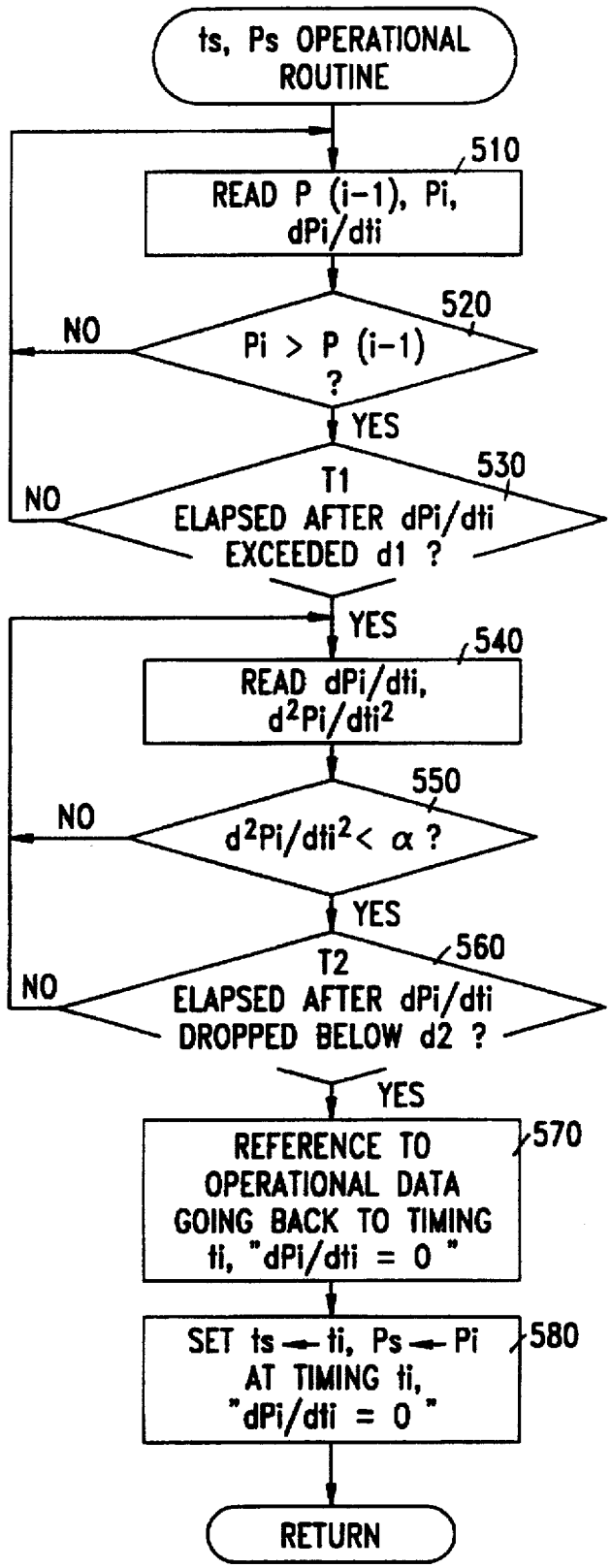

FIG. 11 shows a flowchart of a ts, Ps operational routine carried out by the ECU 71 for computing the fuel injection initiating time ts and the fuel injection initiating pressure Ps. This routine is periodically carried out at predetermined intervals. since the operations at steps 510, 520, 530,540, 550, 560, 570 and 580 are similar to those of steps 201 through 208 of the ΔQ operational routine in FIG. 6, the description here will be omitted.

Therefore, according to the ts Ps operational routine, a fuel injection initiating timing value ts and fuel injection initiating pressure Ps are computed for every cycle of fuel injection carried out and their values temporarily stored in the RAM 83.

Figure 12:
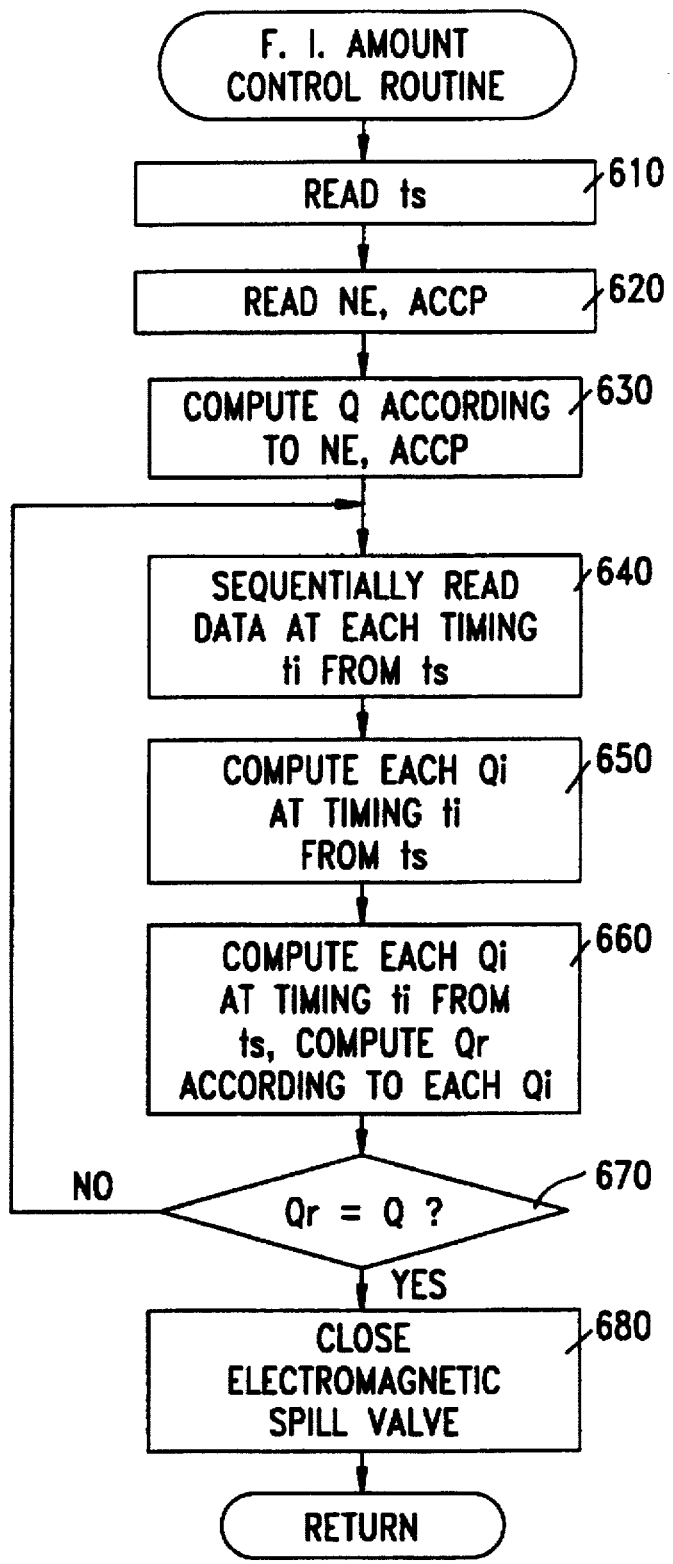

In this embodiment, the fuel injection control is carried out according to the computed the fuel injection initiating timing ts and the fuel injection initiating pressure Ps. FIG. 12 shows a flowchart of a fuel injection amount control routine carried out by the ECU 71 at predetermined intervals which utilizes the fuel injection initiating timing ts and fuel injection initiating pressure Ps.

When the ECU 71 initiates this fuel injection amount control routine at step 610, it first reads the fuel injection initiating timing ts computed through the ts, Ps operational routine (step 610). The ECU 71 then reads an engine speed NE and accelerator opening angle ACCP detected by the engine speed sensor 35 and the acceleration sensor 73 at step 620. Next at step 630, the ECU 71 computes a target fuel amount Q to be injected which corresponds to the particular driving conditions at that time based on the engine speed NE and accelerator opening angle ACCP. In this embodiment, a reference amount Qb of fuel to be injected is likewise computed based on the engine speed NE and accelerator opening angle ACCP. The target amount Q of fuel to be injected is computed by adding to value Qb an additional compensatory value of fuel computed using coolant temperature THW.

The ECU 71 at step 640 sequentially reads the operational data corresponding to each timing interval ti starting from the fuel injection initiating timing value ts to the lift coefficient KLi and fuel pressure Pi, both of which are required for computing the actual amount Qr of the fuel to be injected.

The ECU 71 computes a fuel amount Qi based on the corresponding lift coefficiency KLi and fuel pressure Pi at each timing interval ti starting from the fuel injection initiating timing at step 650. The fuel amount Qi is computed through the similar equation used in the first embodiment.

$$Qi = KLi * \sqrt{Pi}$$

Further, the ECU 71 at step 660 cumulates every fuel amount Qi computed at each timing interval ti starting with the fuel injection initiating timing ts in order to determine the actual fuel amount Qr to be injected which corresponds to total amount of fuel actually injected until this timing (step 660). In other words, the ECU 71 computes an integral value of injection amount Qi of fuel of each timing ti starting from the fuel injection initiating time ts.

The ECU 71 at step 670 determines whether or not the actual amount Qr of fuel to be injected computed for each timing interval ti starting from the fuel injection initiating time ts is equal to the target fuel amount Q. When the value of Qr does not match the value of Q, the ECU 71 determines the actual amount Qr of fuel injected has not reached the target fuel amount Q of fuel for injection, and the operations of steps 640 through 670 are repeatedly carried out. On the other hand, if Qr is equal to Q, the ECU 71 determines the actual amount Qr until the current timing ti has reached the target fuel amount Q, and thus carries out the operation of step 680.

Next at step 670, the ECU 71 de-actuates or turns the electromagnetic spill valve 23 off to terminate the transmission of pressurized fuel from the fuel injection pump 1 to the fuel injection nozzles 4. The ECU 71 then finally terminates this routine. In effect, the ECU 71 through this routine controls the current fuel injection terminating time.

Figure 13:
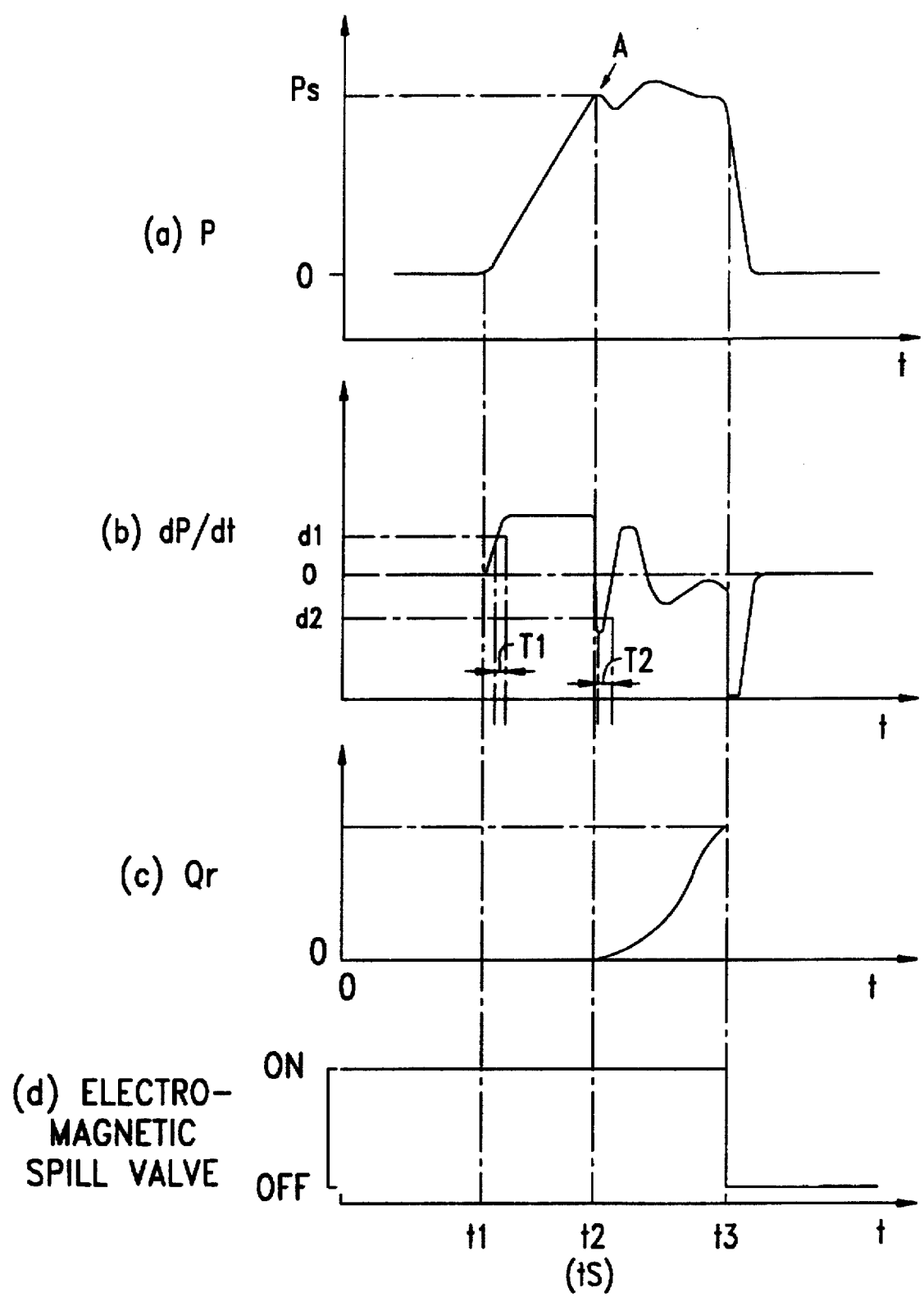

The operations of fuel injection initiating timing ts, fuel injection terminating timing te, the fuel pressure P, its first derivative value (dPi/dti), the actual amount of fuel for injection Qr, and the operation of electromagnetic spill valve 23 will now be described referring to the time chart of FIG. 13.

As the fuel injection is carried out and the plunger 12 of the fuel injection pump 1 is moved forward, the fuel pressure P is gradually increased starting from timing t1, as shown in FIG. 13(a). At the same time, the first derivative value (dP/dt) of fuel pressure P changes accordingly the graph shown in FIG. 13(b). Following reference time T1, due to the condition that the first derivative value (dP/dt) exceeds the threshold value d1 just as it had after the time t1, the ECU 71 determines the fuel pressure P is increasing and is ready for the initiation of a fuel injection cycle.

At timing t2, the fuel pressure P in the increasing stage significantly changes, its first derivative value (dP/dt) drops greatly. Following reference time T2 due to the condition that the first derivative value (dP/dt) dropped below the threshold value d2 just as it had after time t2, the ECU 71 determines that the rate of change of fuel pressure P has definitely dropped as a result of the initiation of the fuel injection cycle. The ECU 71 sets the value of t2 at a time when the value of the first derivative (dPi/dti) becomes "0" and recognizes t2 as the time ts to begin fuel injection initialization. Likewise, the fuel pressure P at time t2 is set as a fuel injection pressure Ps.

From timing point t2, the fuel injection is continuously carried with the fuel pressure P and first derivative value (dPi/dti) changing as shown in FIGS. 13(a) and (b) and with the change in the actual amount of fuel injected Qr changing as shown in FIG. 13(c). The ECU 71 computes an injection amount Qi of fuel at each timing interval ti based on the values for fuel pressure Pi and lift coefficiency KLi which are also computed at each timing interval ti beginning with the fuel injection initiating time ts. The ECU 71 accumulates the injection amounts Qi of fuel computed at each timing interval ti starting from the fuel injection initiating time ts as an actual amount Qr of the fuel.

When the actual amount Qr of the fuel reaches the target amount of fuel to be injected for any given fuel injection cycle, the ECU 71 recognizes a time t3 as the fuel injection terminating time, and causes electromagnetic spill valve 23 to change its state from ON to OFF.

As clearly described above, according to the fuel injection amount control of this embodiment, the ECU 71 computes the fuel injection cycle initiation time ts and fuel injection initiating pressure Ps every time a fuel injection cycle is carried out. Like the value for Qi, the actual amount Qr of the fuel injected is computed based on the values for the fuel pressure Pi and lift coefficient KLi which are also computed at each timing interval ti beginning with the fuel injection initiating time ts. When the actual amount Qr reaches the target fuel amount Q, the transmission of pressurized fuel from the pump 1 to the nozzles 4 is terminated. Thus, in effect, when each cycle of fuel injection is carried out, the fuel amount of fuel for injection is adjusted in the real time base such that the actual amount Qr of the fuel converges to the target fuel amount Q.

Just as with the previous embodiment, even given conditions where the construction parts of the fuel injection pump 1 either deform due to the long use or contain variations in manufacturing tolerances or even where physical characteristic of the fuel in use vary, the actual amount Qr of fuel injected is controlled to converge to the target fuel amount Q every time a fuel injection cycle is carried out. As a result, the fuel injection control with high accuracy can be steadily achieved for a long periods of time according to the driving condition at particular time, smoke generation from engine 3 can be significantly reduced, and dispersion of the exhaust gas can be regulated and fuel efficiency can be achieved.

Dispersion of fuel injection amounts and irregular fuel injection among the cylinders can be prevented by the fuel injection control of the present embodiment at each cylinder.

In this embodiment, to compute a more accurate actual amount Qr of fuel, the wave form of fuel pressure P detected by the pressure sensor 47 is computed. The ECU 71 detects when the first derivative value (dPi/dti) initially changes from positive to negative during a time of an overall increase in the fuel pressure. This value reflects the time when the fuel pressure P momentarily drops due to the initiation of fuel injection by fuel injectors 4. This time is designated in FIG. 13(A) as turning point d, which is recognized by the ECU 71 as the fuel injection initiation time t3. The ECU 71 further carries out fuel injection initialization by compensating the value of ts for the effects of outside noise etc.

Referring to FIG. 11, ECU 71 at step 530 determines that the reference time T1 has elapsed since the first derivative value (dPi/dti) exceeded the threshold value d1 based on the change in the first derivative value (dPi/dti) and the fuel pressure P. The determination whether the reference time T2 has elapsed, since the first derivative value (dPi/dti) dropped below the threshold value, d2 is made by the ECU at step 560. Utilizing the processes at steps 530 and 560 effectively allows the ECU 71 to accurately determine the fuel injection initiation time with disregard for the influence of noise on the wave form. Again this allows an accurate determination of the fuel injection initiation.

Furthermore, in this embodiment, when the ECU 71 computes the actual amount Or of the injected fuel, it does so by reference to data collected on lift coefficient KLi, needle valve lift amount Li and fuel pressure amount P corrected at every time interval ti. Therefore, the actual operations of the fuel injector needle valves during the fuel injection through nozzles 4 corresponds directly to the determination of the actual amount Qr of the injected fuel allowing amount Qr to be accurately controlled.

Third Embodiment

The third embodiment of the present invention for vehicular use will now be described referring to FIGS. 14 through 16. Components included herein which are similar to those described in the first and second embodiments will not be further discussed here.

Figure 14:
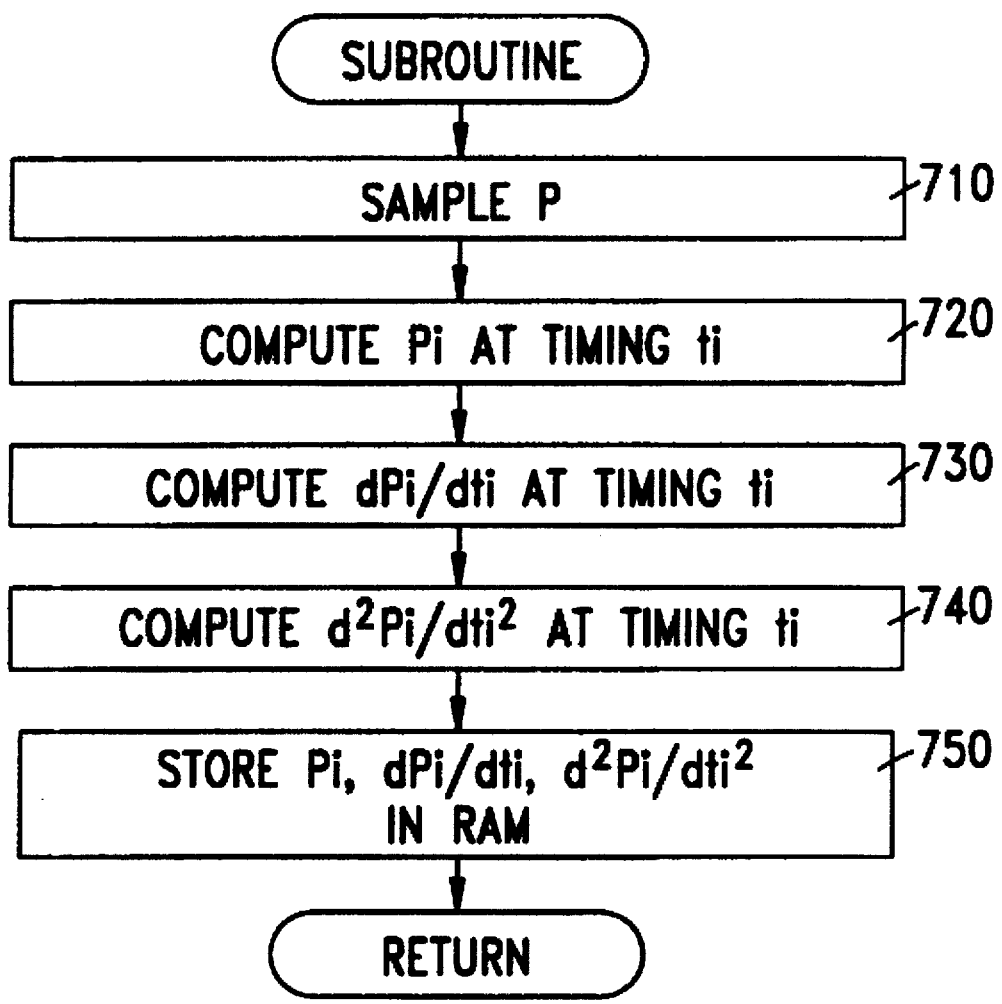

FIG. 14 is a flowchart of sub-routine ECU 71 carried out for every timing interval ti using the timing function of CPU 81.

At the initialization of this routine step 710, EPU samples the fuel pressure P and lift amount L of needle valve, based on the signals from the pressure sensors 47 and lift sensor 48. Next, at step 720, the ECU 71 computes a fuel pressure Pi at timing interval ti. Then, the ECU 71, at step 730, computes the first derivative value (dPi/dti) as a rate of change of fuel pressure Pi at timing interval ti. Following this at step 740, the ECU 71 computes the second derivative value ($d^2Pi/dti^2$) as a rate of change of fuel pressure Pi at timing interval ti.

The ECU 71 stores the fuel pressure Pi, the lift coefficiency KLi, the first derivative value (dPi/dti) and the second derivative value ($d^2Pi/dti^2$), as operational data corresponding to the timing interval ti, into the RAM 83 at step 750, and then terminates this routine.

According to the operations of the above-described sub-routine, as every single fuel injection cycle is carried out, the fuel pressure Pi, the lift amount Li of needle valve, the first derivative value (dPi/dti) and the second derivative value ($d^2Pi/dti^2$) are sequentially stored as operational data in the RAM 83.

Figure 15:
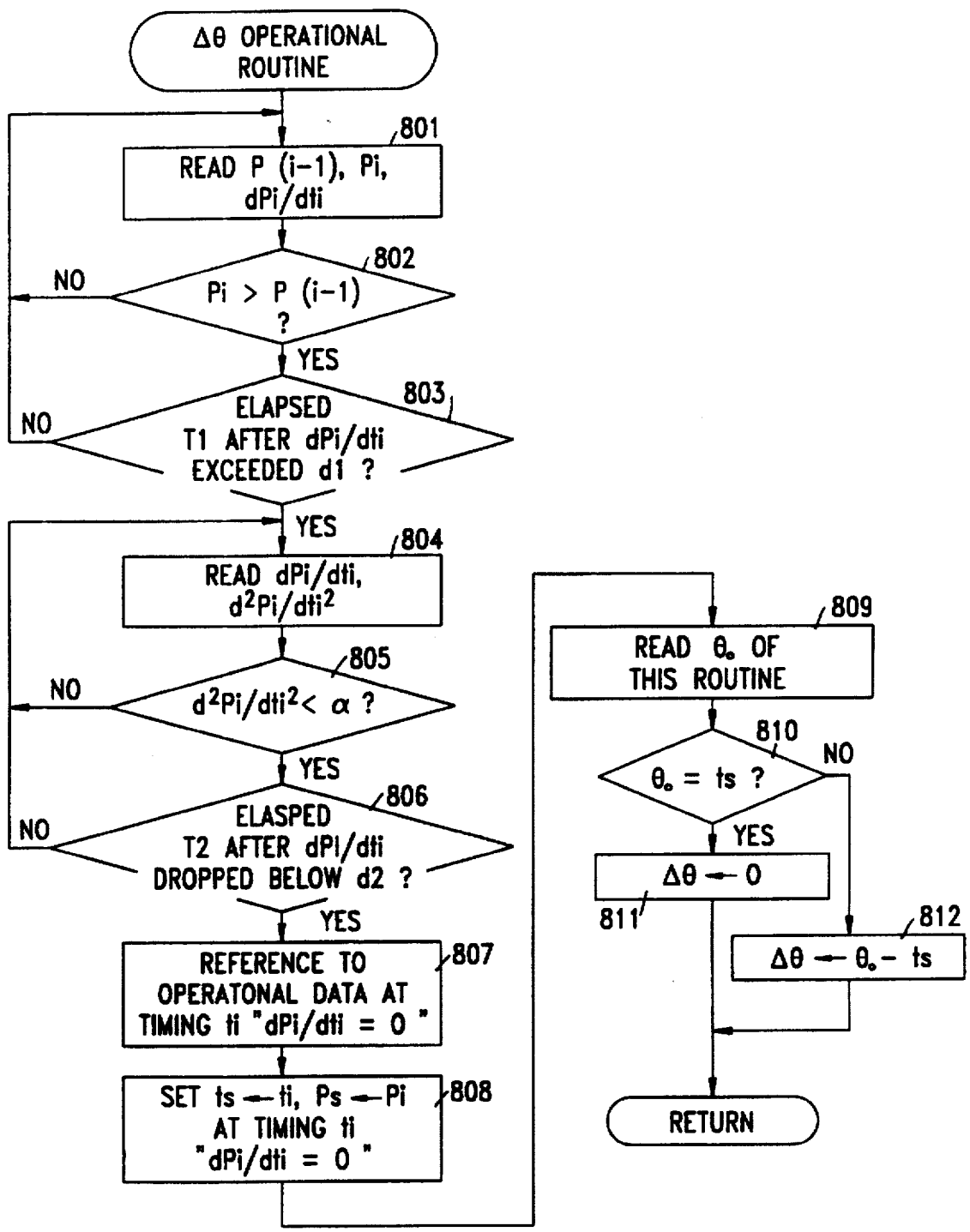
Figure 16:
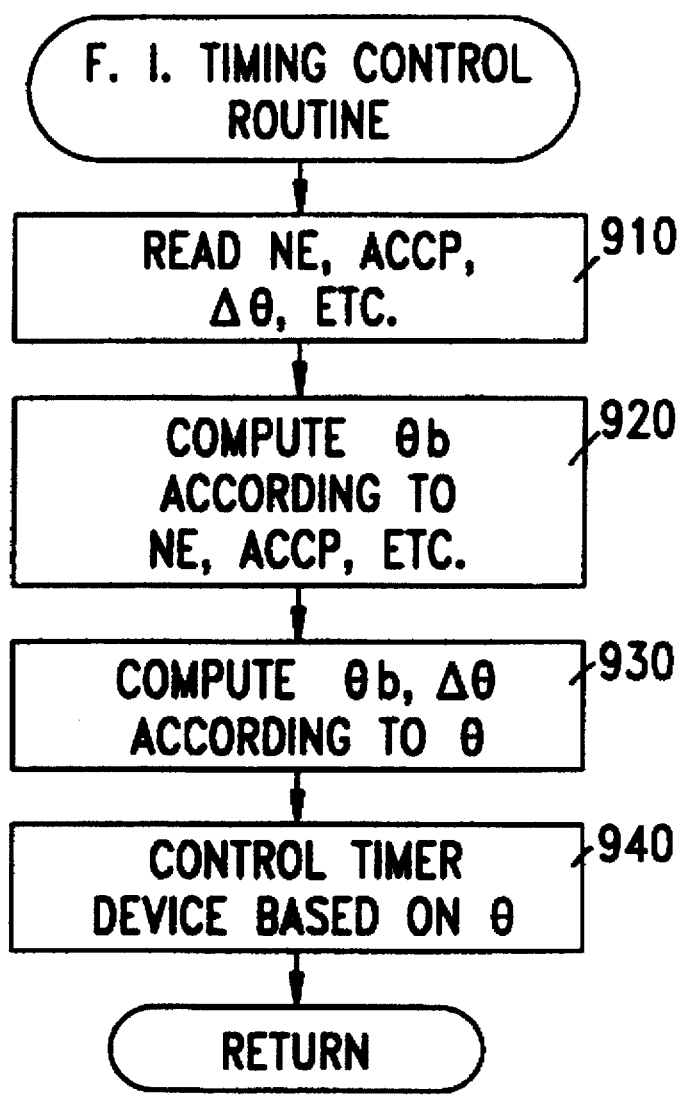

FIG. 15 shows a flowchart of operations for a $\Delta\theta$ operational routine performed by the ECU 71 which computes a fuel injection deviation value $\Delta\theta$ for controlling the amount of fuel for injection. This routine is periodically carried out by predetermined intervals. Since the operations at steps 801 through 808 in the $\Delta\theta$ routine are similar to steps 201 through 208 of the $\Delta Q$ routine described in the first embodiment, the descriptions of steps 801 through 808 will be omitted. The operations of steps 809, 810, 811 and 812 following step 808 will now be described.

Starting with step 809, the ECU 71 first reads a target fuel injection timing amount θo. This target amount value θo is acquired from current driving conditions by the $\Delta\theta$ operational routine. The ECU 71 determines whether or not the read target amount θo is equal to the fuel injection initiating time ts computed at step 810.

When the target amount θo is equal to the value of the fuel injection initiating time ts, the ECU 71 next at step 811 sets the fuel injection deviation value $\Delta\theta$ to "0" and then terminates this routine. On the other hand at step 812, when the target amount θo is not equal to the value of the fuel injection initiating time ts, the ECU 71 computes the difference between the target amount θo and fuel injection initiating time ts as a fuel injection time deviation value $\Delta\theta$, and terminates this routine. Therefore, according to the operations of this $\Delta\theta$ routine, the fuel injection timing deviation $\Delta\theta$ computed every time when a fuel injection cycle is carried out is temporarily stored in the RAM 83.

In this embodiment, the computed fuel injection timing deviation value $\Delta\theta$ is utilized as the data for carrying out the fuel injecting timing control. FIG. 16 is a flowchart of fuel injection amount control routine which utilizes the deviation $\Delta\theta$, periodically carried out by the ECU 71 at predetermined intervals.

At the initial step 910, the ECU 71 reads an engine speed NE and accelerator opening angle ACCP from the sensors 35 and 73 respectively together with fuel injection timing deviation $\Delta\theta$ obtained through the $\Delta\theta$ operational routine described earlier. The ECU 71 next at step 920 computes a reference amount θb of fuel for injection which corresponds to the current driving conditions, based on data from engine speed NE and accelerator opening angle ACCP.

At step 930, the ECU 71 computes a last target injection timing value θ as an instructional value for controlling the fuel injection, based on the reference values for fuel injection timing deviation Δθ and the injection timing value θb. The ECU 71 correlates the reference values for fuel injection timing θb and fuel injection timing deviation Δθ in order to arrive at the final target injection timing value θ. The ECU 71 next controls the timer device 26 based on the computed final target injection timing θ at step 940. Here, the ECU 71 performs a duty control on the control valve CV 33 based on the final target injection timing value θ in order to control the fuel injection timing through the fuel injection nozzles 4 in the advance angle side or retarded angle side. Following step 940, the ECU 71 terminates this routine.

As described above, according to the fuel injection timing control of this embodiment, for every fuel injection cycle, a fuel injection initiating timing value ts is computed based on the fuel pressure P. The ECU 71 computes the difference between the fuel injection initiating timing value ts and target injection timing θo at time ts in order to arrive at the fuel injection timing deviation Δθ. The final target injection timing value θ is computed by correlating the reference injection timing value θo by the fuel injection timing deviation Δθ. The fuel injection timing control is carried out based on the final target injection timing value θ. In other words, the fuel injection timing control is carried out such that the actual fuel injection initiating timing value ts converges to the target injection timing value θo.

As in previous embodiments, the fuel injection of this embodiment remains unaffected by determination of injection pump parts due to long use or variances in manufacturing tolerances or even variations in the physical characteristics of the fuel. The actual fuel injection initiating timing value ts is controlled to converge at the target injection timing value θo every time the fuel injection cycle is carried out. As a result, the ECU 71 maintains accurate fuel injection timing control despite varied driving conditions. Moreover increased nitrogen oxides (NOx) and hydrocarbon (HC) emissions and preignition knocking generated by engine 3 are significantly reduced. Likewise, the above timing control greatly reduces the discharge of white smoke while aiding in the increase of the engine's fuel efficiency. Therefore, hydrocarbon (HC) discharged from the diesel engine 3 can be reduced.

To compute the most accurate injection initiating timing value ts, the present embodiment detects the wave form of fuel pressure P from the pressure sensor 47 as well as the first derivative value (dPi/dti) of fuel pressure P which initially changes its state from positive to negative during a generally increasing fuel pressure trend. As with prior embodiments, this momentary drop in fuel pressure reflects the initiation of the fuel injection which is recognized and set by the ECU 71 as turning point A based on the change in the fuel pressure and the first derivative value.

Fourth Embodiment

The fourth embodiment of the present invention is described referring to FIGS. 17 through 20. Components included herein which are similar to those described in the first through third embodiments will not be further described here. Only those operations of fuel injection control which differ from those in the first embodiment will be discussed.

Figure 17:
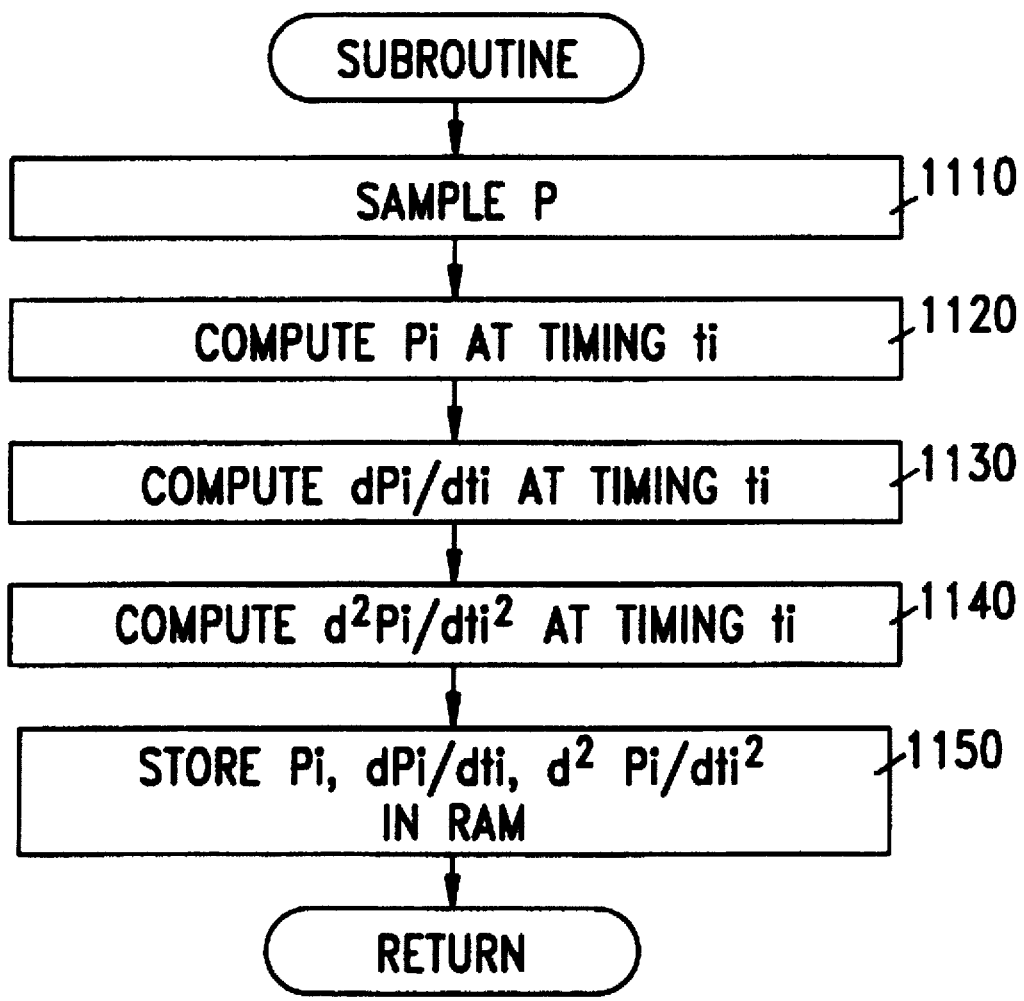

FIG. 17 is a flowchart of sub-routine which is performed by the ECU 71 for every timing interval ti. Operations of steps 1110 through 1150 are similar to those of steps 710 through 750 of the sub-routine shown in FIG. 14 and thus, their descriptions are omitted.

Therefore, according to the above-described routine, ECU 71 records fuel pressure Pi, and computes the lift coefficiency KLi, first derivative value (dPi/dti) and second derivative value ($d^2Pi/dti^2$) as operational data corresponding to timing interval ti, then next sequentially stores them in RAM 83 for every cycle of fuel injection. The ECU 71 next carries out the operations of the ts, Ps routine described in the second embodiment and more particularly in FIG. 11. Accordingly, fuel injection initiating timing value ts and fuel injection initiating pressure Ps are temporarily stored in the RAM 83 for every fuel injection cycle.

Figure 18:
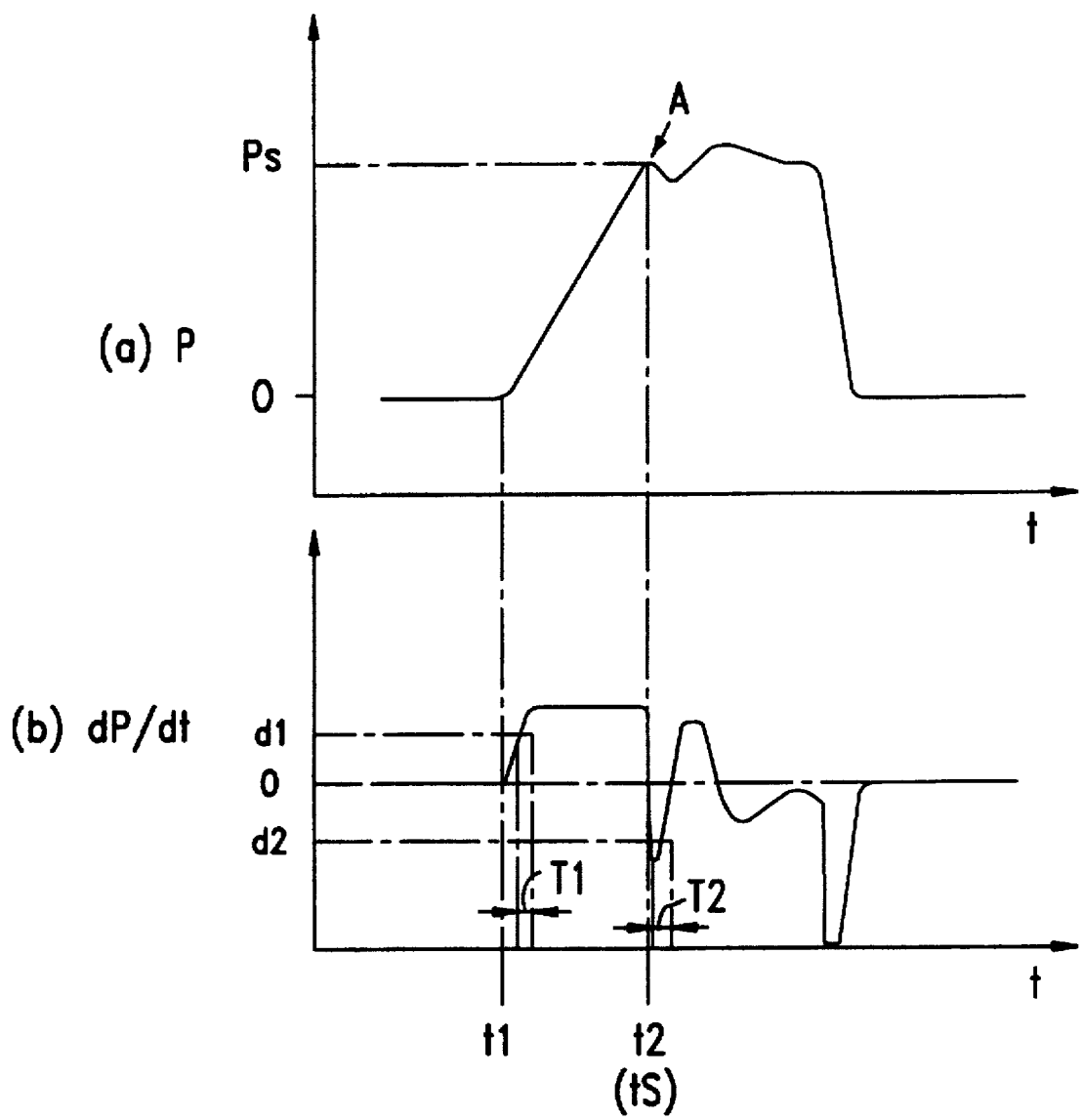
Figure 19:
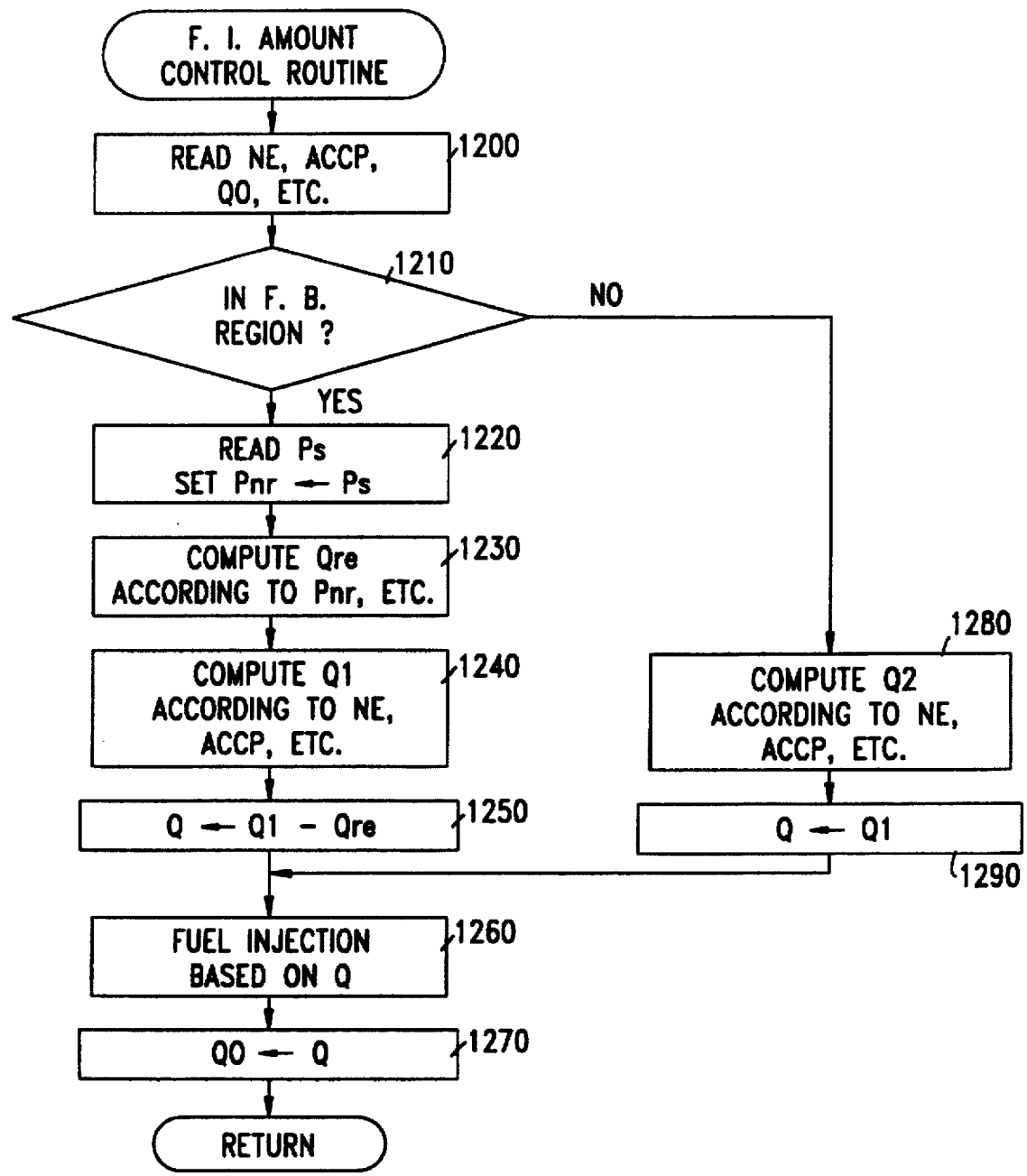

The operations of fuel injection initiating timing value ts, fuel injection initiating pressure Ps, fuel pressure P and first derivative value (dPi/dti) which are computed through the ts, Ps operational routine for each fuel injection cycle will be described referring to the timing chart of FIG. 18.

When the plunger 12 of the fuel injection pump 1 starts moving forward, as shown in FIG. 18(a), the fuel pressure P at time t1 starts increasing. As the plunger 12 moves further forward, the fuel pressure P gradually increases resulting in the change in the first derivative value (dp/dt) of the fuel pressure P indicated by the graph of FIG. 18(b). The ECU 71 determines the state when fuel injection initiation is imminent when it detects that pressure P is in a generally increasing state and when the reference time t1 elapses after the first derivative value (dp/dt) exceeds the threshold value d1 following time t1.

At the time t2, when the fuel pressure P momentarily changes, the first derivative value (dP/dt) also drops. The ECU 71 determines the drop in the first derivative at a time when the reference time T2 elapses after the fist derivative value (dP/dt) has dropped below the threshold value d2 following time t2. The ECU 71 refers to the time t2 when the first derivative value (dP/dt) becomes "0" as the ECU 71 is referred back from the this determination time. The ECU 71 then sets time t2 as a fuel injection initiating time ts and the corresponding fuel pressure as fuel injection initiating pressure Ps.

In this embodiment, the fuel injection control is carried out when the fuel injection initiating pressure Ps reaches a certain correspondence with the computed fuel injection initiating time ts. This correspondence is further explained with the injection amount control routine shown in FIG. 19 and that is carried out by the ECU 71.

At the initiation of this routine with step 1200, the ECU 71 first reads the engine speed NE and accelerator opening angle ACCP detected from the engine speed sensor 35 and the accelerator sensor 73 respectively. Also at this step, the ECU 71 reads the target fuel amount Qo for fuel injection obtained from previous fuel injection cycle.

Figure 20:
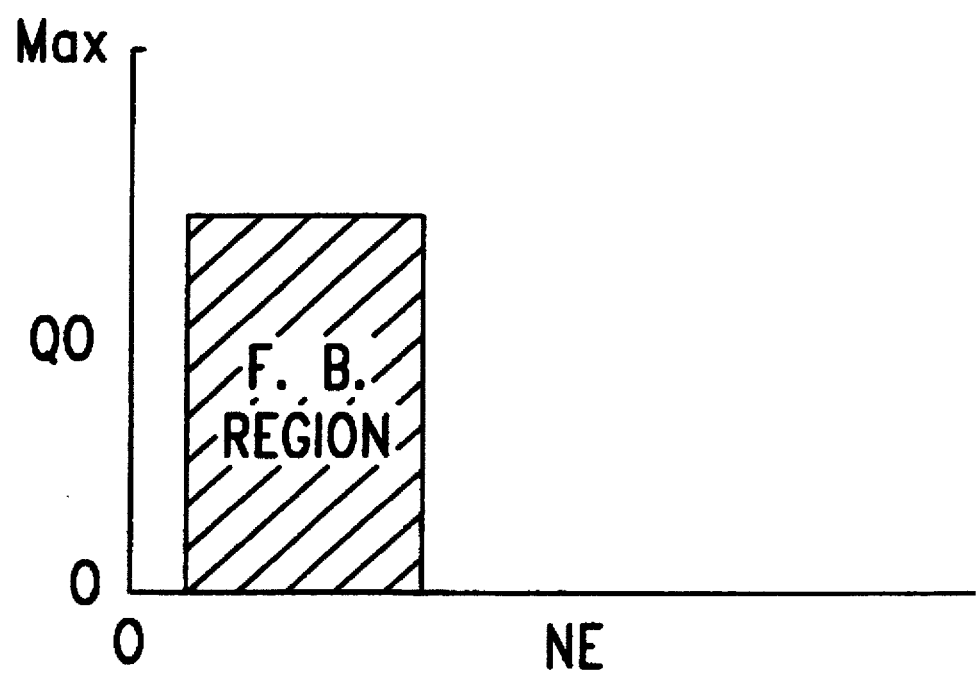

The ECU 71 next at step 1210 determines whether or not the current running condition of the diesel engine 3 is in a region where fuel injection amount feedback (FB) should be carried out. The region FB is determined by correlating values for the engine speed NE to values for previous fuel amounts Qo as shown in FIG. 20. The graph of FIG. 20 indicates that the low engine speed and the low load region is set as the FB region. When the driving condition is in the FB region at step 1210, the ECU 71 carries out the operations of steps 1220 through 1270.

At step 1220, the ECU 71 reads the fuel injection initiating pressure Ps computed and stored from the ts Ps operational routine, and sets the fuel injection initiating pressure Ps as the actual opening valve pressure Pnr at a time when the fuel injection nozzle 4 opens.

At step 1230 ECU 71 expects and computes a remaining fuel amount change value Qre which corresponds to the opening value pressure deviation ΔPn which in turn is the difference between the reference opening value pressures under normal conditions Pns, and the actual opening value pressure Pnr. This is summarized according to the following equation.

$$Qre = Vi * \epsilon * (Pns - Pnr)$$
$$= Vi * \epsilon * Pn$$

In this equation, Vi is the volume between the injection pump 1 and the injection nozzles 4 and ε is value for bulk modulus.

The ECU 71 next at step 1240 computes a target fuel amount Q1 of fuel to be injected for the current driving condition according to the engine speed NE and the accelerator opening angle ACCP. In this embodiment, a reference fuel injection amount is computed based on the engine speed NE and accelerator opening angle ACCP. An offsetting fuel injection amount is computed based on the coolant temperature THW. The target fuel amount Q1 is computed by adding the offsetting fuel injection compensation amount to the reference fuel injection amount as needed.

At step 1250, the ECU 71 subtracts the remaining fuel amount change value Qre from the target fuel amount Q1, and sets the result as a target fuel injection amount Q for the next fuel injection cycle. That is, the amount of fuel to be injected is computed by subtracting the remaining fuel amount change value Qre in the fuel system from the target fuel amount Q1 with the difference being set by ECU 71 as the new target fuel injection amount Q.

The ECU 71 next carries out fuel injection based on the new computed target fuel amount Q at step 1260. In effect, the ECU 71 controls the transmission of pressurized fuel form the fuel pump 1 to the nozzles 4 by controlling the electromagnetic spill valve 23 based on a new offset target fuel amount Q. Finally at step 1270, the ECU 71 sets the offset target fuel amount Q as a previous target fuel injection amount Qo and terminates this routine. In this way, the fuel injection control is maintained under driving conditions representative of those in the FB region.

For driving conditions not in the FB region, the ECU 71 moves from step 1210 to step 1289. Here the ECU 71 computes the target fuel amount Q1 to be injected corresponding to the engine speed NE and accelerator opening angle ACCP at step 1280. The ECU 71, next at step 1290, sets the computed target fuel amount Q1 as an offset target fuel amount Q and then moves to step 1260. Following this, the ECU 71 carries out the operations of steps 1260 and 1270, and then terminates this routine, and thereby controls the fuel injection amount under driving conditions not within the FB region.

Stated differently, according to the present embodiment, when driving conditions are within the FB region, the remaining fuel amount change value Qre, computed in the previous fuel injection cycle and based on the opening valve pressure Pnr of nozzles 4, is used to offset the target fuel amount Q1 which should be actually injected. Then, the fuel injection is carried out. The remaining fuel amount change value Qre is subtracted from the target fuel amount Q computed according to current driving conditions with the difference being set as a target fuel injection amount.

Therefore, every time when the fuel injection cycle is carried out, the remaining fuel amount change value Qre is computed based on the pressurized fuel amount which is delivered from the fuel pump 1 to the nozzles 4. Further, the influence of change value Qre is removed. Therefore, even when the actual opening valve pressure in the nozzles 4 are changed due to longer period of usage, the predetermined amount of fuel is injected into each one of the cylinders of the engine 3 without requiring any change at the fuel injector thereof. In other words, the fuel injection amount control is carried out without any influence from changes in the actual opening valve pressure Pnr of the nozzles 4. Further, in this embodiment, the fuel injection amount from the nozzles 4 is controlled to correspond to actual driving condition.

As a result, the fuel injection amount can be sufficiently controlled by reference to the changes of opening valve pressure Pnr without providing the special means for adjusting the opening value pressure in the nozzles 4. This embodiment makes use of no special means for adjusting the opening valve pressure for the nozzles 4, but does however simplify the design of the controller and eliminate any special control program required for the means.

Therefore, the fuel injection initiating time ts is, as in the previous embodiment, determined according to the change of the fuel pressure and change in the first derivative value (dPi/dti), at the time of turning point A where the fuel injection initiation pressure is Ps. As a result, the actual opening valve pressure Pnr in the nozzles 4 is accurately computed thereby allowing the remaining fuel amount change value Qre and the offset target fuel injection amount Q to be accurately computed.

Fifth Embodiment

The fifth embodiment of the present invention is described referring to FIGS. 21 through 25. Components included herein which are similar to those described in the first through forth embodiments will not be further described here. Only those operations of the fuel injection control which differ from those in the fourth embodiment will be discussed herein.

In this embodiment, in addition to having the ECU 71 detect the opening valve pressure Pnr in the fuel injection nozzles 4, the ECU 71 also detects an actual remaining pressure value Pcr in the high pressure chamber 15 of fuel injection pump 1 when the fuel injection is not being carried out. Referring to FIG. 2, the pump 1 includes the constant pressure delivery valve 36. The correlation between the stroke of plunger 12 and the pressure increase in the high pressure chamber 15 is changed, resulting from the change of the spring constant due to the long period of usage. As a result, the remaining fuel amount change value Qre may be influenced. Therefore, in this embodiment, the fuel injection amount control in which the remaining pressure Pcr is further considered with respect to the change value Qre is carried out.

Figure 21:
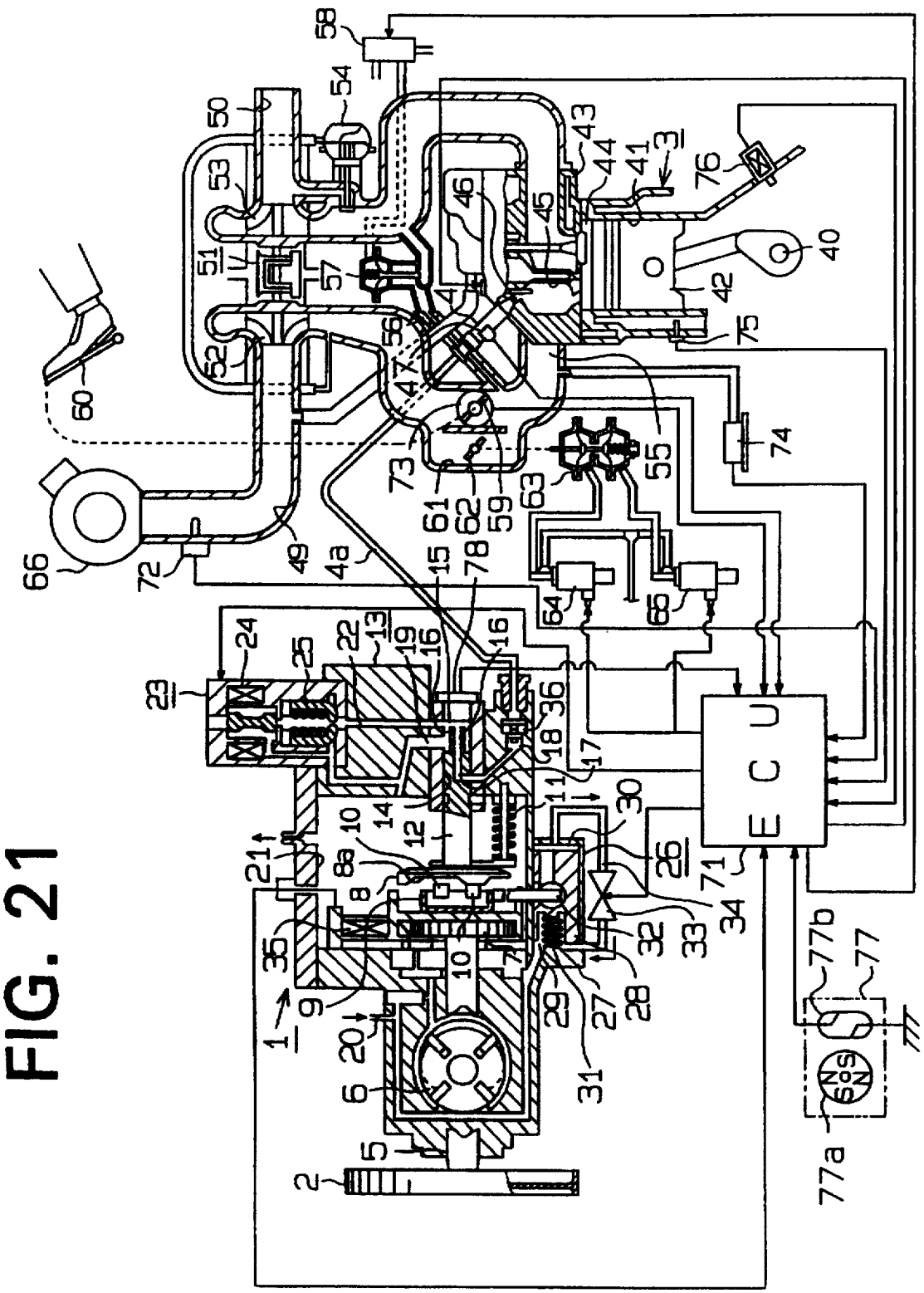

FIG. 21 shows a schematic view of the diesel engine system with supercharger. As shown in FIG. 21, in this embodiment, the pressure sensor 78 is disposed in the pump housing 13, which detects pressure in the high pressure chamber 15. The pressure sensor 78 detects the pressure Po in the high pressure chamber 15, and outputs a signal which corresponds to the magnitude of the detected value. The sensors 72 through 77, the engine speed sensor 35, the pressure sensors 47 and 78 are all connected to the ECU 71. Further, the ECU 71 preferably controls the electromagnetic spill valve 23, the TCV 33, the glow plugs 46, the EVRV 58 and the VSV's 64, 65, based on the signals from the sensors 35, 47, 72 through 78.

The operations of fuel injection amount control which are carried out by the ECU 71 will now be described referring to FIGS. 22 through 25.

Figure 22:
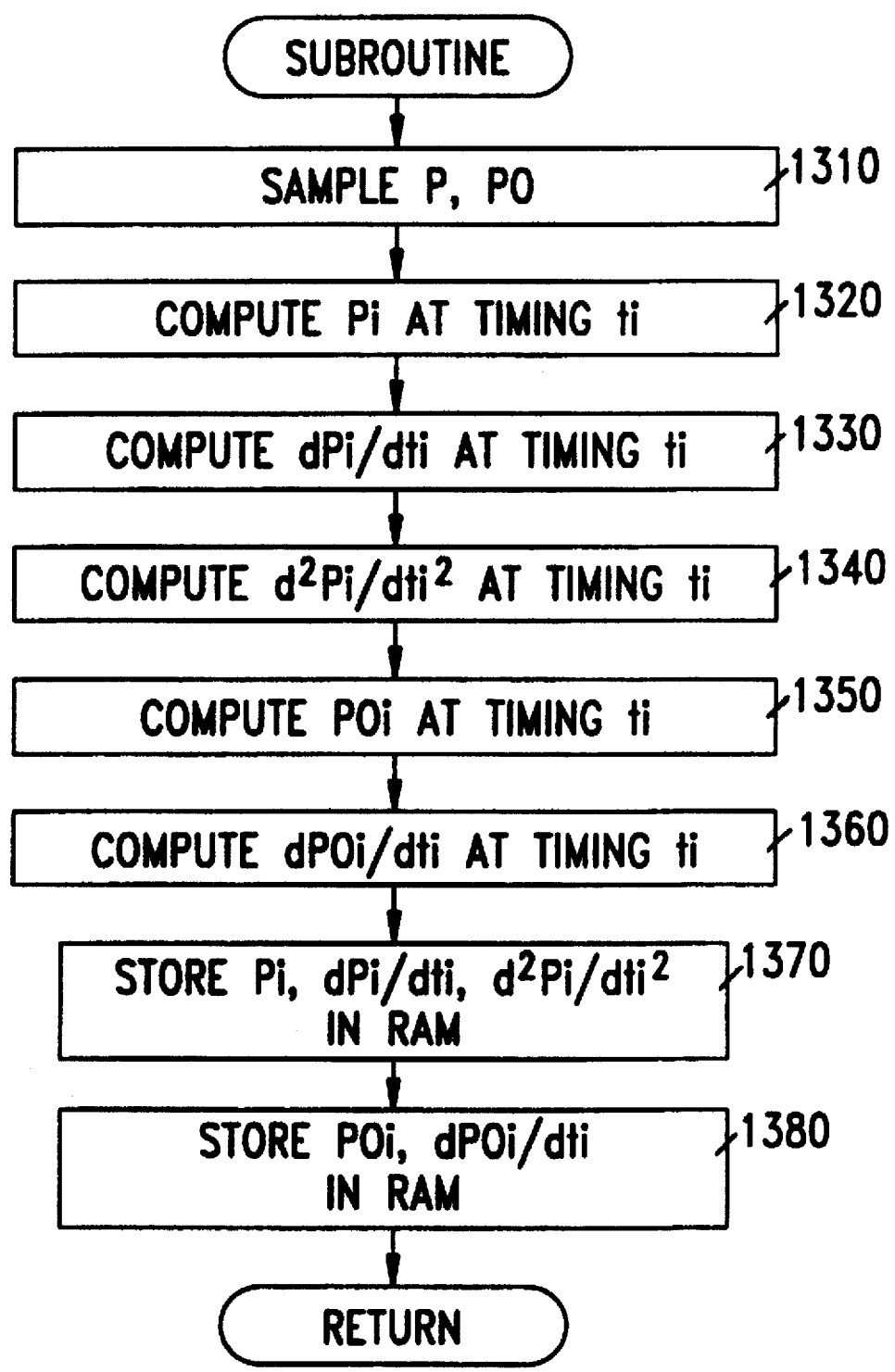

FIG. 22 is a flowchart of sub-routine carried out by ECU every timing cycle ti.

At the initial step 1310 of this routine, the ECU 71 samples the fuel pressures P, Po, based on the signals from the pressure sensors 47, 78, respectively.

At step 1320, the ECU 71 computes the fuel pressure Pi at the timing interval ti, and, then at step 1330, computes the first derivative value (dPi/dti) as a rate of change in the fuel pressure Pi also at the timing interval ti (step 1330). The ECU 71 further computes the second derivative value ($d^2Pi/dti^2$) at step 1340 as the rate of change in the fuel pressure Pi at timing interval ti. Next, the ECU 71 computes pressure Po at the timing interval ti at step 1350. At step 1360, the EPU 71 computes the first derivative value (dPoi/dti) as a rate of change in the pressure Po at timing interval ti. The ECU 71 at step 1370 stores the fuel pressure Pi, first derivative value (dpi/dti) and second derivative value ($d^2Pi/dti^2$) as operational data corresponding to timing interval ti into the RAM 83. Finally, the ECU 71, at step 1380, stores the pressure Po and its first derivative value (dPoi/dti) as the operational data corresponding to the timing interval ti into the RAM 83 and then terminates the routine.

In this embodiment, the ECU 71 computes the fuel pressure of the fuel injection initiating time ts similarly to the description of ts in the fourth embodiment and in particular by the routine illustrated in FIG. 11. The operations of this computation is similar to the operations of the ts, Ps operational routine which are shown in the flowchart of FIG. 11. Therefore, the descriptions of those operations are omitted.

Figure 23:
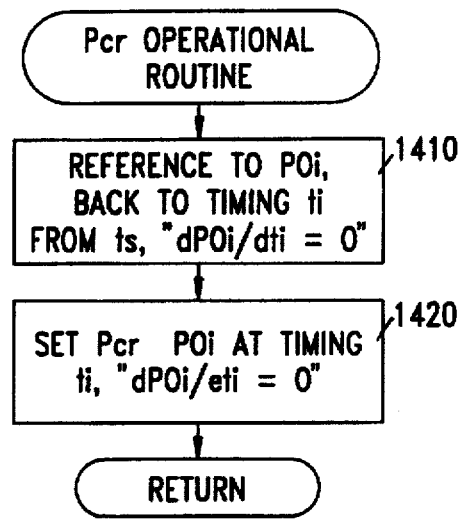

FIG. 23 is a flowchart of Pcr operational routine carried out by the ECU 71 for computing the remaining pressure Pcr. This routine will be carried out whenever the fuel injection initiating time ts is computed using the ts, Ps operational routine. The routine begins at step 1410 when the ECU 71 refers to the pressure Poi of the operational data stored in the RAM 83 while the ECU 71 goes back to the timing ti from the fuel injection initiating time ts, when the first derivative value (dPi/dti) of the pressure Poi becomes "0" (step 1410). The pressure Poi at the timing interval ti, when the first derivative value (dPoi/dti) becomes "0", corresponds to the pressure in the state just before the plunger 12 is to move forward.

At step 1420, the ECU 71 sets the pressure Po at timing interval ti, when the first derivative value (dPoi/dti) becomes "0", as the remaining pressure value Pcr. The value PCR corresponds to the pressure Po in the non-injection time. Following this, the ECU 71 terminates the routine.

Figure 24:
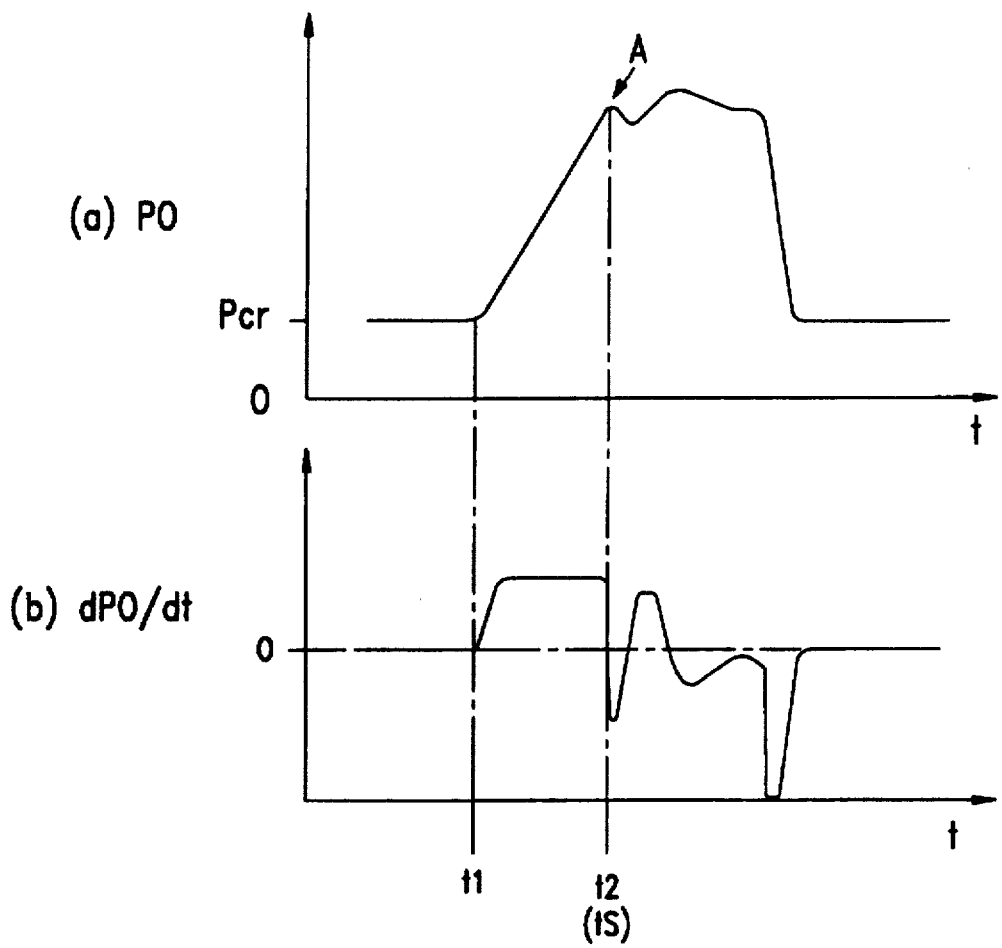

The operations of the pressure Po and its first derivative value (dP0/dt) will now be described referring to the timing chart of FIG. 24. In FIG. 24, when the timing interval t2 is set as the fuel injection initiating time ts, the timing interval t1 when the first derivative value (dP0/dt) becomes 0 is computed while the ECU 71 goes back from the fuel injection initiating time ts. Therefore, the pressure P0 at timing ti is computed as the remaining pressure Pcr.

However, the high pressure chamber 15 and the fuel injection nozzles 4 form a single fuel system. Therefore, the behavior of the high pressure P0 is similar to that of the fuel pressure P where the absolute values thereof differ one form another. Similarly, the behavior of the first derivative value (dP0/dt) of the pressure P0 is similar to that of the first derivative value (dP/dt) of the fuel pressure.

Therefore, according to the Pcr operational routine, the remaining pressure Pcr is temporarily stored into the RAM 83 every time a fuel injection cycle is carried out.

Figure 25:
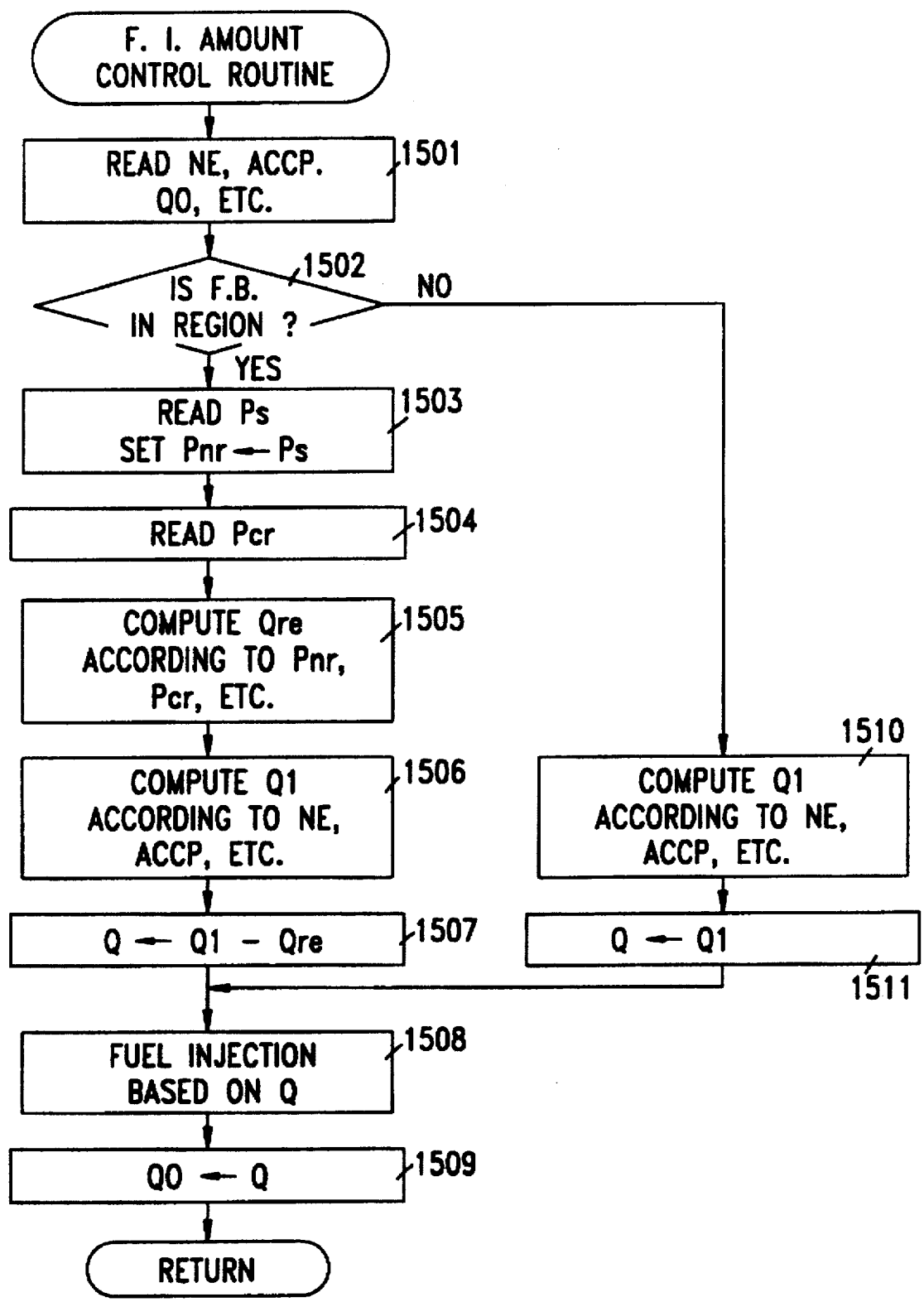

In this embodiment, the computed fuel injection initiating pressure Ps and the actual remaining pressure Pcr are used in the fuel injection control routine as illustrated by the flowchart of FIG. 25. The operations of the fuel injection amount control routine according to this embodiment are fundamentally similar to those of FIG. 19 described above in the fourth embodiment. Therefore, only the different portions of computation relating to the remaining fuel change value Qre in steps 1504 and 1505 will be described.

When the driving condition of the diesel engine 3 is determined by the ECU 71 to be in the FB region, the actual remaining pressure Pcr computed through the Pcr operational routine in step 1504 is read.

In step 1505, the remaining fuel change value Qre which should be adjusted to reflect the difference between the actual valve pressure Pnr and the actual remaining pressure Pcr is considered and computed using following equation:

$$Qre = Vi * \epsilon * (Pns - Pnr) - Vi * \epsilon * (Pcs - Pcr)$$
$$= Vi * \epsilon * \Delta Pn - Vi * \epsilon_c * \Delta Pc$$
$$= Vi (\epsilon * \Delta Pn - \epsilon_c * \Delta Pc)$$

In this equation, the newly described $\epsilon c$ is the bulk modulus of fuel at the vicinity of the actual remaining pressure Pcr. Pcs is given as a reference remaining pressure value as a pressure P0 in the high pressure chamber under the normal condition when the fuel injection is not carried out.

Therefore, in the equation described above, the fuel remaining fuel Mount change value Qre in the fuel system is computed, based on the opening valve pressure deviation $\Delta Pn$ and the actual opening valve pressure Pnr. $\Delta Pn$ corresponds to the difference between the reference opening pressure Pns and the actual opening valve pressure Pnr, while $\Delta Pc$ corresponds to the difference between the reference pressure deviation $\Delta Pcs$ and the actual remaining pressure Pcr.

As described above, when the condition of the engine 3 is in the FB region, control of the fuel injection is carried out with the remaining fuel amount change value Qre being used to offset the target fuel amount Q1 required to be injected. In other words, the remaining fuel change value Qre for the previous injection cycle is to be computed, based on both the actual opening valve pressure Pnr in the nozzles 4, and the actual remaining pressure Pcr in the pump 1. The fuel injection control is carried out, based on the offset target fuel amount Q which was computed by subtracting the remaining fuel change value Qre from the target fuel amount Q1.

Therefore, similar to the operations of the fourth embodiment, the fuel injection amount control is carried out without any influences of the actual opening valve pressure Pnr in the nozzles 4. In addition, even when the actual remaining pressure Pcr in the pump 1 is changed from the reference remaining pressure Pcs due to the change of the delivery valve 36, perhaps due to long periods of use, the predetermined amount of fuel will be injected through the nozzles 4 without influence from any change in the actual remaining pressure Pcr in pump 1.

As a result, the amount of fuel to be injected is controlled with respect to the change of actual opening valve pressure Pnr despite extended periods of use and without having originated in the long period of any special means for adjusting the opening value pressure in the nozzles 4.

For the other operations and effectiveness of this embodiment, those achieved in the fourth embodiment are likewise realized by this embodiment.

Sixth Embodiment

Figure 26:
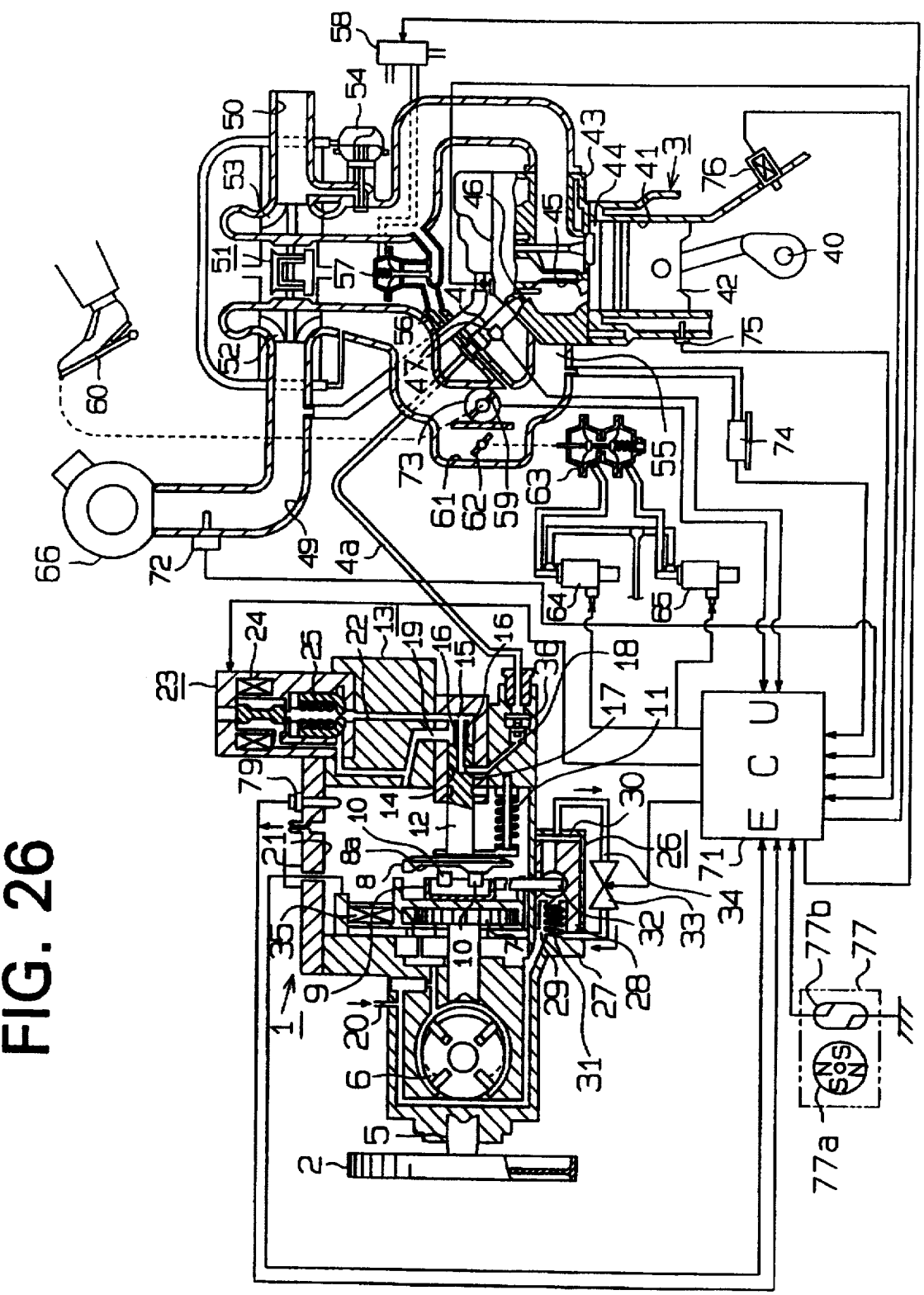
Figure 27:
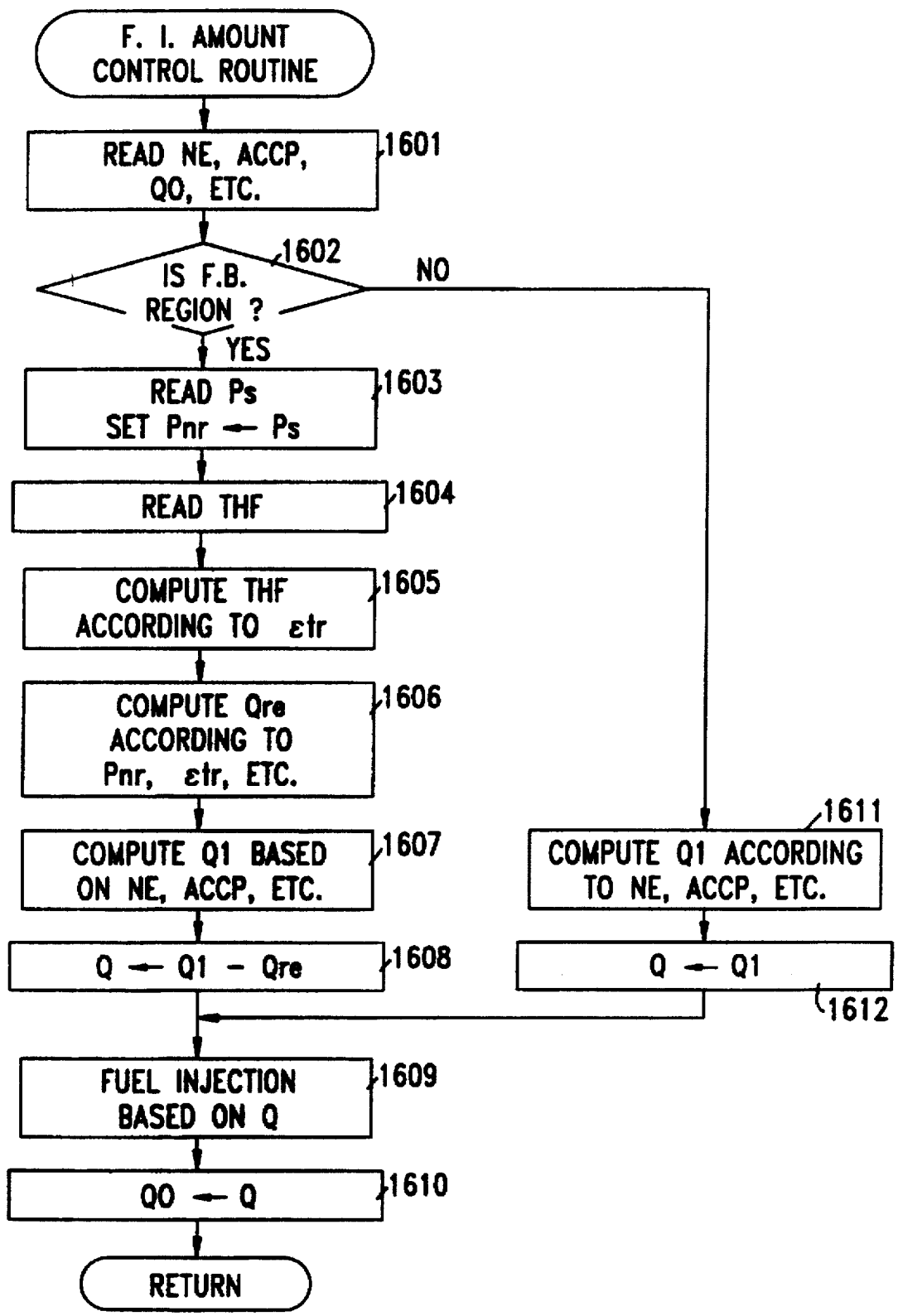
Figure 28:
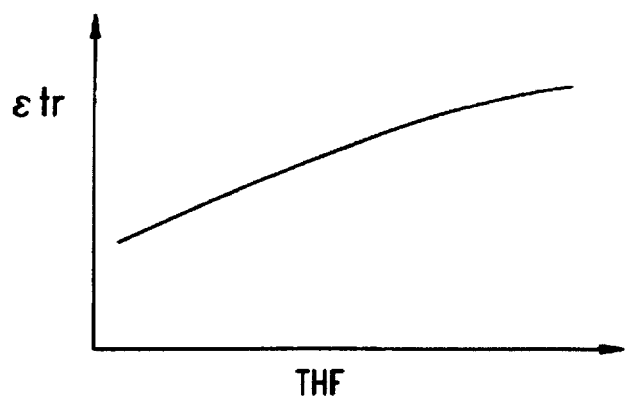
Figure 29:
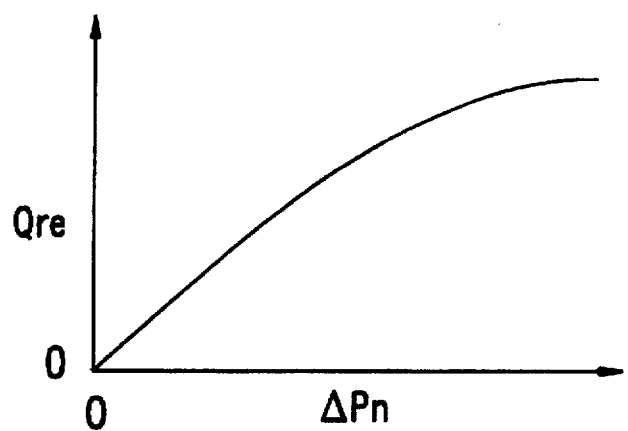
FIGS. 29 through 32 describe a further embodiment of the invention with reference to the fourth and sixth embodiments.

The sixth embodiment of the present invention is described referring to FIGS. 26 through 28. Components included herein which are similar to those described in the first through fifth embodiments will not be further described here. Only those operations of fuel injection control which differ from those in the fourth embodiment will be discussed.

In this embodiment, the fuel temperature THF in the fuel injection pump 1 is detected in addition to the detection of the actual opening valve pressure Pnr in the fuel injection nozzles 4. In the pump 1, the remaining fuel change value Qre may be changed due to varying bulk modulus, which result from changing fuel temperature conditions. Therefore, fuel injection control is carried out utilizing the value for fuel temperature THF in correspondence with the remaining fuel change value Qre.

FIG. 26 is a schematic view of a diesel engine with supercharger according to this embodiment. As shown in FIG. 26, the fuel temperature sensor 79 is disposed in the pump housing 13 in the pump 1. The sensor 79 detects the temperature of fuel filled in the fuel chamber 21, i.e. temperature THF, and then outputs a signal according to the magnitude of the detected value. The sensors 72 through 77, the engine speed sensor 35, the pressure sensor 47 and fuel temperature sensor 79 provide data to the ECU 71 which in turn controls the electromagnetic spill valve 23, TCV 33, glow plugs 46, EVRV 58 and VSV's 64 and 65.

The operations of ECU 71 according to the present embodiment will now be described referring to FIGS. 27 through 28.

The ECU 71 computes the fuel pressure of the fuel injection initiating time ts which is utilized for the fuel injection control in a fashion similar to that described in the fourth embodiment; specifically the ts Ps operational routine illustrated in the flowcharts of FIGS. 17 and 11. Therefore, while descriptions of those operations are omitted, particular detail will be given to the remaining fuel change value Qre.

In the sixth embodiment, the fuel injection initiating time ts and fuel injection initiating pressure Ps are computed, based on the fuel pressure P detected by the sensor 47.

FIG. 27 shows a flowchart of the fuel injection amount control routine carried out by ECU at predetermined intervals which utilizes the fuel injection initiating pressure Ps and fuel injection initiating pressure Ps.

In as much as the operations of steps 1604, 1605, 1606 differ from previous embodiments their descriptions follow. When the driving condition of the diesel engine 3 is in the FB region, the fuel temperature THF is read according to the signal from the sensor 79 at step 1604. The bulk modulus of fuel at the fuel temperature THF, i.e., the actual bulk modulus coefficiency $\epsilon_{tr}$, is computed based on the fuel temperature THF read at step 1605. This operation for computing the actual bulk modulus coefficiency $\epsilon_{tr}$ carried out by ECU 71, is done by correlating the values between the fuel temperature THF and the actual bulk modulus coefficiency $\epsilon_{tr}$, as shown in FIG. 28.

In step 1606, the remaining fuel change value Qre which is changed according to the difference between the actual opening valve pressure Pnr and the actual bulk modulus coefficient $\epsilon_{tr}$, is then computed by the ECU 71. This computation for the actual bulk modulus coefficient $\epsilon_{tr}$, is carried out through the following equation.

$$Qre = Vt*(\epsilon_{ts}*Pns - \epsilon_{tr}*Pnr)$$

In this equation, the newly described $\epsilon_{ts}$ is the reference bulk modulus fuel coefficient at the reference fuel temperature THF.

In this equation, the remaining fuel change value Qre is computed based on the difference between a first value being the opening valve pressure Pns compensated by the reference bulk modulus coefficient $\epsilon_{tr}$ and a second value being the actual opening valve pressure Pnr compensated by the actual bulk modulus coefficiency $\epsilon_{tr}$.

Given engine conditions within the above described F8 region, fuel injection is carried out while the remaining fuel amount change value Qre is used to offset the target amount Q1 of fuel of fuel to be injected. That is, the remaining fuel change value Qre for the previous injection cycle is to be computed based on the actual opening valve pressure Pnr in the nozzles 4 and the actual bulk modulus fuel coefficient err which varies according to the fuel temperature THF in the pump 1 at any given fuel injection cycle. The fuel injection control is further based on the compensated target fuel amount Q which was computed by subtracting the remaining fuel amount change value Qre from the target fuel amount Q1.

Therefore, similar to the operations of the fourth embodiment, the fuel injection amount control is carried out without any influences of the actual opening valve pressure Pnr in the nozzles 4 in this embodiment. Even when the actual bulk modulus coefficient $\epsilon_{r}$ of fuel is changed from the reference bulk modulus coefficient $\epsilon_{tr}$, the predetermined amount of fuel is injected from the nozzles 4 without influence from the changes in fuel temperature, i.e., from the actual bulk modulus coefficient $\epsilon_{tr}$ of fuel.

As a result, the changes of the opening valve pressure in the nozzles 4 due to long periods of use or changes in actual bulk modulus coefficient $\epsilon_{tr}$ can be adjusted without providing the special means for adjusting the opening valve pressure in the nozzles 4.

For the other operations and effectiveness of this embodiment, those achieved in the fourth embodiment can be realized in this embodiment.

Seventh Embodiment

Figure 33:
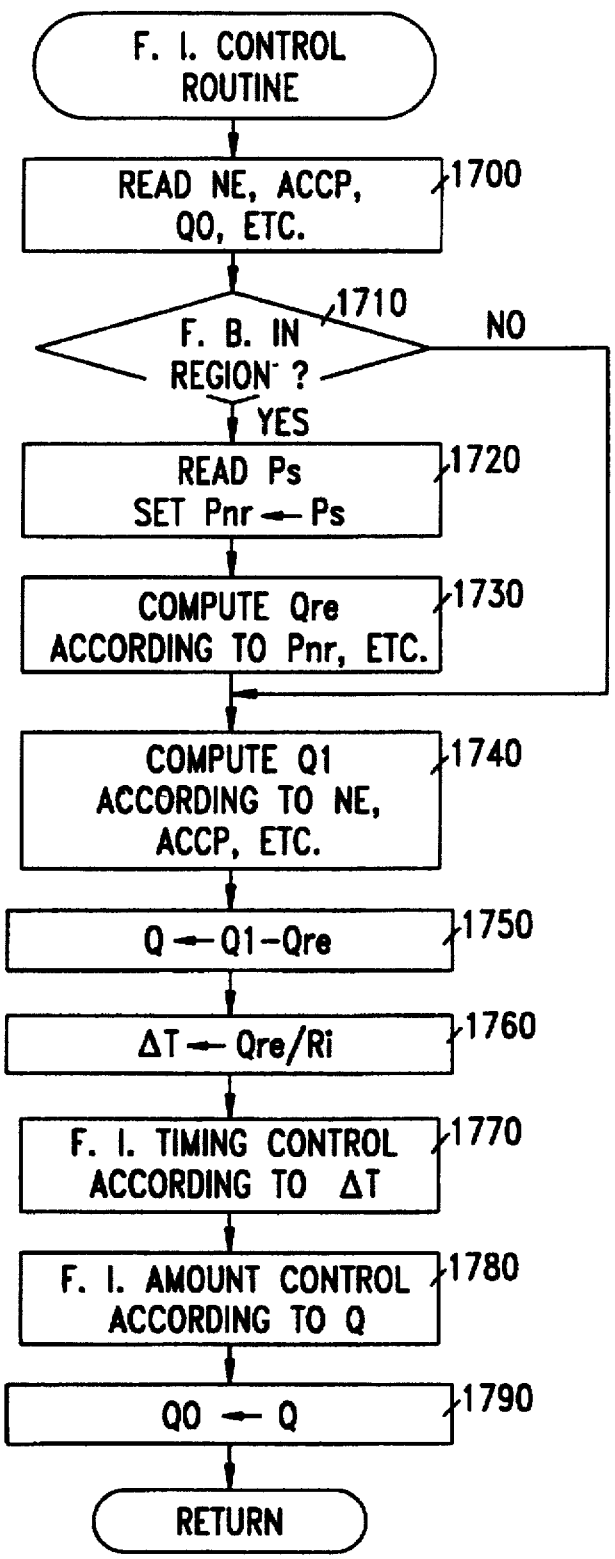
FIG. 33 is a flowchart showing the operations of a control routine governing the amount of fuel to be injected into the fuel injector according to a seventh embodiment.

The seventh embodiment of the present invention is described referring to FIG. 33. Components included herein which are similar to those described in the first through fifth embodiments will not be further described here. Only those operations differences differing from those in the fourth embodiment will be emphasized and described below.

The operations of this computation of ECU 71 according to this embodiment is similar to the operations of the ts, Ps operational routine and sub-routine which are shown in the flowcharts of FIGS. 17 and 11 of the fourth embodiment. The fuel injection initiating time ts and fuel injection initiating pressure Ps are computed, respectively, based on the fuel pressure P detected by the fuel sensor 47.

FIG. 33 shows a flowchart of the fuel injection control routine which utilizes the fuel injection initiating pressure Ps as one routine carried out by the ECU 71 at the predetermined intervals.

At step 1700, the ECU 71 first reads the engine speed NE and the accelerator opening angle ACCP by means of the engine speed sensor 35 and the accelerate sensor 73, respectively. Additionally, the ECU 71 reads the target fuel amount Qo utilized in the immediately prior injection cycle.

The ECU 71, next at step 1710, determines whether or not the current running condition of the diesel engine 3 is in the region where the fuel injection amount feedback (FB) should be carried out. This determination is carried out by reference to the correlation between the engine speed NE shown in FIG. 20 and the previous target fuel amount Q. When the driving condition is in the FB region, the ECU 71 carries out the operations of steps 1720 and 1730.

The ECU 71, at step 1720, reads the stored fuel injection initiating pressure Ps which was computed in the ts Ps operational routine and then sets the fuel injection initiating pressure Ps as the actual opening fuel value pressure Pnr in nozzles 4 at the valve opening time.

Next, the ECU 71, at step 1730, computes a change of value for the remaining fuel change amount Qre according to the change in the actual opening valve pressure Pnr. The remaining fuel change value Qre is arrived at by the following equation.

$$Qre = Vi * \epsilon * (Pns - Pnr)$$
$$= Vi * \epsilon * \Delta Pn$$

Here, the remaining fuel change value amount Qre is computed based on the difference (i.e., opening valve deviation value ΔPn) between the reference opening valve pressure Pns and the actual opening valve pressure Pnr in nozzles 4. Further, the ECU 71 monitors the fuel injection amount and fuel injection timing through the nozzles 4.

When, as in step 1710, the engine's driving condition is not in the FB region, the ECU 71 moves to step 1740 from step 1710.

At step 1740 the ECU 71 computes the target fuel amount Q1 of fuel corresponding to current driving conditions, based on engine speed NE and the accelerator opening angle ACCP. A further reference fuel injection amount is computed also based on the engine speed NE and the accelerator opening angle ACCP, etc. Next, the ECU 71 computes the target fuel amount Q1 for injection by adding an offset fuel injection amount, determined according to coolant temperature THW, to the reference fuel injection amount.

Further, the ECU 71 subtracts the latest remaining fuel amount change value Qre from the target fuel amount Q1 and sets the result as a compensated target fuel amount Q for the next fuel injection cycle. In other words, the compensated target fuel amount Q corresponds to a fuel amount which is computed by subtracting the remaining fuel change value Qre in the fuel system from the target fuel amount Q1. Q, in turn, is computed according to the driving condition of the diesel engine 3. When the driving condition is in the FB region, the remaining fuel change amount Qre is utilized in the above-described subtraction. When the driving condition is not in the FB region, the previously detected remaining fuel change value Qre is utilized.

The ECU 71 divides the latest remaining fuel change value Qre by the pump injection rate Ri, and sets the result of division as the target fuel injection timing control value ΔT at step 1760. The pump injection rate Ri is a unique constant value corresponding to the pump 1, which is a previously experimentally determined value. When the driving condition is in the FB region, the remaining fuel injection change value Qre will be utilized in the divisional computation. When the driving condition is not in the FB region, the previously detected value for the remaining fuel injection change value Qre is utilized following the process at step 1730.

The ECU 71 next carries out the fuel injection timing control at step 1770 by controlling the timing device 26, based on the target fuel injection timing control value ΔT set in step 1760. In other words, the ECU 71 performs a duty control on the TCV 33 according to the target fuel injection timing control value ΔT in order to control the fuel injection timing through the nozzles 4 toward either the advance angle side or retreat angle side.

Following this, the ECU 71, at step 1780, carries out the fuel injection control according to the compensated target fuel amount Q, i.e., the electromagnetic spill valve 23 is controlled based on the compensated target fuel amount Q. Delivery of pressurized fuel from the pump 1 to the nozzles 4 is thereby controlled. ECU 71 next at step 1790 sets the compensated target fuel amount Q as the previous target fuel amount Qo and terminates this routine.

Accordingly, when the driving condition of the diesel engine 3 is in the FB region, the remaining fuel change value Qre in the fuel system is used as an offset value to the actual target fuel injection timing control value ΔT as well as to the target fuel amount Q1. In other words, at the time when fuel injection is to be carried out, the latest remaining fuel change value Qre is computed according to the actual opening valve pressure Pnr in the nozzles 4. Qre is divided by the value for the pump injection rate Ri with the quotient being set as the target fuel injection timing control value ΔT. The fuel injection timing is controlled to the either an advance angle side or the retreat angle side, based on the target fuel injection timing control value ΔT. Separately, the result of subtraction of the remaining fuel injection change value Qre from the target fuel amount Q1 is set as the compensated target amount Q. The fuel injection is carried out based on the compensated target fuel amount Q.

For the other operations and effectiveness of this embodiment, those achieved in the fourth embodiment can be realized by this embodiment.

Eighth Embodiment

Figure 34:
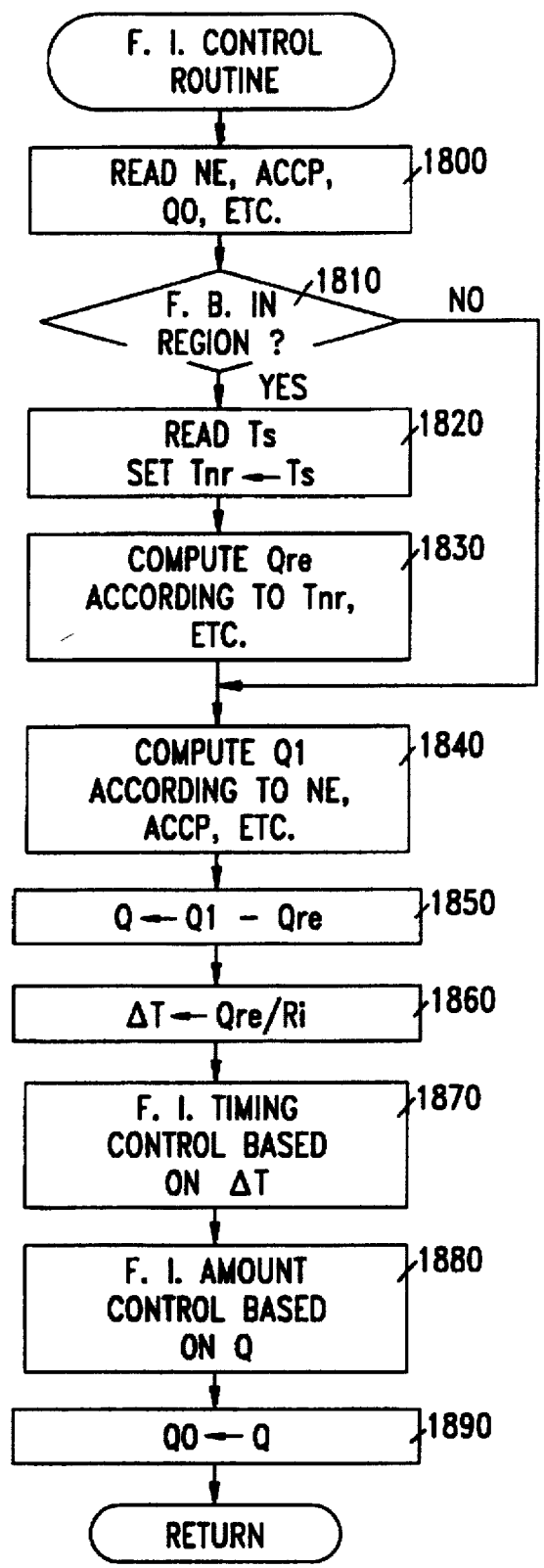
FIG. 34 is a flowchart of the eighth embodiment showing the operations of a control involving engine speed and the opening angle of an accelerator valve to control the amount of fuel injected by the fuel injectors.

The eighth embodiment of the present invention will now be described referring to FIG. 34. Components included herein which are similar to those described in the first through fifth embodiments will not be further described here. Only those operations of fuel injection control which differ from those in the fourth embodiment will be discussed.

In this embodiment, fuel injection control is accomplished utilizing the fuel injection initiating timing value ts computed in the seventh embodiment. FIG. 34 shows a flowchart of the fuel injection amount control routine periodically carried out by the ECU 71 at predetermined intervals which utilizes the fuel injection initiating timing ts.

The ECU 71 first at step 1800 detects the engine speed NE and the accelerator opening angle ACCP by means of the engine speed sensor 35 and the acceleration sensor 73, respectively. Further, the ECU 71 reads the target fuel amount Qo which was utilized in the previous cycle.

The ECU 71, next at step 1810, determines whether or not the current running condition of the diesel engine 3 is in the feedback (FB) region. This determination is carried out similarly to that described in the seventh embodiment. When the running condition is in the FB region, the operations of steps 1820 and 1830 are carried out.

The ECU 71 then reads the fuel injection initiating time ts at step 1820 computed by means of the ts. Ps operational routine and stored in Ram 83. The ECU 71 next sets this fuel injection initiating time ts as the actual fuel injection initiating time when the fuel injection nozzles 4 were opened, that is, the actual opening valve timing tnr.

Next at step 1830, the ECU 71 computes the change value Qre of the remaining fuel which is adjusted for actual computed opening valve timing tnr. The remaining fuel change value Qre will be computed through the following equation.

$$Qre = X * (tns - tnr)$$
$$= X * \Delta tn$$

In this equation, the X is an offset coefficient and tns is a reference opening valve time when the nozzles 4 are operating under normal conditions (i.e. in the FB region). Therefore, in the above-described equation, the remaining fuel change value Qre in the fuel system is expected and computed, based on the opening value deviation Δt between the reference opening time tns and the actual opening valve time tnr. The remaining fuel change value Qre in the fuel system is changed according to the change in the actual opening valve time tnr.

On the other hand, when the running condition is not in the FB region at step 1810, the ECU 71 carries out the operation of step 1840. There ECU 71 computes the target fuel amount Q1, corresponding to current driving conditions, and based on the engine speed NE and accelerator opening angle ACCP, similar to those of step 1740 described in the seventh embodiment. The fuel injection timing control and the fuel injection amount control are carried out based on the remaining fuel change value Qre computed in step 1830 in steps 1850 through 1890, similar to those operations of steps 1750 through 1790 in the seventh embodiment.

In other words, in this embodiment, the opening valve timing deviation Δtn is utilized in place of the opening valve pressure deviation ΔPn in the seventh embodiment. Since the remaining fuel change value Qre is computed in this manner, the similar operations and effectiveness to the those of the seventh embodiment can be achieved.

Ninth Embodiment

The ninth embodiment of the present invention will now be described referring to FIGS. 36 through 40. Only those operations differing from those in the fourth embodiment will be emphasized and described.

Figure 36:
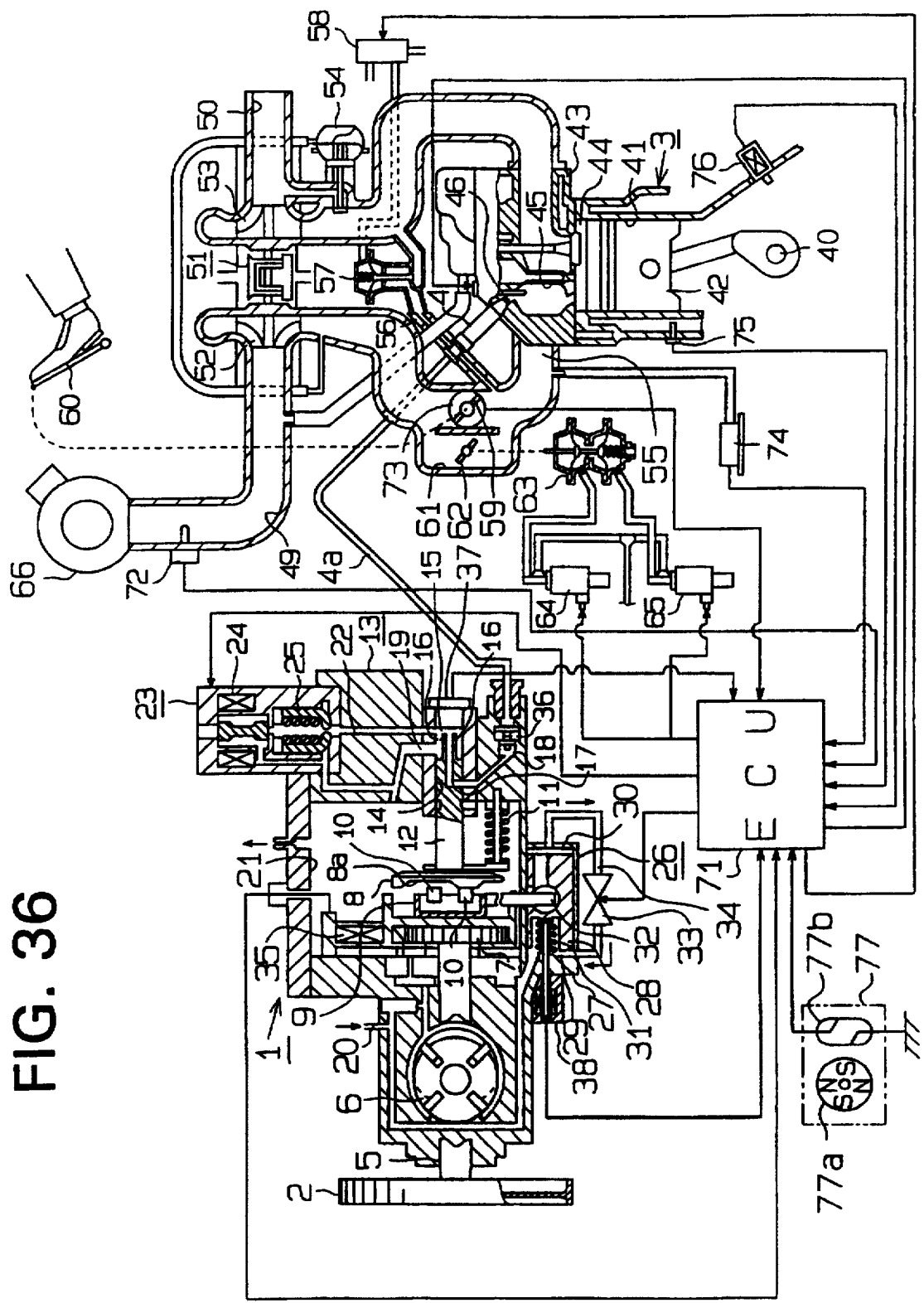
FIGS. 36 through 40 describe a ninth embodiment of the fuel injection control system of the present invention; in which FIG. 36 a schematic view showing a fuel injection timing device of the diesel engine having no fuel pressure sensors diposed in the fuel injector nozzle.

FIG. 36 is a schematic view of a diesel engine with supercharger according to this embodiment. As shown in FIG. 36, injection nozzles 4 has no sensors connected to the ECU 71. Here, the fuel pressure sensor 37 disposed in the pump housing 13 detects the pressure in the high pressure chamber 15 as pressure between the pump 1 and the nozzles 4. The sensor 37 outputs a signal corresponding to the magnitude of the detected value.

In this embodiment, timer positioning sensor 38 is disposed in the low pressure chamber 29 side of the timer housing 27 for detecting the actual fuel injection timing controlled by the timer device 26. The timer sensor 38 operates in cooperation with the motion of the timer piston 28. The sensor 38 detects a timer position TP which corresponds to the fuel injection timing, and outputs a signal corresponding to the magnitude of the detected value. The sensors 72 through 77, the engine speed sensor 35, the pressure sensor 37 and the timer position sensor 38 are connected to the ECU 71. The ECU 71 controls the electromagnetic spill valve 23, TCV 33, glow plugs 46, EVRV 58 and VSV's 64 and 65, based on the signals from the sensors 35, 37, 72 through 77, and 79, respectively.

The operations of the fuel injection control carried out by the ECU 71 will now be described referring to FIGS. 37 through 40.

Figure 37:
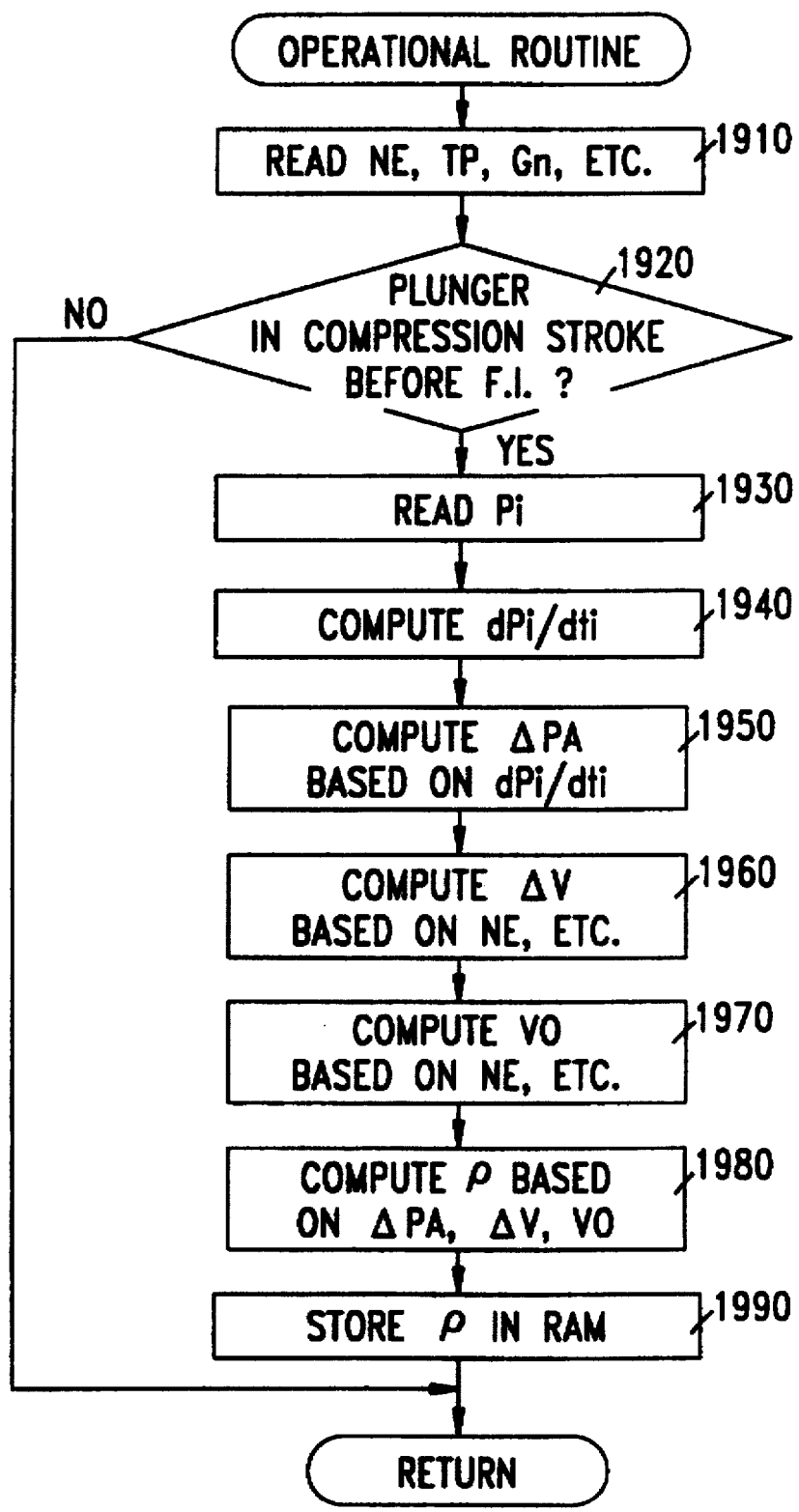

FIG. 37 is a flowchart showing the operations of fuel system environmental constant operational routine carried out by the ECU 71 for computing a fuel system environmental constant ρ which reflects the environmental condition in the fuel system between the pump 1 and the nozzles 4.

First, at step 1910, the ECU 71 reads the engine speed NE, timer position TP and rotational reference position Gn, based on the signals from the engine speed sensor 35, timer position sensor 38 and crank angle sensor 76, respectively (step 1910).

The ECU 71, next at step 1920, determines whether or not the plunger 12 is at the compression stroke corresponding to a time just before the initiation of fuel injection, i.e. the ECU 71 determines whether or not the nozzles 4 are just to be opened. This determination is made based on the engine speed NE, timer position TP and rotational reference position Gn which are read by the ECU at this time. When the plunger 12 however is not in the compression stroke which corresponds to the timing just before the initiation of the fuel injection, the ECU 71 terminates this routine. When the plunger 12 is in a compression stroke corresponding to a time just before the initiation of the fuel injection, the ECU 71 moves to step 1930. The ECU 71, at step 1930, reads the fuel pressure Pi based on the signal from the pressure sensor 37. Next at step 1940, the ECU 71 computes the first derivative value (dPi/dti) of the fuel pressure Pi as the rate of change rate of the fuel pressure, based on the fuel pressure read this time. In this embodiment, a plurality of first derivative values (dPi/dti) are computed within the predetermined crank angle region in the compression stroke which corresponds to the timing just before the initiation of fuel injection. These first derivative values are used to compensate for the deformation of fuel injection pump parts due to long periods of use and changing characteristics of fuel in the fuel system between the pump 1 and the nozzles 4.

At step 1950, the ECU 71 computes an average fuel pressure change rate ΔPA, based on the computed plurality of the first derivative values (dPi/dti). In effect this computation averages the various fuel pressure change rates within a predetermined crank shaft angle to the timing just prior to the initiation of the fuel injection.

The ECU 71, then at step 1960, computes the changed value of volume ΔV in the fuel system unit time, according to the lift of the plunger 12. This volume change value ΔV is computed according to the engine speed NE, timer position and crankshaft angle. The ECU 71 next at step 1970 computes the volume V0 which is the volume of fuel before being changed by ΔV, in other words, the fuel volume for the previous unit time.

The ECU 71, at step 1980, computes the fuel system environmental constant ρ for this time, based on the average fuel pressure change rate ΔPA, volume change value ΔV and volume V0 (step 1980). The fuel system environmental constant ρ is computed using the following equation.

$$\rho = \Delta PA * (V0 + \Delta V)/V0$$

The ECU 71 stores the fuel system environmental constant ρ in the RAM 83 at step 1990 and terminates this routine.

Figure 38:
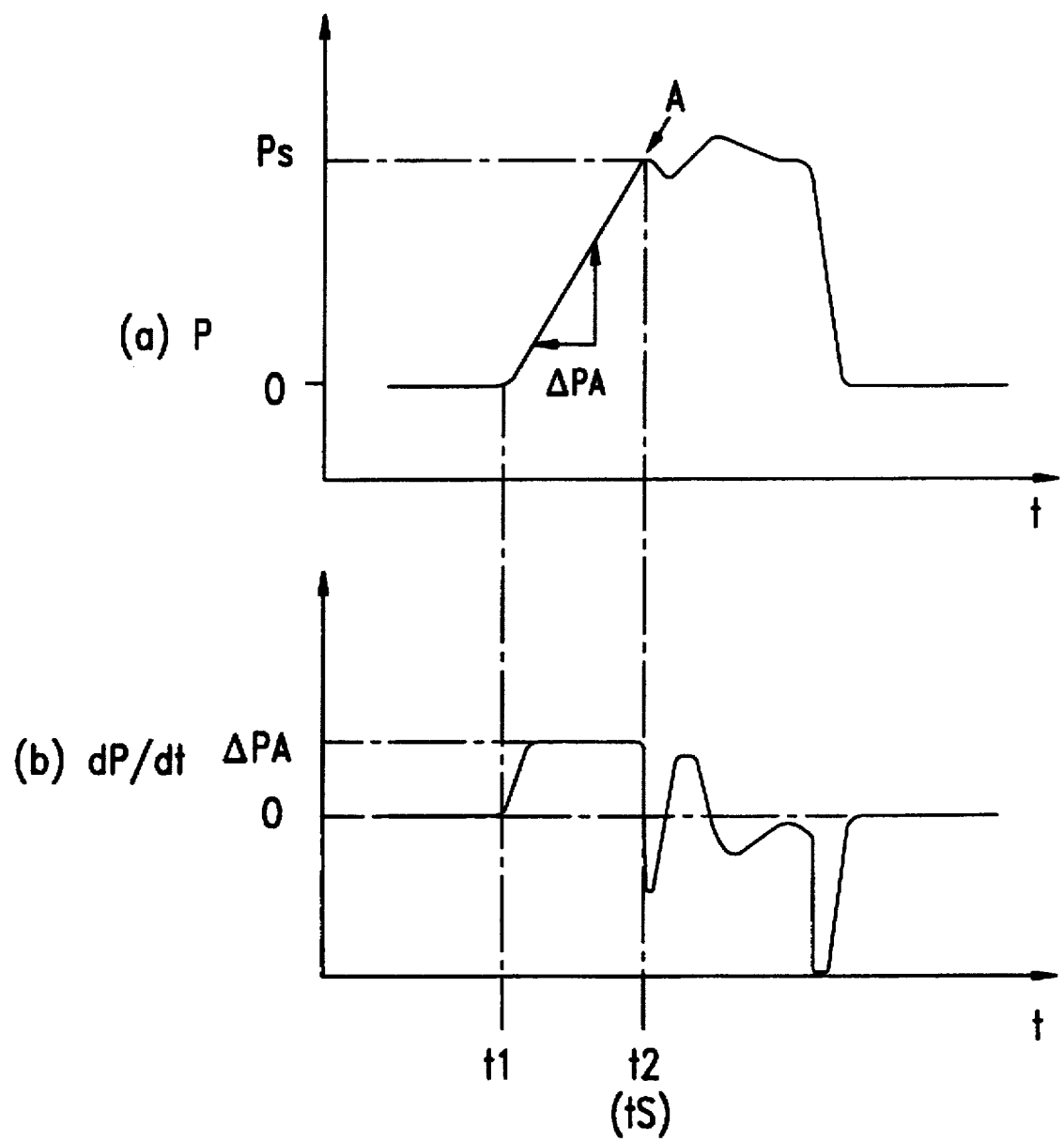

The operations of the fuel system environmental constant ρ will be described referring to the timing chart shown in FIG. 38. In the timing chart, the operations of fuel pressure P and its first derivative value (dP/dt) are indicated when a single fuel injection cycle is carried out.

When a single fuel injection is to be initiated, as the plunger 12 of the pump 1 is to be lifted at the timing t1, the fuel pressure P is gradually increasing as shown in FIG. 38(a). At the same time, the first derivative value (dP/dt) of the fuel pressure P changes, as indicated in FIG. 38(b). The ECU 71 determines the fuel pressure during the increasing stage at a time just before the compression stroke will be carried out. The timing t2 occurs when the fuel pressure P in the increase stage is greatly changed, i.e., at the turning point A, and is considered as the fuel injection initiating time ts, nozzles 4 open. Further, the fuel pressure P at the timing t2 is set as the fuel injection initiating pressure Ps.

The ECU 71 computes the average rising slope of fuel pressure P at a time just before fuel injection initiating time ts. This slope is in effect the first derivative value (dP/dt) between the timing t1 and t2 as the average fuel pressure change rate ΔPA. The ECU 71 computes the fuel system environmental constant ρ, based on the average fuel pressure change rate ΔPA. When the average fuel pressure change rate ΔPA in the fuel system between the pump 1 and the nozzles 4 is large, the fuel system environmental constant ρ becomes large. On the other hand, when the average fuel pressure change rate ΔPA is small, the fuel system environmental constant ρ becomes small. The average fuel pressure change rate ΔPA and environmental constant ρ is computed as the actual measured value which reflects the characteristic of fuel and the deformation due to the long period usage at certain time. ρ is computed as the actual measured value which reflects the characteristic of fuel and the deformation due to the long period usage at a certain time.

Figure 39:
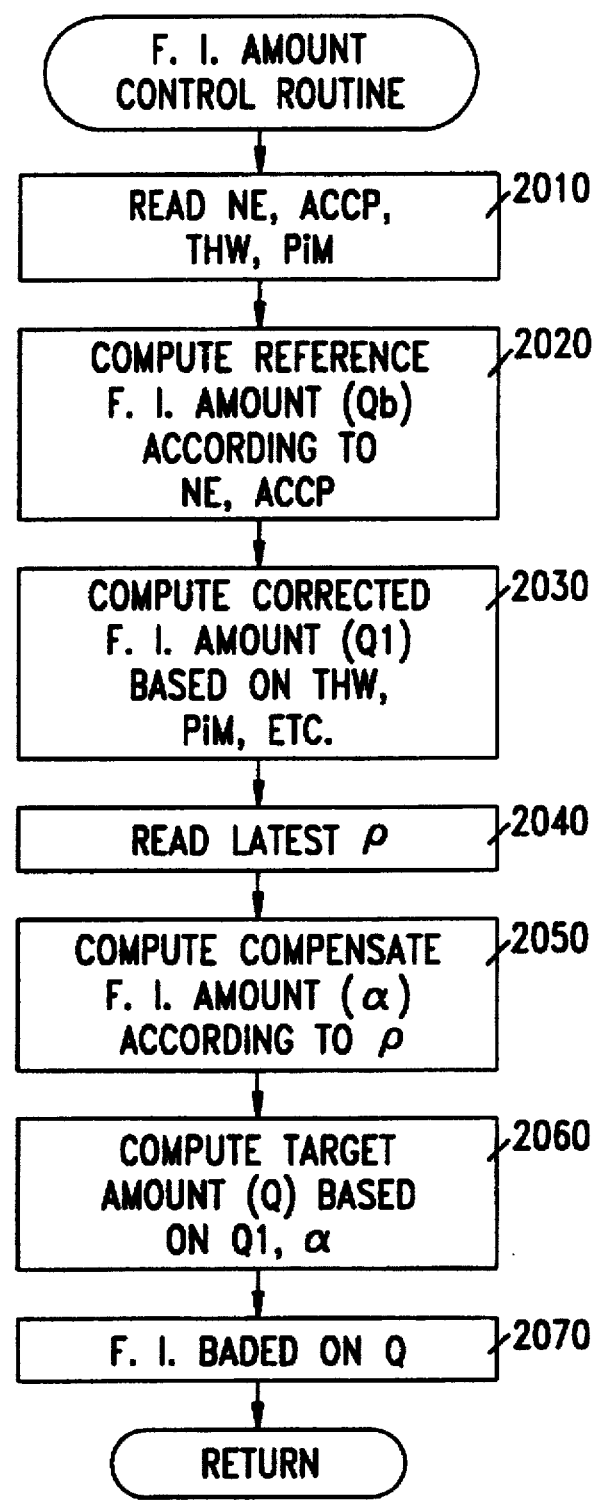

To further explains the utilization of environmental constant ρ, FIG. 39 produces a flowchart showing the operations of the fuel injection amount control routine according to this embodiment.

The ECU 71 first at step 2010 reads the engine speed NE, supercharged pressure PiM, coolant temperature THW and accelerator opening angle ACCP, based on the signals from the engine sensor 35, acceleration sensor 73, suction air pressure sensor 74 and coolant temperature sensor 75, respectively).

At step 2010, the ECU 71 computes the reference fuel injection amount Qb according to the current origin running condition, based on the engine speed NE and the accelerator opening angle ACCP. Next at step 2030, the ECU 71 computes the compensated fuel injection amount Q1 by offsetting the reference fuel injection amount Qb based on the current coolant temperature THW and the supercharged pressure PiM. In other words, the ECU 71 determines what the current engine conditions are and computes the compensated fuel injection amount Q1 according to the operational condition of the turbo charger 51 and various other engine conditions.

Then the ECU 71 reads the latest fuel system environmental constant ρ which is stored in the RAM 83 at step 2040. The ECU 71 next computes a fuel injection compensation amount α, based on the fuel system environmental constant ρ at step 2050. The computation for the fuel injection compensation amount α is carried out by reference to the predetermined correlation between the fuel system environmental constant ρ and the fuel injection compensation amount α. For example, when the environmental constant ρ is small, the large amount of fuel leaking from the fuel system would be assumed. With a large change in the environmental condition of the fuel system, a compensation value for increasing the fuel injection amount is computed.

The ECU 71 next at step 2060 computes the final target fuel injection amount Q, based on the compensated target amount fuel injection amount Q1 and the fuel injection compensation amount α. When the fuel injection compensation amount α corresponds to the compensated fuel injection amount Q1, the target fuel injection amount Q is computed by adding or subtracting the fuel injection compensation amount α to the compensated fuel injection amount Q1. On the other hand, when the fuel injection compensation amount α corresponds to the value of compensation coefficient of the fuel injection amount, the target fuel injection amount Q is computed by adding or subtracting the produced fuel injection compensation amount α and the compensated fuel injection amount Q1.

The ECU 71 carries out the fuel injection, based on the target fuel injection amount Q computed at step 2070 and terminates this routine. In other words, the delivery of the pressurized fuel from the pump 1 to the nozzles 4 is controlled by controlling the electromagnetic spill valve 23 based on the target fuel injection amount Q.

Figure 40:
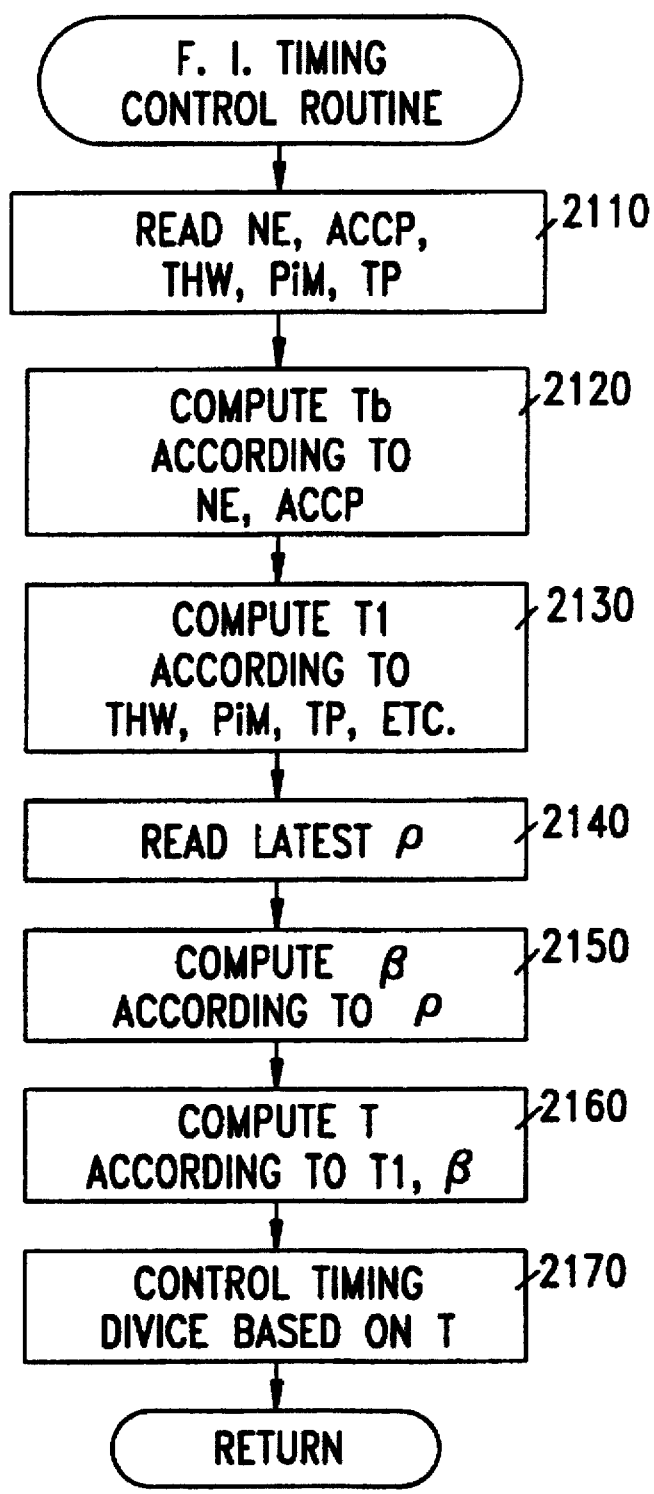

In addition to the above, in this embodiment, the following fuel injection timing control will be carried out in which the environmental constant ρ is utilized. FIG. 40 is a flowchart illustrating the operations this control routine.

The ECU 71, first at step 2010, reads the engine speed NE, timer position TP, supercharged pressure PiM, coolant temperature THW and accelerator opening angle ACCP, based on the signals from the engine sensor 35, timer position sensor 38, accelerate sensor 73, suction air pressure sensor 74 and coolant temperature sensor 75, respectively.

The ECU 71 next at step 2120 computes a reference fuel injection initiating time Tb which corresponds to the current engine running condition, based on the engine speed NE and the accelerator opening angle ACCP which were read this time. The ECU 71, at step 2130, computes the compensated fuel injection initiating time T1 by adjusting the reference fuel injection initiating time Tb, based on the currently read coolant temperature THW and the supercharged pressure PiM, etc. In other words, the ECU 71 determines whether or not the current engine condition is in the cool stage, or it computes the compensated fuel injection initiating time T1 according to the operational condition of the turbo charger 51 and the various running conditions.

The ECU 71, at step 2140, reads the latest fuel system environmental constant ρ which is stored in the RAM 83. At step 2150, the ECU 71 computes a fuel injection initiating timing compensation value β, based on the fuel system environmental constant ρ determined for this time (step 2150). The computation of this fuel injection initiating timing compensation value β is carried out with reference to the predetermined correlation map between the environmental constant ρ and the fuel injection initiating timing compensation value β. When the environmental constant ρ is small, the fuel leak from the fuel system can be considered small as well. Therefore, as the ECU 71 determines that the change of the environmental condition in the fuel system is large, the fuel injection initiating timing compensation value β is computed as a compensation value for advancing the fuel injection initiating time.

At step 2260, the ECU 71 computes a final target fuel injection initiating time compensation value T, based on the compensated fuel injection initiating time T1 and the fuel injection initiating timing compensation value β. When the fuel injection initiating timing compensate value β corresponds to the value which is utilized for the compensate timing of the fuel injection initiating timing, the target fuel injection initiating time T is computed by adding or subtracting the fuel injection initiating timing compensation value β from the compensated fuel injection initiating time T1. When the fuel injection initiating timing compensation value β corresponds to the compensation coefficiency of the fuel injection initiating time T1, the target fuel injection initiating time T is computed by adding or subtracting the compensated fuel injection initiating time T1 to or from the product between the fuel injection initiating timing compensation value β and the compensated fuel injection initiating time T1.

Next at step 2170, the ECU 71 carries out the fuel injection, based on the target fuel injection initiating time T and then terminates this routine. In other words, the ECU 71 controls the delivery timing of pressurized fuel from the pump 1 to the nozzles 4 by adjusting the timer device 26 while the TCV 33 is controlled based on the target fuel injection initiating time T. Through this adjustment of the fuel systems environmental conditions, the ECU 71 controls the fuel injection timing through the nozzles 4.

specifically, the fuel system's environmental constant ρ which reflects fuel characteristic and the fuel system leaks due to the long periods of use, is computed as an actual measured value. The compensated target fuel injection amount Q and the target fuel injection initiating time T are in turn derived values incorporating environmental constant ρ. The amount of fuel to be injected as well as fuel injection initiating time are carried out with the amount of pressurized fuel delivered from the pump 1 to the nozzles 4 being compensated by the change originated in the environmental condition in the fuel system.

For example, given a chance in the fuel passage constants (i.e., passage resistance, thermal expansion rate, modulus of elasticity) or if fuel is leaked in the fuel system, or even if the fuel temperature is changed, the present embodiment adjusts the fuel amount and timing control using environmental constant ρ. Fuel pressure P, generally speaking, between pump 1 and nozzles 4, is detected as generally increasing just before the nozzles 4 are to be opened (i.e., just before the fuel injection initiating). The average fuel pressure change rate ΔPA is then computed, based on fuel pressure P as is environmental constant ρ which is based on the average fuel pressure change rate ΔPA.

Therefore, for every fuel injection cycle, the fuel system environmental constant ρ is computed to reflect the characteristics of the fuel and the deformation or change in fuel system parts caused by the long periods of use based on the actual detected amount of fuel pressure in the fuel system. In other words, the environmental constant ρ reflects and precisely adjusts to any variance in fuel system passage constants, e.g., from leaks in the fuel system or the changes of fuel temperature.

The advantage of using environmental constant ρ is that it can be correlated with various parameters to most accurately reflect the overall condition of the system. Whereas a particular location in the system, may or may not accurately represent the temperature of entire fuel system, environmental constant ρ can be computed as a correlation value with respect to the various conditions, to give an overall accurate temperature reading for the system. Alternatively, ρ can be always and efficiently computed based on the single parameter, i.e., the fuel pressure P.

As a result, the environmental conditions in the fuel system can be more accurately determined through the environmental constant ρ which allows the overall conditions of the entire fuel system to be computed. Therefore, the more accurate fuel injection compensation value α and the fuel injection initiating timing compensation value β can be computed according to the above-described determination. Further, the more accurate target fuel injection amount Q and the target fuel injection initiating time T can be computed, based on the compensation values α, β, respectively.

Tenth Embodiment

The tenth embodiment of the present invention will now be described referring to FIGS. 41 through 44. Components included herein which are similar to those described in the first through fifth embodiments will not be further described here. Only those differences differing from those in the sixth embodiment will be emphasized and described.

The operations of the fuel injection control which is carried out by the ECU 71 will now be described referring to FIGS. 41 through 44. In this embodiment, the operations of the sub-routine, which are similar to those of the above described embodiments will be omitted.

Figure 41:
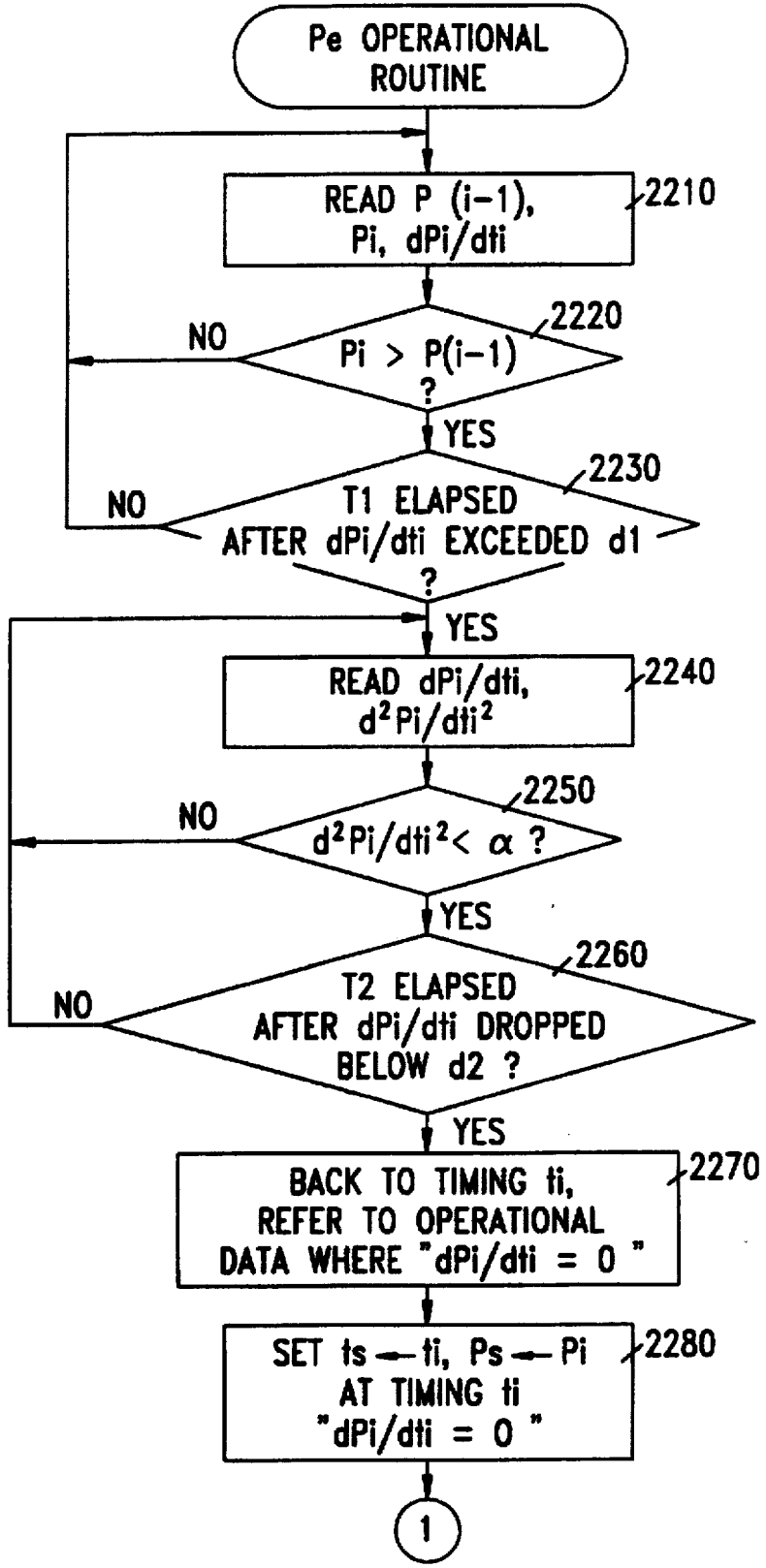
Figure 42:
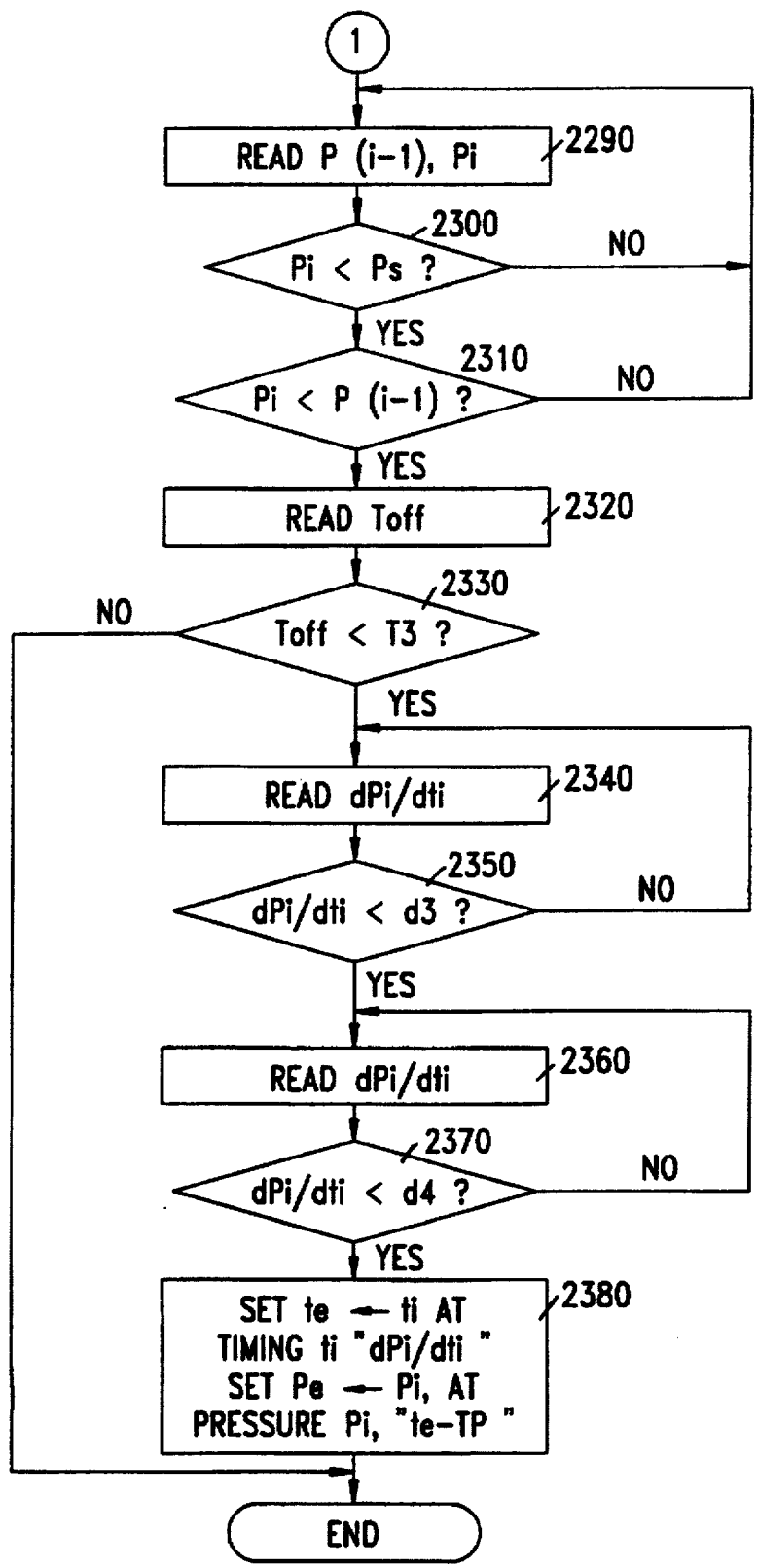

FIGS. 41 and 42 are flowcharts showing the operations of Pe operational routine for computing the fuel injection terminating pressure Pe carried out for every fuel injection cycle.

When the ECU 71 is to initiate this routine, the ECU 71 at step 2210 first reads the fuel pressure Pi and its first derivative value (dPi/dti), corresponding to timing interval ti stored in the RAM 83. The ECU 71 next reads fuel pressure p(i−1) which corresponds to timing t(i−1) which is the timing interval just prior to time before timing ti.

The ECU 71 next determines at step 2220 whether or not the fuel pressure Pi corresponding to timing ti is larger than the fuel pressure P(i−1) corresponding to timing t(t−1). When the fuel pressure Pi is not larger than the fuel pressure t(i−1), the ECU 71 determines that the fuel pressure P is not currently undergoing an increase, and repeats the operations of steps 2210 and 2220. In step 2220, when the fuel pressure P is larger than the fuel pressure P(i−1), the ECU 71 determines that the fuel pressure P is currently undergoing an increase and moves to step 2230.

At step 2230, the ECU 71 determines whether or not the predetermined reference time T1 has elapsed since the first derivative value (dPi/dti) exceeded the threshold value d1. If these conditions exist, ECU determines that fuel injection should be initiated and moves to step 2240. When the first derivative value (dPi/dti) falls to threshold value d1, before reference time T1 elapses.

Next at step 2240, the ECU 71 reads the first derivative value (dPi/dti) and the second derivative value ($d^2Pi/dti^2$) of the fuel pressure Pi corresponding to the timing interval ti which are stored in the RAM 83.

The ECU 71 determines at step 2250 whether or not the second derivative value ($d^2Pi/dti^2$) read in this time is smaller than the reference value α. When the second derivative value ($d^2Pi/dti^2$) is not smaller than the reference value α, the ECU 71 determines the rate of change in the fuel pressure Pi has not significantly dropped and repeats the operations of steps 2240 and 2250. On the other hand, at step 2250, when the derivative value ($d^2Pi/dti^2$) is smaller than the reference value α, the ECU 71 determines the change rate of the fuel pressure Pi has significantly dropped during the overall increasing pattern of fuel pressure P and moves to step 2260.

At step 2260, the ECU 71 determines whether or not the reference time T2 has elapsed since the first derivative value (dPi/dti) dropped below the predetermined threshold value d2. If T2 has elapsed since the occurrence of this value, the ECU 71 determines the first derivative value (dPi/dti) has not changed and repeats the operations of steps 2240 through 2260. In step 2260, if reference time T2 has elapsed since the first derivative value (dPi/dti) dropped below the predetermined threshold value d2, the ECU 71 determines the change is due to the initiation of the fuel injection and moves to step 2270.

The ECU 71, at step 2270, refers to the operational data stored in the RAM 83 while determining timing interval ti. At the thing interval ti, when the first derivative value (dPi/dti) of the pressure P became "0", there is the change in rate of the fuel pressure P change and the ECU 71 sets this timing ti as the fuel injection initiating time ts. At step 2280, the ECU 71 sets the fuel pressure Pi at time ts as the fuel injection initiating pressure Ps which correspond to the opening valve pressure for the nozzles 4 at the opening valve time.

At step 2290, the ECU 71 reads the fuel pressure Pi which corresponds to timing interval ti stored in the RAM 83, then at each timing interval before time ti reads the fuel pressure P(i−1) which corresponds to timing t(i−1).

The ECU 71, next at step 2300, determines whether or not the fuel pressure Pi read this time is smaller than the fuel injection initiating pressure Ps computed in step 2280. When the fuel pressure Pi is larger than the fuel injection initiating pressure Ps, the ECU 71 repeats the operations of steps 2290 and 2300. When the fuel pressure Pi is smaller than the fuel injection initiating pressure Ps, the ECU 71 moves to step 2310.

At step 2310, the ECU 71 next at step 2300 determines whether or not the fuel pressure P1 corresponding to timing ti is smaller than fuel pressure P(i−1) corresponding to timing t(i−1). When the fuel pressure Pi is larger than the fuel pressure P(i−1), the ECU 71 determines the fuel pressure P is not currently undergoing an increasing trend and repeats the operations of steps 2290 through 2310. When the fuel pressure Pi is smaller than the fuel pressure P(i−1) at t(i−1), the ECU 71 determines that the fuel pressure P is undergoing a decreasing trend within the region below the fuel injection initiating pressure Ps, and that the current conditions are within a fuel injection terminating period. The ECU 71 next moves to step 2320.

At step 2320, the ECU 71 reads an elapsed time value of Toff due to the condition of electromagnetic spill valve 23 being off (having a closed valve) prior to the fuel injection stroke for this cycle. At step 2330, ECU 71 determines whether or not the elapse time Toff has reached the reference time T3. When the elapsed time Toff does not correspond to reference time T3, the ECU 71 terminates this routine. When the elapsed time Toff did not reach the reference time T3, the ECU 71 now determines that the fuel injection terminating time termination should be carried out, and moves to step 2340.

The ECU 71, next at step 2340, reads the first derivative value (dPi/dti) of the fuel pressure Pi stored in the RAM 83, which corresponds to timing interval ti. The ECU 71 at timing 2350 determines whether or not the read first derivative value (dPi/dti) at this time is smaller than the threshold value d3. When the first derivative value (dPi/dti) is not smaller than the threshold value d3, the ECU 71 determines the change rate of the fuel pressure is not small enough, i.e., that the fuel pressure P is not undergoing on overall increase, and repeats the operations of steps 2340 and 2350. When the first derivative value (dPi/dti) is smaller than the threshold value d3, the ECU 71 determines the fuel pressure P is undergoing an overall increase and moves to step 2360.

The ECU 71, at step 2360, reads the first derivative value (dPi/dti) of the fuel pressure Pi stored in the RAM 83 corresponding to time ti. The ECU 71, next at step 2370, determines whether or not the first derivative value (dPi/dti) is larger than the threshold value d4. When the first derivative value (dPi/dti) is smaller in magnitude than the threshold value d4, the ECU 71 determines the rate of change in fuel pressure P has not changed from an overall decreasing trend to an increasing trend, and repeats the operations of steps 2360 and 2370. When the magnitude of the first derivative value (dPi/dti) is larger than the threshold value d4 at step 2370, the ECU 71 determines the fuel pressure P has changed once from a generally decreasing stage to a generally increasing stage, and moves to step 2380.

The ECU 71 sets the time ti when the first derivative value (dPi/dti) became larger than the threshold value d4 at step 2370 as fuel injection terminating time for the nozzles 4. At step 2380, the ECU 71 sets the time ti as fuel injection terminating time te. The ECU 71 determines the fuel pressure Pi at time t(te-TP) which is a time prior to the fuel injection termination time by a value equal to compensation delay time TP. The value of pressure Pi is then set as the compensate time TP from the fuel injection terminating time as the fuel injection terminating pressure Pe which corresponds to the closing valve pressure at the nozzles 4. The fuel pressure P at the actual fuel injection terminating time te appears from its waveform to be slightly delayed from time t3 which is a time when the rate of changing pressure drops below the d4 level. This delay is due to the variations in characteristics of fuel and the length of the fuel passages in the fuel system. In this embodiment, the optimal compensation delay time TP can be set within the rage of time between 20 and 100 microseconds.

The ECU 71 terminates this routine after the operation of step 2380 was carried out. Then, the ECU 71 waits for the next fuel injection cycle, and will start carrying out the operations from step 2210.

Therefore, according to the above-described Pe operational routine, the fuel injection initiating time ts, fuel injection initiating pressure Ps, fuel injection terminating time te and its fuel injection terminating pressure Pe, are computed and stored in RAM for every cycle of fuel injection cycle carried out.

Figure 43:
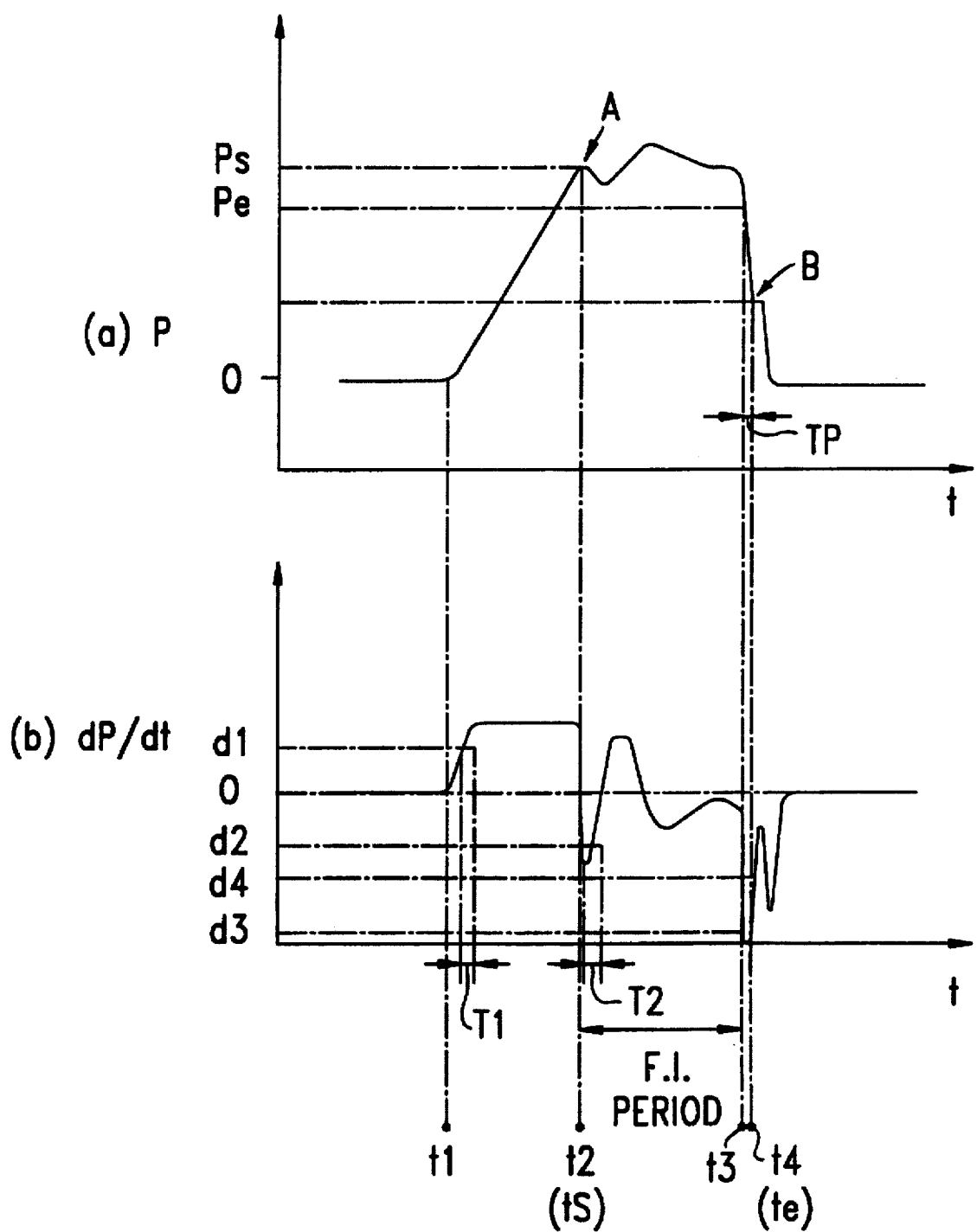

The operations of the fuel injection initiating time ts, fuel injection initiating pressure Ps, fuel injection terminating time te, fuel injection terminating pressure Pe, fuel pressure P and its first derivative value (dPi/dti) will now be described according to the timing chart of FIG. 43.

As plunger 12 moves forward, the fuel pressure undergoes a generally increase at time t1, as shown in FIG. 43(a). FIG. 43(b) shows the change of the first derivative value (dP/dt) of the fuel pressure P. When the reference time T1 elapses and the first derivative value (dP/dt) has exceeded the threshold value d1, the ECU 71 determines whether the fuel pressure is undergoing an overall increase in preparation for the beginning of actual fuel injection.

When the fuel pressure in the increase stage changes greatly at timing t2, its first derivative value (dP/dt) drops as well. When reference time T1 elapses following occurrence of the first derivative value (dP/dt) dropping below the threshold value d2, the ECU 71 determines whether the rate of change in fuel pressure P has definitely dropped due to the initiation of fuel injection. Further, the ECU 71 computes timing value t2 at a time when the first derivative value (dPi/dti) becomes "0". The timing t2 is then set as fuel injection initiating time ts. Further, the fuel pressure P at timing t2 is set as the fuel injection initiating pressure Ps which corresponds to the opening valve pressure. In other words, as shown in FIG. 43(a), the fuel injection initiating time ts and initiating pressure Ps correspond to the turning point A where the increase rate of the fuel pressure P undergoes a momentary change from positive to negative.

When the fuel injection continues after time t2, the fuel pressure P and its first derivative value (dPi/dti) will change as shown in graphs shown in FIGS. 43(a) and (b). In the region below the fuel injection initiating pressure Ps where the fuel pressure P undergoes a decreasing trend, the first derivative value (dPi/dti) of the fuel pressure P at timing t3 greatly drops below the threshold value d3. Following this, the ECU 71 determines whether the rate of change in fuel pressure P returns to an overall increasing trend. At time t4, the first derivative value (dPi/dti) of the fuel pressure P starts rising greatly and exceeds the threshold value d4. The ECU 71 then sets the timing t4 as the fuel injection terminating time te for the nozzles 4. The fuel pressure P at time t3 is set as the fuel injection terminating pressure Pe which corresponds to the closing value pressure. In other words, the ECU 71 recognizes the fuel injection terminating time te at the time of the turning point B where the decrease of the fuel pressure P and its fuel injection terminating pressure Pe are computed as shown in FIG. 43(a). The period of time between the fuel injection initiating time ts and fuel injection terminating time te is set for the fuel injection.

Figure 44:
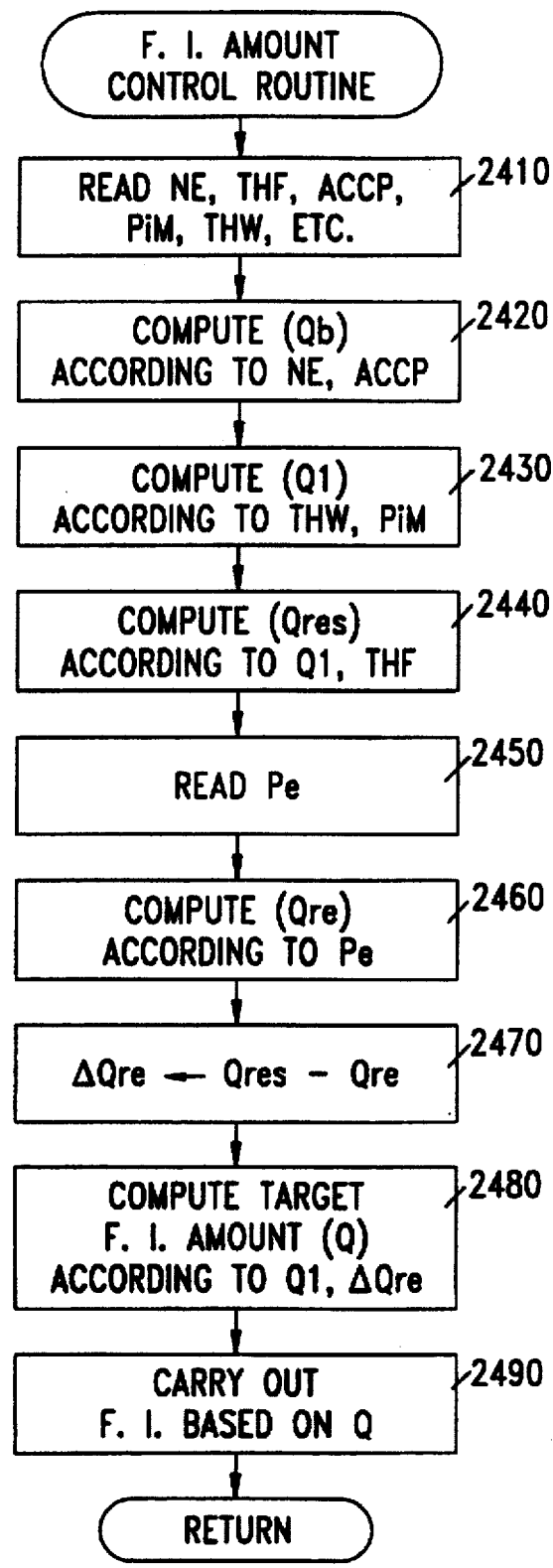

In this embodiment, the fuel injection terminating pressure Pe computed through the above-described manner is utilized for carrying out the fuel injection amount control. FIG. 44 is a flowchart showing the operations of fuel injection amount control routine which is carried out by the ECU 71.

The ECU 71, first at step 2410, reads the engine speed NE, fuel temperature THF, accelerator opening angle ACCP, supercharged pressure PiM and coolant temperature THW, based on the signals from the engine speed sensor 35, fuel temperature sensor 37, accelerator opening angle sensor 73, suction air temperature sensor 74 and coolant temperature sensor 75, respectively.

The ECU 71 computes a reference fuel injection amount Qb at step 2420, according to the current engine conditions, based on the engine speed NE and accelerator opening angle ACCP (step 2420). At step 2430, the ECU 71 computes a compensated fuel injection amount Q1 by compensating the reference fuel injection amount Qb, computed this time, with the coolant temperature THW and supercharged pressure PiM for this cycle. In other words, the ECU 71 computes the compensated fuel injection amount Q1 corresponding to the running condition such as the operational condition of the turbocharger 51.

The ECU 71 at step 2440 computes the remaining fuel amount in the fuel system between the pump 1 and the nozzles 4 when nozzles 4 close. This value becomes a new reference fuel remaining value Qres, based on the fuel temperature THF read at this time and the compensated fuel injection amount Q1 computed this time.

At step 2450, the ECU 71 reads the latest fuel injection terminating pressure Pe which is stored in the RAM 83. The ECU 71 next at step 2460 computes the actual remaining fuel amount Qre which remains in the fuel system between the pump 1 and the nozzles 4. This computation is based on the latest observed fuel injection terminating pressure Pe. The computation for the remaining fuel amount Qre is carried out through the following equation.

$Qre=Vf*e*Pe$

In the above-described equation, the actual remaining fuel amount Qre is computed, based on the actual fuel injection terminating pressure Pe.

The ECU 71 computes the difference between the reference remaining fuel amount Qres computed this time and the actual remaining fuel amount Qre, and sets the operational result as a remaining fuel amount deviation ΔQre at step 2470.

The ECU 71 then computes a final target fuel injection amount Q, based on the compensated fuel injection amount Q1 and the remaining fuel amount deviation ΔQre at step 2480. In other words, the ECU 71 computes the target fuel injection amount Q by further compensating the compensated fuel injection amount Q1 by the remaining fuel amount deviation ΔQre. At step 2490, the ECU 71 carries out the fuel injection, based on the target fuel injection amount Q computed this time, and terminates this routine. In effect, the ECU 71 controls the electromagnetic spill valve 23, based on the target fuel amount Q.

According to the fuel injection controller of this embodiment, the deviation value of the remaining fuel amount Qre in the fuel system between the pump 1 and the nozzles 4 offsets target fuel injection amount Q in order to carry out the fuel injection amount control.

When the single fuel injection cycle is to be carried out, the fuel injection terminating pressure Pe is detected. The actual remaining fuel amount Qre in the fuel system between the pump 1 and the nozzles 4 is computed, based on the detected fuel injection terminating pressure Pe. The difference between the actual remaining fuel amount Qre and the reference remaining fuel amount deviation Qres at the nozzles 4 closing time is set as the fuel remaining amount deviation ΔQre. Next the target fuel injection amount Q is computed by the compensated fuel injection amount Q1 by the remaining fuel amount deviation ΔQre. ΔQre in turn corresponds to the changes in Pe.

The remaining fuel amount Qre corresponds to the fuel amount which actually remains in the fuel system when the nozzles 4 are closed. The remaining fuel amount Qre has a greater correlation to the closing valve pressure more than with the opening valve pressure of the nozzles 4. A change in amount Qre thus reflects a change in the fuel injection terminating pressure Pe which in turn corresponds to closing valve pressure.

Therefore, the accurate remaining fuel amount Qre can be computed from the fuel injection terminating pressure Pe allowing a more accurate remaining fuel amount deviation ΔQre to likewise be computed. The influence of the remaining fuel amount Qre is effectively removed from the target fuel amount Q following every fuel injection cycle. As a result, when the fuel injection amount control is to be initiated, the fuel injection amount can be accurately adjusted based on the remaining fuel amount deviation ΔQre regardless of engine conditions. In the direct injection type diesel engine which is operated under the increased injection rate of the fuel injection nozzles, a more accurate remaining fuel amount deviation ΔQre can be computed from the fuel injection terminating pressure Pe. Therefore, the fuel injection amount control can be accurately carried out. In other words, regardless of the engine speed or of the fuel injection system type, the change in the remaining fuel amount Qre in the fuel system can be accurately computed.

Eleventh Embodiment

The eleventh embodiment of the present invention will now be described referring to FIGS. 45 through 49. Components included herein which are similar to those described in the first through fifth embodiment will not be further described here. Only those differences differing from those in the fourth embodiment will be emphasized and described herein.

Figure 45:
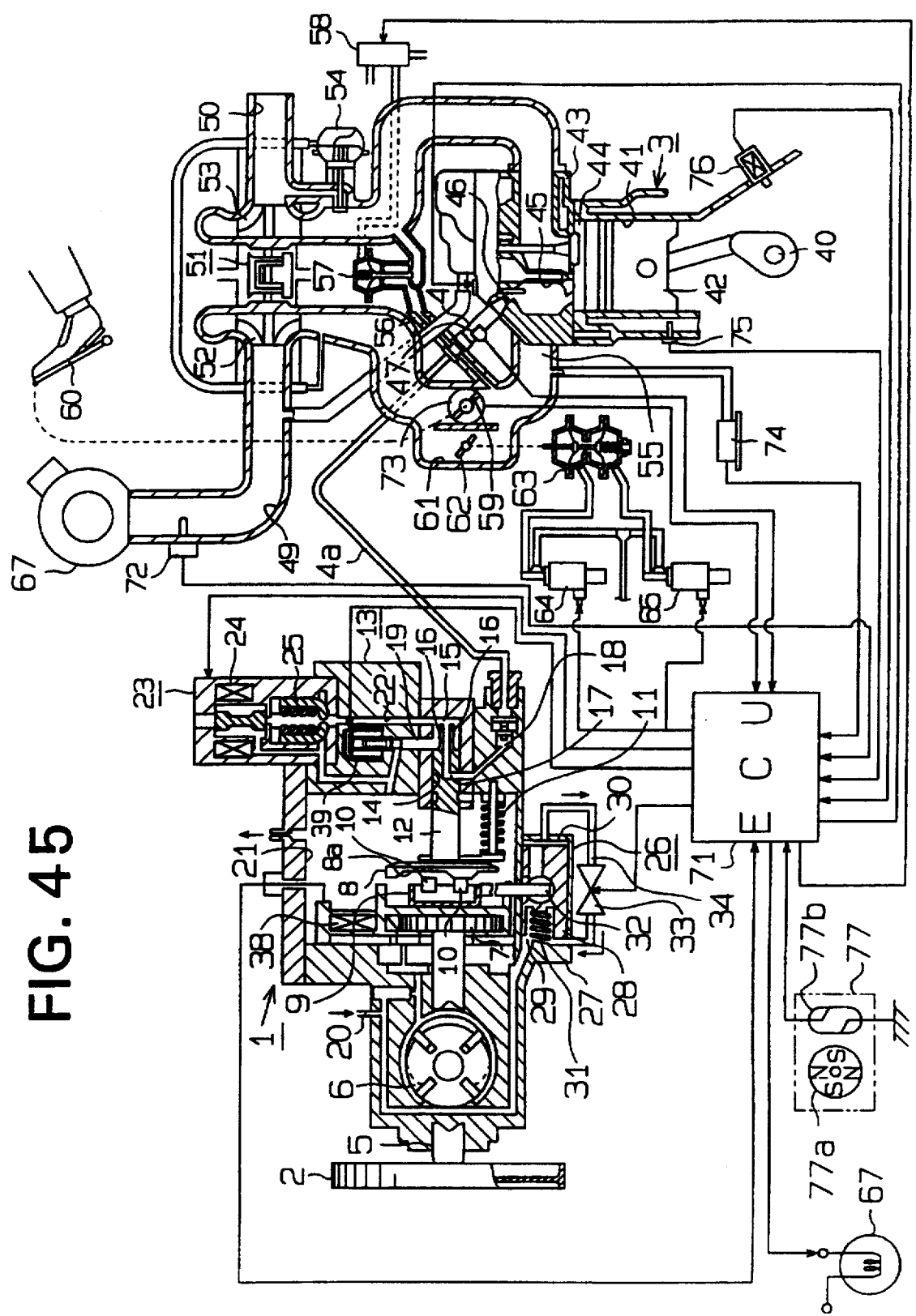

FIG. 45 is a schematic view of the fuel injection control system according to this embodiment. As shown in FIG. 45, in this embodiment, a fuel cut-off valve 39 formed with the electromagnetic valve is disposed in the pump housing 13 for opening or closing the suction port 19. The suction port 19 is selectively closed by closing the fuel cut-off valve 39 thereby preventing fuel from entering the high pressure chamber 15 from the fuel chamber 21. The valve 39 is normally opened when the plunger is moving rearward, and closed when it is moving forward. Thus, the valve 39 may be normally closed foe cutting off the delivery of the fuel front the pump 1 as needed, i.e. during the fuel cut-off.

Another aspect of the present embodiment is that a warning lamp 67 is provided for an indication to the driver of an irregular condition in the pump 1. The lamp 67 is activated, based on a diagnosis which will be described afterward.

The electromagnetic spill valve 23, TCV 33, fuel cut-off valve 36, glow plugs 46, EVRV 58, VSV 64, 65, and warning lamp 67 are electronically connected with the ECU 71 for the control of the driving timing of those components 23, 33, 36, 46, 58, 64, 65 and 66, respectively.

The operations of the fuel injection amount control carried out by the ECU 71, and the diagnosis procedure for the pump 1 will now be described referring to FIGS. 46 through 49.

Figure 46:
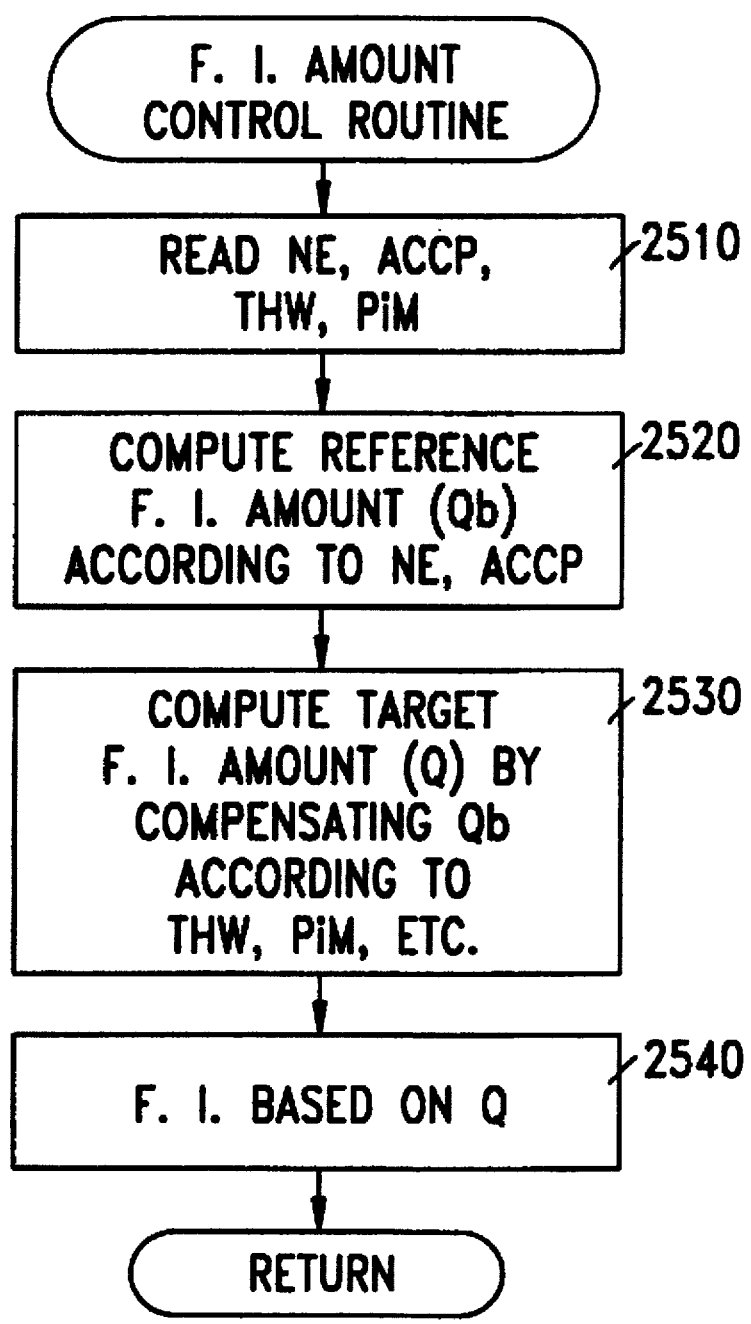

FIG. 46 is a flowchart of the fuel injection amount control routine carried out by the ECU 71 at predetermined intervals.

The ECU 71, first at step 2510, reads the engine speed NE, supercharged pressure PiM, coolant temperature THW, and accelerator opening angle ACCP, based on the signals from the engine speed sensor 35, acceleration sensor 73, suction air pressure sensor 74 and coolant temperature sensor 72. The ECU 71, next at step 2520, computes a reference fuel injection amount Qb based on the current engine running condition, engine speed NE and the accelerator opening angle ACCP. At step 2520, the ECU 71 computes the target fuel injection amount Q by compensating the reference fuel injection amount Qb, by the coolant temperature THW and the supercharged pressure PiM, and then by adjusting amount Qb for the various engine conditions, such as the condition of turbocharger 51. Through this operation, the ECU 71 computes the target fuel injection amount Q at step 2540, and carries out the fuel injection.

In effect, the ECU 71 controls the delivery of the pressurized fuel from the pump 1 to the nozzles 4 by controlling the electromagnetic spill valve 23 according to the target fuel injection amount Q. After the valve 23 is activated, i.e. closed, and before the compression stroke of plunger 12, the ECU 71 computes the time for opening the valve 23 at the termination of the fuel injection cycle as the target fuel injection terminating time tes. The target time tes is set by converting the fuel injection amount Q into a time value. The ECU 71 then opens the valve 23, based on the target fuel injection terminating time tes. As a result, the ECU 71 terminates the delivery of the pressurized fuel from the pump 1 to the nozzles 4 for the single fuel injection cycle. After the ECU 71 completes the operation of step 2540, the routine is terminated.

The diagnosis procedure for the pump 1 will now be described according to the sub-routine described in FIG. 14, and the operations of the Pr operational routines described in FIGS. 41 and 42.

Therefore, according to the operations of the above-described sub-routine, the fuel pressure Pi, the first derivative value (dPi/dti) and the second derivative value ($d^2Pi/dti^2$) which correspond to each timing interval ti are sequentially stored in the RAM 83 every time a fuel injection cycle is carried out. According to the operations of the Pe operational routine, the fuel injection initiating time ts, its fuel injection initiating pressure Ps, the fuel injection terminating time te, and its fuel injection terminating pressure Pe are also computed, and stored in the RAM 83 every time a single fuel injection cycle is carried out. In this embodiment, special treatment is given to the fuel injection terminating time te.

Figure 47:
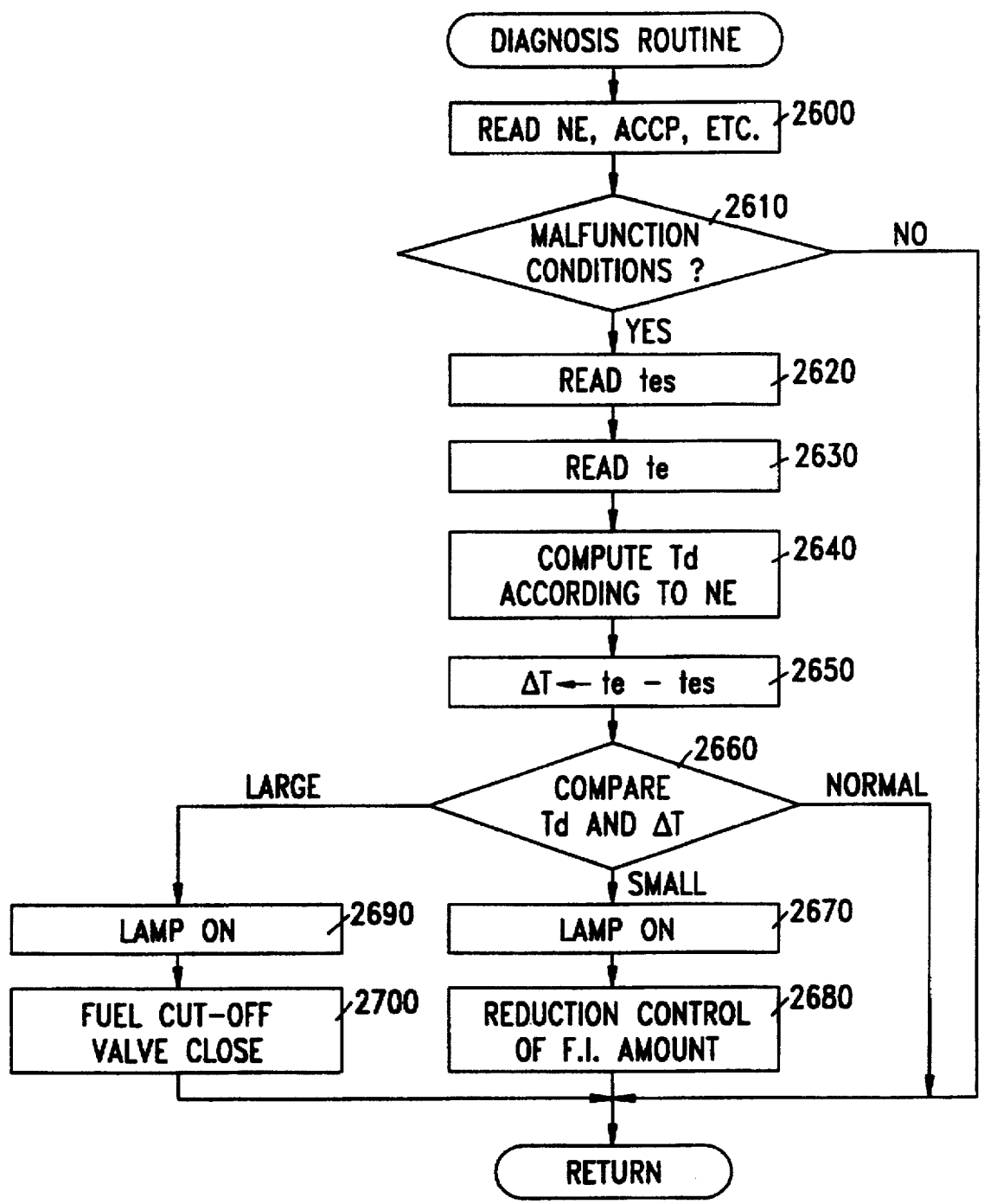

The diagnosis for the pump 1 where the fuel injection terminating time te computed in the above is utilized will now be described, according to the routine of FIG. 47.

The ECU 71 first reads at step 2600 the engine speed NE and the accelerator opening angle ACCP which are detected by the sensors 35 and 73, step 2600. At step 2610, the ECU 71 determines whether or not every condition is satisfied to carry out the diagnosis routine for the pump 1. This diagnosis will be carried out, based on the engine speed NE and the accelerator opening angle ACCP. In other words, the routine will be carried out when the determination whether or not the engine speed NE is in the idling condition where the change is very nominal, or whether every condition for the normal running is satisfied is detected. When the conditions for carrying out the diagnosis routine are not satisfied, the routine is not carried out, and the ECU 71 terminates the routine. On the other hands, when the conditions for carrying out the diagnosis routine are satisfied, the ECU 71 moves to step 2620 to carry out the diagnositic routine.

At step 2620, the ECU 71 reads the target fuel injection terminating time tes which was set through the operations of the fuel injection amount control routine in the previous cycle for opening the valve 23. The ECU 71, next at step 2630, reads the latest fuel injection terminating time te, which was computed in the previous cycle, from the detected data on fuel pressure P.

Figure 48:
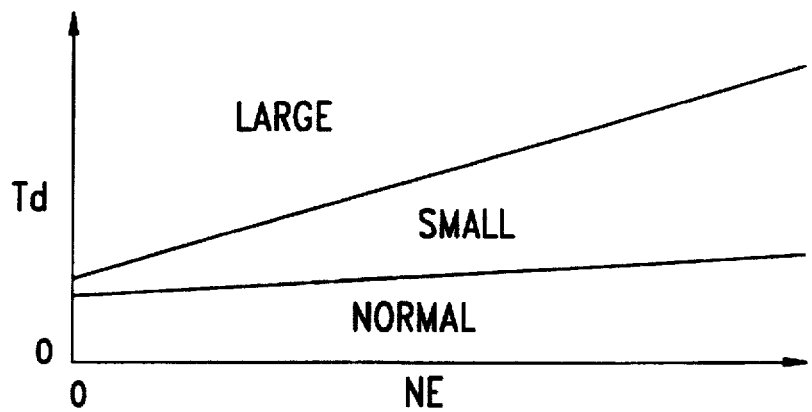
Figure 49:
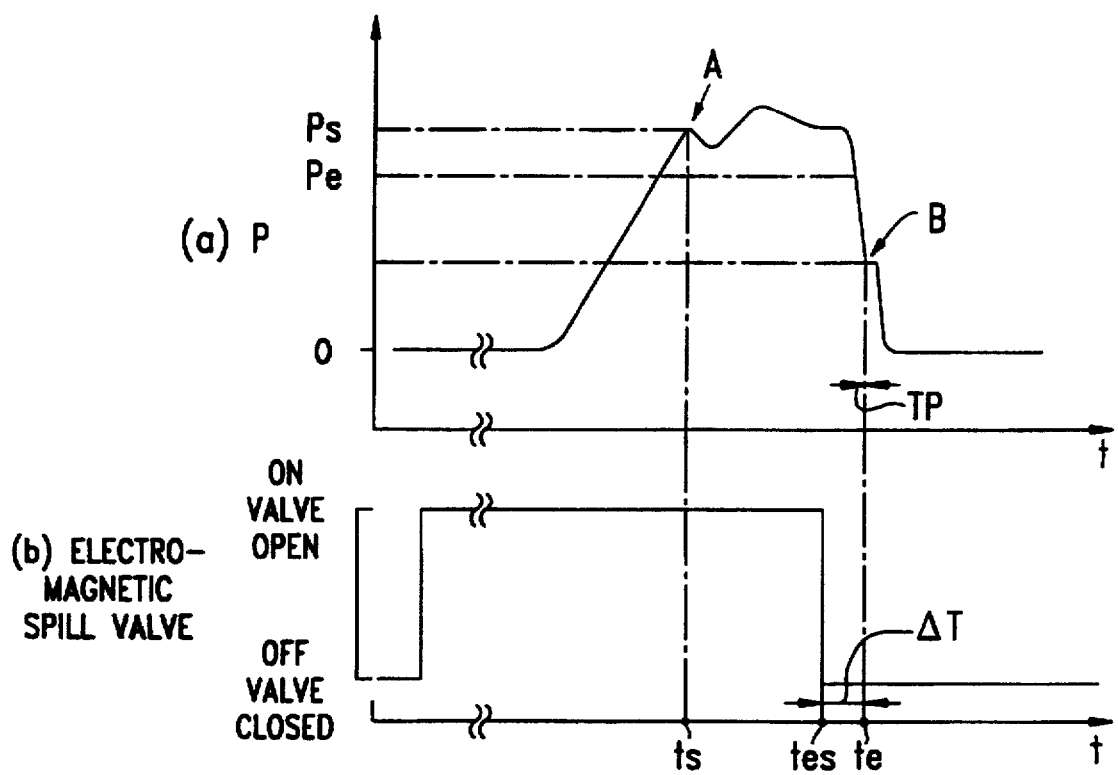

Then at step 2640, the ECU 71 computes the region for delay time Td corresponding to the engine speed NE, and sets Td to compensate for the delay of the fuel injection terminating time te as shown in FIG. 48.

At step 2650, the ECU 71 computes the difference between the fuel injection terminating time te and the target fuel injection terminating time tes, and sets the result as the fuel injection terminating time deviation ΔT. In other words, the ECU 71 computes the terminating time deviation ΔT as a difference between the fuel injection terminating time te and the target fuel injection terminating time tes. The ECU 71 then compares, at step 2660, the region of the delay time Td with the fuel injection terminating time deviation ΔT. When the fuel injection terminating time deviation ΔT is small enough to be included in the range of the normal condition region in the map of FIG. 48, then the ECU 71 determines that pump 1 is in the normal running condition, and terminates this routine.

If the fuel injection terminating time deviation ΔT is extremely small, such that it is included in the range of the extremely small region illustrated in the graph of FIG. 48, the ECU 71 determines that the spill valve 23 is malfunctioning. Therefore, the ECU 71 determines that the runing condition of the pump 1 is sightly irregular, and moves to the next step. At step 2670, the ECU 71 then actuates the warning lamp 67 and carries out a reduction of the fuel injection amount at step 2680. In other words, the ECU 71 carries out a control routine which uniformly reduces the fuel injection amount according to the target fuel injection amount Q, resulting in an advancement of the fuel injection terminating time tes. Following the operation of step 2680, the ECU 71 terminates this routine.

In step 2660, when the fuel injection terminating time deviation ΔT is extremely large, i.e. larger than predetermined delay time Td, the ECU 71 determines the electromagnetic spill valve 23 is out of order. Following this at step 2690, the ECU 71 activates the warning lamp 66 and then, at step 2700, closes the fuel cut-off valve 36 to prevent the pressurized fuel from the pump 1 from being delivered to the nozzles 4. After step 2700, the ECU 71 terminates this routine.

Therefore, according to the above-described diagnosis routine, the ECU 71 determines whether or not the electromagnetic valve 23 is out of order every time a single fuel injection cycle is carried out. When the valve 23 is out of order, the ECU 71 determines that the pump 1 is out of order and actuates the warning lamp 67.

According to the diagnostic function of this embodiment, when a fuel injection cycle is to be carried out, the target fuel injection terminating time tes is set according to the target fuel injection amount Q. The spill valve 23 changes its condition from being ON (i.e., closing valve) to being OFF (i.e., opening valve) at the fuel injection terminating time tes. Accordingly, the termination of the pressurized fuel delivery from the pump 1 to the nozzles 4 and thereby to the diesel engine 3 is controlled. In accordance with the pressure P detected by pressure sensor 47, the ECU 71 determines the actual fuel injection terminating time te for the pump 1. In other words, the actual fuel injection terminating time te corresponding to the actual opening valve time of the valve 23 is computed, based on the change in the wave forms of the fuel pressure P. The difference between the times tes and te is computed as the fuel injection terminating time deviation ΔT.

Therefore, when the electromagnetic spill valve 23 does not move as expected due to some causes, the fuel injection terminating time te is radically adjusted. As a result, the irregular conditions originated in the mechanical and electrical malfunctions of the valve 23 can be diagnosed. That is, when the valve 23 becomes non-operational due to malfunctions in the electrical or mechanical systems, such as a disconnection of the valve 23, or a malfunction of the drive circuit 97, the irregular conditions can be reliably diagnosed. In addition, when the member 25 of the valve 23 is hindered in its operation due to the variations in fuel characteristics, or due to the introduction of foreign matter in the fuel, those irregular conditions can be reliably diagnosed.

According to the result of the diagnosis, the fail-safe measure corresponding to the magnitude of the irregular condition is dependably performed. That is, the driver can recognize the occurrence of the irregular condition by the warning lamp being actuated. When the irregular condition is indicated by the light, the control for reducing the fuel injection amount is carried out as the fail-safe measure. Through this fail-safe measure, the driver can drive the vehicle to the near-by safe place or the repaire shop while the engine 3 is running in the low speed. When the irregular condition is serious, the fuel is cut off and the engine 3 is prevented from further operating.

In as much as the actual fuel injection terminating time te is computed by the ECU 71 in a manner similar to that described above, its description here is omitted.

Although only eleven embodiments of the present invention have been described herein, it should be apparent to those skilled in the art that the present invention may be embodied in many other specific forms without departing from the spirit or scope of the invention. Particularly, it should be understood that following modes are embodied.

In the first and second embodiments, the fuel injection amount Qi at every timing was computed though the following equation, based on the lift coefficiency KLi and the fuel pressure Pi at timing ti.

$$Qi = KLi * \sqrt{Pi}$$

The computation of the fuel injection amount at timing ti is not limited the given equation.

In the above-described embodiments, the fuel injection initiating time detection device is embodied in the electronic control diesel engine mounted in the vehicle. The fuel injection initiating time detection device can be embodied in a high pressure gasoline injection type engine as well.

In the fourth embodiment, the remaining fuel change value Qre was computed through the following equation.

$$Qre = Vi * \epsilon * (Pns - Pnr) = Vi * \epsilon * \Delta Pn$$

The remaining fuel change value Qre can be computed referencing the predetermined correlation of the fuel change value Qre to the opening valve pressure deviation ΔPn.

In the fifth embodiment, the fuel change value Qre was computed through the following equation.

$$Qre = Vi(\epsilon * \Delta Pn - {}^t c * \Delta Pc)$$

The compensation value of the fuel amount Qre is computed first, using the opening valve pressure deviation ΔPn with respect to the remaining fuel pressure deviation ΔPc.

In the sixth embodiment, the remaining fuel amount Qre was compensated through the following equation.

$$Qre = Vi * (\epsilon ts * Pns - {}^t tr * Pnr)$$

The remaining fuel amount Qre can be computed through the following equation as well.

$$Qre = K^\epsilon * (\Delta Pn + \beta * \Delta Pn - \beta Pns)$$

Figure 30:
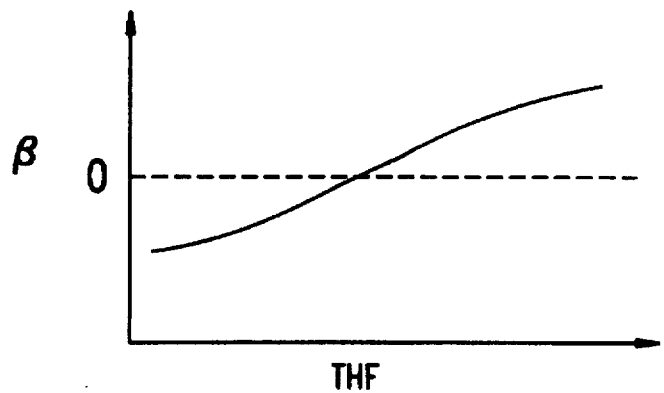
Figure 31:
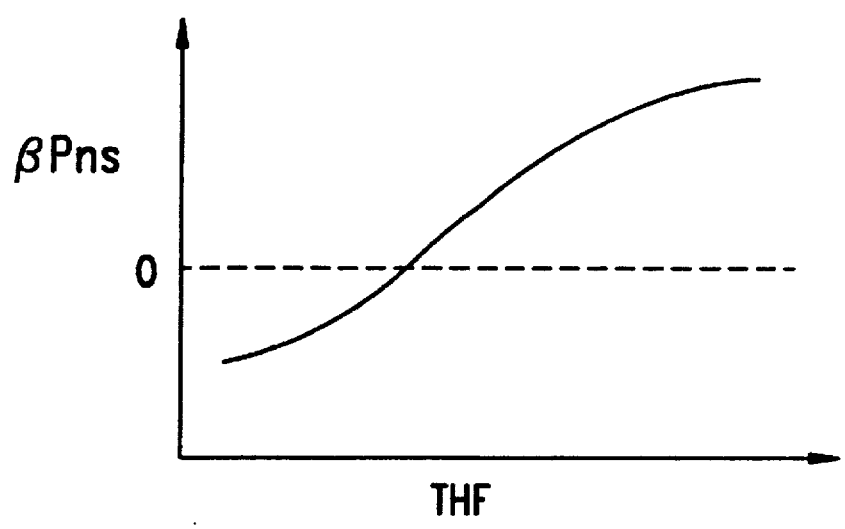

In this equation, the $K^\epsilon$ is a constant corresponding to the volume of the fuel. The β is coefficient which is computed with reference to the graph in FIG. 30, based on the fuel temperature THF. The βPns is a compensated reference opening valve pressure which is computed with reference to the graph in FIG. 32. On the other hand, the remaining fuel amount Qre can be computed through the following equation.

$$Qre = K^\epsilon * Ct$$

Figure 32:
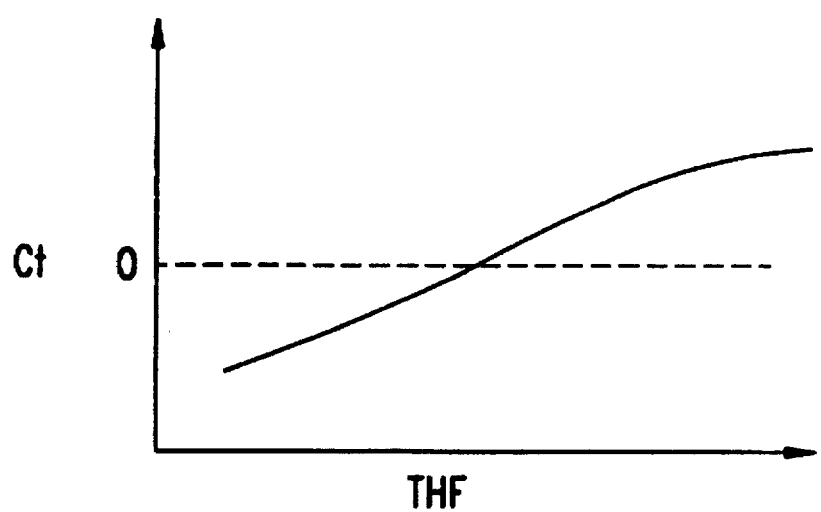

In this equation, Ct is a coefficient computed with reference to the graph in FIG. 32, based on the fuel temperature THF.

Except for the nineth embodiment, the pressure sensors 47 are disposed in each of injection nozzles 4. The pressure sensor can be disposed midway along the fuel passage which connects to the nozzle 4. The fuel sensor can also be disposed in the high pressure chamber 15.

In the fourth through sixth embodiments, the compensated target fuel injection amount Q is computed by subtracting the target fuel injection amount Q1 from the remaining fuel amount change value Qre in the fuel system. The compensated target fuel injection amount Q can also be computed by adding the remaining fuel amount change value Qre to the target fuel injection amount Q1. When the opening valve pressure exceeds the predetermined value, the actual fuel injection amount may be reduced. Therefore, the remaining fuel amount change value Qre may be adjusted by adding the target fuel injection amount Q1 to Qre.

Again in the fourth through sixth embodiments, when the running condition of the diesel engine 3 is not in the FB region, the target fuel injection amount Q1, which is computed according to the running condition, is set as the compensated target fuel injection amount Q. However, when the running condition of the diesel engine 3 is not in the FB region, the target fuel injection amount Q1 is compensated based on the prior value remaining fuel amount change value Qre. The compensated target fuel injection amount Q1 is set as the compensated target fuel amount Q.

In the seventh embodiment, the remaining fuel amount change value Qre can be computed through the following equation.

$$Qre = Vi*\epsilon*(Pns-Pnr) = Vi*\epsilon*\Delta Pn$$

Figure 35:
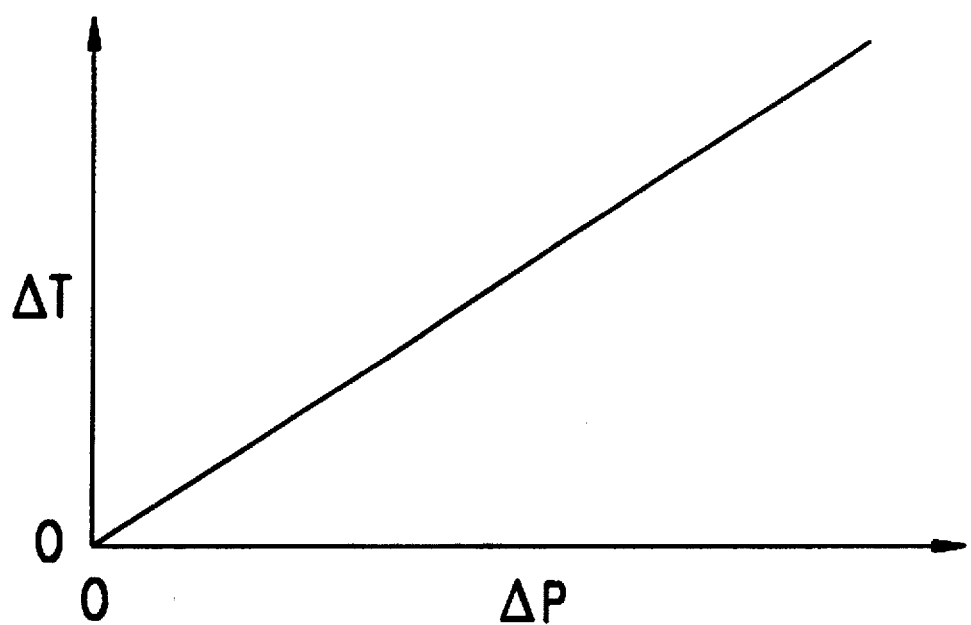
FIG. 35 describes the relationship between the opening fuel injector valve pressure ΔP and a target value for fuel injection timing for purpose of explaining the control routine of the seventh embodiment.

The remaining fuel amount change value Qre is divided by the pump fuel injection rate Ri. The quotient of the division is set as the target fuel injection timing control value $\Delta T$. The time compensated amount $\Delta T$ can be computed with reference to the predetermined graph of the time compensation amount $\Delta T$ and opening valve pressure deviation $\Delta Pn$, as shown in FIG. 35.

In the ninth embodiment, the fuel injection compensation amount $\alpha$ and the fuel injection initiating time compensation amount $\beta$ are computed based on the fuel system environmental coefficient $\rho$ which was compensated according to the first derivative value (dPi/dti) of the fuel pressure P. The target fuel injection amount Q and the target fuel injection initiating timing T are adjusted by the compensated amounts $\alpha$, $\beta$, respectively. However, the changed conditions in the fuel system following every fuel injection termination can be computed, based on the fuel system environmental coefficient $\rho$ which was computed according to the first derivative value (dPi/dti) of the fuel pressure P, and the fuel injection initiating pressure Ps. The fuel injection amount or the fuel injection initiating timing can be adjusted, based on the remaining fuel injection change amount.

Further in the ninth embodiment, the fuel injection compensation amount $\alpha$ and the fuel injection initiating time compensation amount $\beta$ were computed, based on the fuel system environmental coefficient $\rho$. The coefficient $\rho$, in turn, was computed according to the first derivative value (dPi/dti) of the fuel pressure P. The compensation amounts $\alpha$, $\beta$ can be computed by taking the mean value of the cumulated operational data of the last several cycles, in order to prevent the influence of the irregular value of the compensation amounts $\alpha$, $\beta$.

Further in the ninth embodiment, the first derivative value (dPi/dti), at a predetermined crank angle range just before the fuel injection was to be initiated, was computed multiple times through the fuel system environmental coefficient routine. The average fuel injection pressure change rate $\Delta PA$ is computed from the mean value of a plurality of the first derivative values (dPi/dti). However, the average fuel injection pressure change rate $\Delta PA$ can be computed by taking the mean value of sampling data from the fuel pressure P values of previous cycles at a pressure point just before the fuel injection initiating. On the other hand, the average fuel injection pressure change rate $\Delta PA$ can be set from prior calculated data.

In the tenth embodiment, the target fuel injection amount Q was computed by compensating the compensated fuel injection amount Q1, based on the remaining fuel amount deviation $\Delta Qre$. Therefore, the fuel injection amount control was carried out, based on this target fuel injection amount Q. However, the target fuel injection initiating timing can be set by adjusting the fuel injection initiating timing, based on the remaining fuel injection amount deviation $\Delta Qre$. The fuel injection timing in addition to the fuel injection amount can be considered as control values for the adjusted fuel injection.

Again, in the tenth embodiment, the fuel pressure Pi may be detected at a time prior to the fuel injection terminating time te by an amount equal to the compensation time TP. The fuel pressure Pi may be set as the fuel injection terminating pressure Pe which itself corresponds to the closing valve pressure. However, the mean value of the pressure Pi, which is detected in the range between 20 and 100 microseconds prior to the fuel injection terminating time te, can be set as the fuel injection terminating pressure Pe.

Further in the tenth embodiment, the fuel injection initiating time ts and the fuel injection initiating pressure Ps were computed for deriving the fuel injection terminating pressure Pe corresponding to the closing valve pressure. The fuel injection terminating pressure can also be computed by utilizing the predetermined fuel injection initiating time and the fuel injection initiating pressure.

In the eleventh embodiment, the fuel injection initiating pressure Ps which is utilized for computing the fuel injection terminating time te was set according to the computed fuel injection initiating time te. The reference value which is experimentally preset can be utilized as well.

In the eleventh embodiment, the reducing amount control and fuel cut-off of the fuel injection amount were carried out as the fail-safe measure according to the magnitude of the diagnosed irregular conditions. Regardless of the magnitude of the irregular conditions, the fuel cut-off operation can be carried out. The fuel injection amount can be set to a slightly smaller value, instead of reducing the control for the fuel injection corresponding to a target fuel injection amount Q.

Further in the eleventh embodiment, when the irregular condition of the pump 1 was diagnosed, the warning lamp 67 was actuated to notify the driver of an irregular condition. The result of the diagnosis can be stored in the RAM 83, in addition to the actuation of the warning lamp 67. The history of the irregular conditions can be diagnosed afterward by reading back the stored data in the RAM 83.

The present examples and embodiments are to be considered as illustrative and not restrictive and the invention is not to be limited to the details giving herein, but may be modified within the scope of the appended claims.

What is claimed is:

1. A method for controlling fuel injection for a combustion engine, comprising the steps of:

detecting a value of the fuel pressure in a fuel passage between a fuel pump and a fuel nozzle;

computing a rate of change of the fuel pressure during a cycle of fuel injection based on the detected fuel pressure values;

monitoring fuel conditions in the fuel passage in accordance with the computed rate of change;

computing constants in accordance with the fuel conditions;

actuating the pump in accordance with the constants to adjust a selective one from a group consisting of fuel injection amount and fuel injection timing;

supplying fuel to the nozzle by using the pump; and injecting pressurized fuel into the engine by using a nozzle.

2. A fuel injection control apparatus for a combustion engine comprising:
a nozzle for injecting pressurized fuel into the engine;
a pump for supplying fuel to the nozzle;
means for detecting a value of the fuel pressure in a fuel passage between the pump and the nozzle; and
means for checking fuel conditions in the fuel passage in accordance with a rate of change of the fuel pressure computed during a cycle of fuel injection, said rate of change being computed based on the detected fuel pressure values, wherein said checking means computes constants in accordance with the fuel conditions; and
means for actuating the pump in accordance with the constant to adjust a selective one from a group consisting of fuel injection amount and fuel injection timing.

* * * * *

UNITED STATES PATENT AND TRADEMARK OFFICE
CERTIFICATE OF CORRECTION

PATENT NO. : 5,697,338
DATED : 16 December 1997
INVENTOR(S) : Katsuhiko HIROSE et al.

It is certified that error appears in the above-indentified patent and that said Letters Patent is hereby corrected as shown below:

| Column | Line | |
|---|---|---|
| 2 | 34 | Change "referred, to" to --referred to,--. |
| 4 | 39 | Change "pressure the high" to --the high pressure--. |
| 5 | 29 | Change "diposed" to --disposed--. |
| 9 | 17 | Change "sensor" to --sensors--. |
| 10 | 25 | Change "Mount" to --amount--. |
| 16 | 42 | Change "nozzles, 4" to --nozzles 4,--. |
| 17 | 12 | Change "since" to --Since--; change "530,540," to --530, 540,--. |
| 22 | 39 | After "from" delete "the". |

UNITED STATES PATENT AND TRADEMARK OFFICE
CERTIFICATE OF CORRECTION

PATENT NO. : 5,697,338
DATED : 16 December 1997
INVENTOR(S) : Katsuhiko HIROSE et al.

It is certified that error appears in the above-indentified patent and that said Letters Patent is hereby corrected as shown below:

| Column | Line | |
|---|---|---|
| 23 | 11 | Change "Pn" to --$\Delta$Pn--. |
| 26 | 33 | Change "Mount" to --amount--. |
| 28 | 20 | Change "err" to --$\epsilon$tr--. |
| 28 | 31 | Change "$\epsilon$r" to --$\epsilon$tr--. |
| 32 | 25 | After "1930." start new paragraph. |
| 34 | 62 | Change "compensate" to --compensation--. |
| 35 | 18 | Change "specifically," to --Specifically,--. |

UNITED STATES PATENT AND TRADEMARK OFFICE
CERTIFICATE OF CORRECTION

PATENT NO. : 5,697,338

DATED : 16 December 1997

INVENTOR(S) : Katsuhiko HIROSE et al.

It is certified that error appears in the above-indentified patent and that said Letters Patent is hereby corrected as shown below:

| Column | Line | |
|---|---|---|
| 37 | 8 | Change "thing" to --timing--. |
| 38 | 49 | Change "generally" to --general--. |
| 41 | 11 | Change "foe" to --for--. |
| 41 | 35 | Change "72." to --75.--. |
| 48 | 6 | Change "constant" to --constants--. |

Signed and Sealed this

Eighteenth Day of August, 1998

Attest:

BRUCE LEHMAN

Attesting Officer

Commissioner of Patents and Trademarks